United States Patent
Park et al.

(10) Patent No.: US 10,742,974 B2
(45) Date of Patent: Aug. 11, 2020

(54) METHOD FOR ENCODING/DECODING IMAGE AND DEVICE THEREOF

(71) Applicant: SAMSUNG ELECTRONICS CO., LTD., Suwon-si (KR)

(72) Inventors: Min-woo Park, Yongin-si (KR); Bo-ra Jin, Yongin-si (KR); Na-rae Choi, Seoul (KR); In-kwon Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/781,776

(22) PCT Filed: Dec. 16, 2016

(86) PCT No.: PCT/KR2016/014826
§ 371 (c)(1),
(2) Date: Jun. 6, 2018

(87) PCT Pub. No.: WO2017/105141
PCT Pub. Date: Jun. 22, 2017

(65) Prior Publication Data
US 2018/0367793 A1    Dec. 20, 2018

Related U.S. Application Data

(60) Provisional application No. 62/268,689, filed on Dec. 17, 2015.

(51) Int. Cl.
*H04N 19/176* (2014.01)
*H04N 19/11* (2014.01)
(Continued)

(52) U.S. Cl.
CPC ........... *H04N 19/11* (2014.11); *H04N 19/159* (2014.11); *H04N 19/176* (2014.11); *H04N 19/44* (2014.11)

(58) Field of Classification Search
None
See application file for complete search history.

(56) References Cited

U.S. PATENT DOCUMENTS 9,049,458 B2    6/2015  Min et al.
9,215,470 B2   12/2015  Karczewicz et al.
(Continued)

FOREIGN PATENT DOCUMENTS

KR    10-2014-0054464 A    5/2014
KR    10-2015-0027530 A    3/2015
(Continued)

OTHER PUBLICATIONS

International Search Report (PCT/ISA/210) and Written Opinion (PCT/ISA/237) dated Mar. 27, 2017 issued by the International Searching Authority in International Application No. PCT/KR2016/014826.

*Primary Examiner* — Shadan E Haghani
(74) *Attorney, Agent, or Firm* — Sughrue Mion, PLLC

(57) ABSTRACT

Provided are a video decoding method including determining at least one first block for partitioning a current frame which is one of at least one frame included in a video, determining a first prediction mode indicating an intra-prediction method to be performed on a current first block which is one of the at least one first block based on first intra-prediction mode information obtained from a bitstream when intra-prediction is performed on the current first block, determining a plurality of second blocks included in the current first block, determining second prediction modes indicating intra-prediction methods to be performed on the plurality of second blocks based on at least one of the first prediction mode and second intra-prediction mode information obtained from the bitstream with respect to each of the plurality of second blocks, and decoding the video by performing intra-prediction based on the first prediction (Continued)

mode and the second prediction mode; and a video decoding apparatus capable of performing the video decoding method. Provided are also a video encoding method performed in a way opposite or similar to the video decoding method; and a video encoding apparatus capable of performing the video encoding method.

15 Claims, 31 Drawing Sheets

(51) Int. Cl.
*H04N 19/44* (2014.01)
*H04N 19/159* (2014.01)

(56) References Cited

U.S. PATENT DOCUMENTS

| | | | |
|---|---|---|---|
| 9,491,467 | B2 | 11/2016 | Kim et al. |
| 10,390,044 | B2* | 8/2019 | Karczewicz ............ H04N 19/96 |
| 2012/0020580 | A1* | 1/2012 | Sasai ..................... H04N 19/176 |
| | | | 382/233 |
| 2013/0163664 | A1* | 6/2013 | Guo ..................... H04N 19/176 |
| | | | 375/240.12 |
| 2015/0063452 | A1 | 3/2015 | Kim et al. |
| 2018/0295384 | A1* | 10/2018 | Son ..................... H04N 19/105 |

FOREIGN PATENT DOCUMENTS

| | | |
|---|---|---|
| KR | 10-2015-0093633 A | 8/2015 |
| WO | 2010/038951 A2 | 4/2010 |
| WO | 2012/161445 A2 | 11/2012 |

\* cited by examiner

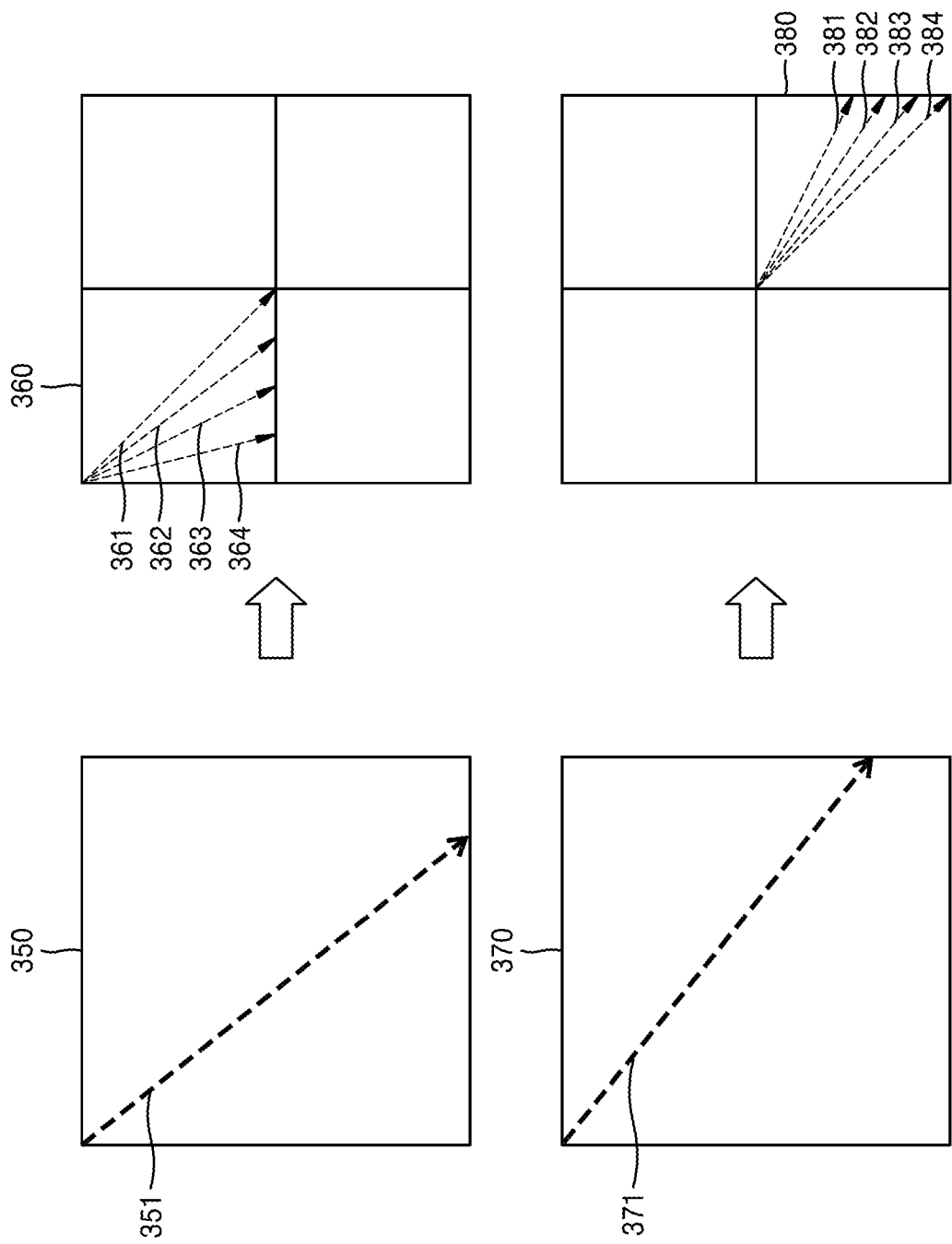

FIG. 11
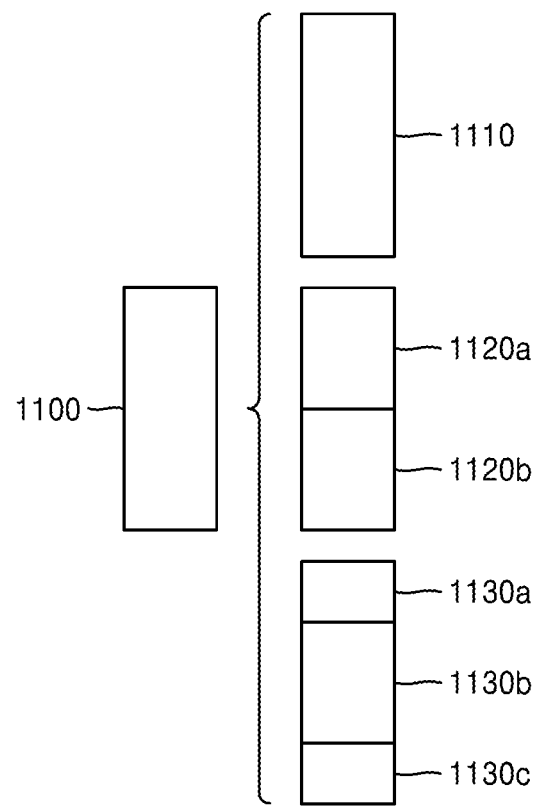
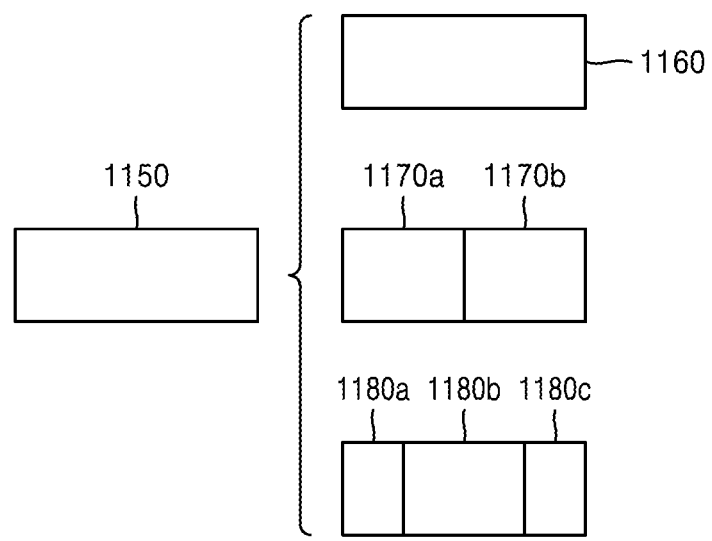

FIG. 20

| BLOCK TYPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD FOR ENCODING/DECODING IMAGE AND DEVICE THEREOF

TECHNICAL FIELD

A method and apparatus according to an embodiment are capable of encoding or decoding a video by using various data units included in the video.

BACKGROUND ART

Video data is encoded according to a data compression standard, e.g., a codec according to a Moving Picture Expert Group (MPEG) standard, and is recorded on a recording medium in the form of a bitstream or transmitted via a communication channel.

With the development and supply of hardware for reproducing and storing high-resolution or high-quality video content, there is a growing need for a codec for effectively encoding or decoding the high-resolution or high-quality video content. Encoded video content may be reproduced by decoding it. Recently, methods of effectively compressing such high-resolution or high-quality video content have been implemented. For example, an efficient video compression method of processing a video to be encoded is implemented in a certain way. Furthermore, various types of data units have been used to partition a video so as to adaptively encode or decode the video.

DESCRIPTION OF EMBODIMENTS

Technical Problem

During intra-prediction performed based predicted blocks used in encoding or decoding a video, one intra-prediction mode may be determined and used with respect to each of the predicted blocks and thus the efficiency of encoding or decoding may be low.

Solution to Problem

A video decoding method according to an embodiment includes determining at least one first block for partitioning a current frame which is one of at least one frame included in a video; determining a first prediction mode indicating an intra-prediction method to be performed on a current first block which is one of the at least one first block based on first intra-prediction mode information obtained from a bitstream when intra-prediction is performed on the current first block; determining a plurality of second blocks included in the current first block; determining second prediction modes indicating intra-prediction methods to be performed on the plurality of second blocks based on at least one of the first prediction mode and second intra-prediction mode information obtained from the bitstream with respect to each of the plurality of second blocks; and decoding the video by performing intra-prediction based on the first prediction mode and the second prediction mode.

A video decoding apparatus includes a bitstream obtainer configured to obtain first intra-prediction mode information and second intra-prediction mode information from a bitstream; and a decoder configured to determine at least one first block for partitioning a current frame which is one of at least one frame included in a video, determine whether intra-prediction is to be performed on a current first block which is one of the at least one first block, determine a first prediction mode indicating an intra-prediction method to be performed on the current first block based on the first intra-prediction mode information when intra-prediction is to be performed on the current first block, determine a plurality of second blocks included in the current first block, determine second prediction modes indicating intra-prediction methods to be performed on the plurality of second blocks based on at least one of the first prediction mode and the second intra-prediction mode information of each of the plurality of second blocks, and decode the video by performing intra-prediction based on the first prediction mode and the second prediction modes.

A video encoding method includes determining at least one first block for partitioning a current frame which is one of at least one frame included in a video; determining whether intra-prediction is to be performed on a current first block which is one of the at least one first block; when intra-prediction is to be performed on the current first block, determining a first prediction mode indicating an intra-prediction method to be performed on the current first block; determining a plurality of second blocks included in the current first block; determining second prediction modes indicating intra-prediction methods to be performed on the plurality of second blocks, based on the first prediction mode; encoding the video by performing intra-prediction based on the first prediction mode and the second prediction modes; and generating a bitstream including data regarding the encoded video, first intra-prediction mode information indicating a current first prediction mode, and second intra-prediction mode information indicating the second prediction modes.

Advantageous Effects of Disclosure

In one embodiment, intra-prediction modes to be performed on a plurality of sub-bocks included in a block may be individually determined using an intra-prediction mode determined with respect to the block.

BRIEF DESCRIPTION OF DRAWINGS

FIG. 3C illustrates a process of determining intra-prediction modes of second blocks included in a first block, according to an embodiment.

FIG. 11 illustrates processes of determining at least one coding unit when a coding unit having a non-square shape is partitioned, according to an embodiment.

FIG. 20 illustrates processes of determining a depth of a coding unit as a shape and size of the coding unit are changed, when a plurality of coding units are determined when the coding unit is recursively partitioned, according to an embodiment.

BEST MODE

Figure 1A:
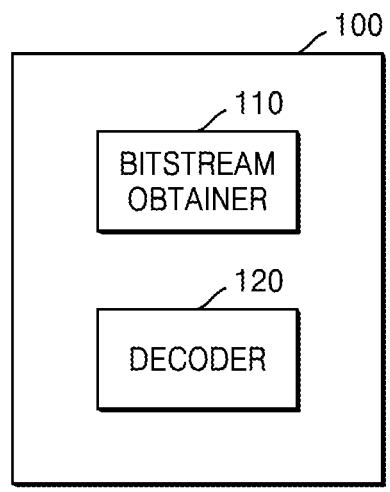
FIG. 1A is a block diagram of a video decoding apparatus capable of determining prediction modes of a plurality of second blocks included in a current first block, based on a prediction mode of the current first block.

In one embodiment, a video decoding method includes determining at least one first block for partitioning a current frame which is one of at least one frame included in a video; determining a first prediction mode indicating an intra-prediction method to be performed on a current first block which is one of the at least one first block, based on first intra-prediction mode information obtained from a bitstream, when intra-prediction is performed on the current first block; determining a plurality of second blocks included in the current first block; determining second prediction modes indicating intra-prediction methods to be performed on the plurality of second blocks, based on at least one of the first prediction mode and second intra-prediction mode information obtained from the bitstream with respect to each of the plurality of second blocks; and decoding the video by performing intra-prediction based on the first prediction mode and the second prediction mode.

In one embodiment, the determining of the second prediction modes may include obtaining the second intra-prediction mode information from the bitstream related to a previous second block which is one of the plurality of second blocks; and determining a second prediction mode of an adjacent current second block, based on at least one of the second intra-prediction mode information related to the previous second block and the first intra-prediction mode information.

In one embodiment, the determining of the second prediction modes may include determining a reference direction of intra-prediction to be used for the current second block, based on a direction of intra-prediction determined according to the first intra-prediction mode information and a direction of intra-prediction determined according to the second intra-prediction mode information related to the previous second block; and determining a prediction mode using one of a plurality of directions of intra-prediction, including the reference direction of intra-prediction, to be the second prediction mode of the current second block, based on the second intra-prediction mode information obtained in relation to the current second block.

In one embodiment, when the current second block is a last second block among the plurality of second blocks, the determining of the second prediction modes may include determining a prediction mode using the reference direction of intra-prediction to be the second prediction mode of the current second block.

In one embodiment, differences between indexes of intra-prediction modes to be determined based on the second intra-prediction mode information of the current second block may be uniform.

In one embodiment, differences between indexes of intra-prediction modes to be determined based on the second intra-prediction mode information of the current second block may not be uniform.

In one embodiment, the determining of the first prediction mode may include determining an intra-prediction mode of the current first block, based on first intra-prediction mode information obtained from the bitstream related to a first neighboring block adjacent to the current first block.

In one embodiment, the determining of the first prediction mode may include determining the first prediction mode, based on the first intra-prediction mode information obtained from the bitstream related to the current first block.

In one embodiment, the determining of the second prediction modes may include obtaining a flag indicating whether intra-prediction is to be performed based on the first prediction mode and the second prediction modes from the bitstream; and when the flag indicates that intra-prediction is to be performed based on the first prediction mode and the second prediction modes, determining the second prediction modes by obtaining the second intra-prediction mode information from the bitstream with respect to each of the plurality of second blocks.

In one embodiment, when the first prediction mode indicates a directional intra-prediction mode, the determining of the second prediction modes may include determining second prediction modes of second blocks in the same row or column among the plurality of second blocks to be the same, based on a direction of intra-prediction related to the first prediction mode.

In one embodiment, the determining of the plurality of second blocks may include determining a plurality of non-square second blocks included in the first block.

In one embodiment, the first block may be a coding unit, and the plurality of second blocks may be transformation units.

In one embodiment, a video decoding apparatus includes a bitstream obtainer configured to obtain first intra-prediction mode information and second intra-prediction mode information from a bitstream; and a decoder configured to determine at least one first block for partitioning a current frame which is one of at least one frame included in a video, determine whether intra-prediction is to be performed on a current first block which is one of the at least one first block, determine a first prediction mode indicating an intra-prediction method to be performed on the current first block based on the first intra-prediction mode information when intra-prediction is to be performed on the current first block, determine a plurality of second blocks included in the current first block, determine second prediction modes indicating intra-prediction methods to be performed on the plurality of second blocks based on at least one of the first prediction mode and the second intra-prediction mode information of each of the plurality of second blocks, and decode the video by performing intra-prediction based on the first prediction mode and the second prediction modes.

In one embodiment, a video encoding method includes determining at least one first block for partitioning a current frame which is one of at least one frame included in a video; determining whether intra-prediction is to be performed on a current first block which is one of the at least one first block; when intra-prediction is to be performed on the current first block, determining a first prediction mode indicating an intra-prediction method to be performed on the current first block; determining a plurality of second blocks included in the current first block; determining second prediction modes indicating intra-prediction methods to be performed on the plurality of second blocks, based on the first prediction mode; encoding the video by performing intra-prediction based on the first prediction mode and the second prediction modes; and generating a bitstream including data regarding the encoded video, first intra-prediction mode information indicating a current first prediction mode, and second intra-prediction mode information indicating the second prediction modes.

In one embodiment, there is provided a non-transitory computer-readable recording medium having recorded thereon a computer program for executing a video decoding method.

MODE OF DISCLOSURE

Advantages and features of the present disclosure and methods of achieving them will be apparent from embodiments set forth herein in conjunction with the accompanying drawings. However, the present disclosure is not limited to these embodiments and may be embodied in many different forms. These embodiments are merely provided so that this disclosure will be thorough and complete and will fully convey the scope of the present disclosure to those of ordinary skill in the art.

The terms used herein will be briefly described and then the present disclosure will be described in detail.

In the present disclosure, general terms that have been widely used nowadays are selected, if possible, in consideration of functions of the present disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the present specification.

As used herein, the singular forms "a", "an" and "the" are intended to include the plural forms as well, unless the context clearly indicates otherwise It will be understood that when an element is referred to as including another element, the element can further include other elements unless mentioned otherwise. The term "unit" used herein should be understood as software or a hardware component, such as a FPGA or an ASIC, which performs certain functions. However, the term "unit" is not limited to software or hardware. The term "unit" may be configured to be stored in an addressable storage medium or to reproduce one or more processors. Thus, for example, the term "unit" may include components, such as software components, object-oriented software components, class components, and task components, functions, attributes, procedures, subroutines, segments of program code, drivers, firmware, microcode, a circuit, data, database, data structures, tables, arrays, and variables. Functions provided in components and "units" may be combined to obtain a small number of components and "units" or partitioned into sub-components and "sub-units".

Hereinafter, the term "video" should be understood to include a static image, such as a still image of a video, and a moving picture, i.e., a dynamic image, which is a video.

The term "sample" should be understood as data allocated to a video sampling position, i.e., data to be processed. For example, pixel values of a video in a spatial domain and transformation coefficients in a transformation domain may be samples. A unit including such at least one sample may be defined as a block.

Embodiments of the present disclosure will be described in detail below such that those of ordinary skill in the art can easily implement them. In the drawings, parts that are not related to clearly describing the present disclosure are omitted.

FIG. 1A is a block diagram of a video decoding apparatus 100 capable of determining prediction modes of a plurality of second blocks included in a current first block, based on a prediction mode of the current first block.

In one embodiment, the video decoding apparatus 100 may include a bitstream obtainer 110 configured to obtain first intra-prediction mode information indicating an intra-prediction mode of a first block and second intra-prediction mode information indicating an intra-prediction mode of a second block from a bitstream, and a decoder 120 configured to decode a video by determining a first block and a second block included in a current frame which is one of at least one frame of the video and determining a first prediction mode which is an intra-prediction method for the first block and a second prediction mode which is an intra-prediction method for the second block. In one embodiment, the second intra-prediction mode information may be determined based on the first prediction mode in relation to the first intra-prediction mode information and the second intra-prediction mode information obtained from the bitstream. That is, in one embodiment, intra-prediction may be performed on the second block based on an intra-prediction mode used in intra-predicting the first block. An encoding side may generate the bitstream containing the first intra-prediction mode information indicating the intra-prediction mode performed on the first block and the second intra-prediction mode information indicating the intra-prediction mode performed on the second block. The video decoding apparatus 100 may obtain the first intra-prediction mode information and the second intra-prediction mode information from the bitstream received from the encoding side. A video decoding method which may be performed by the video decoding apparatus 100 will be described with respect to various embodiments below.

Figure 2A:
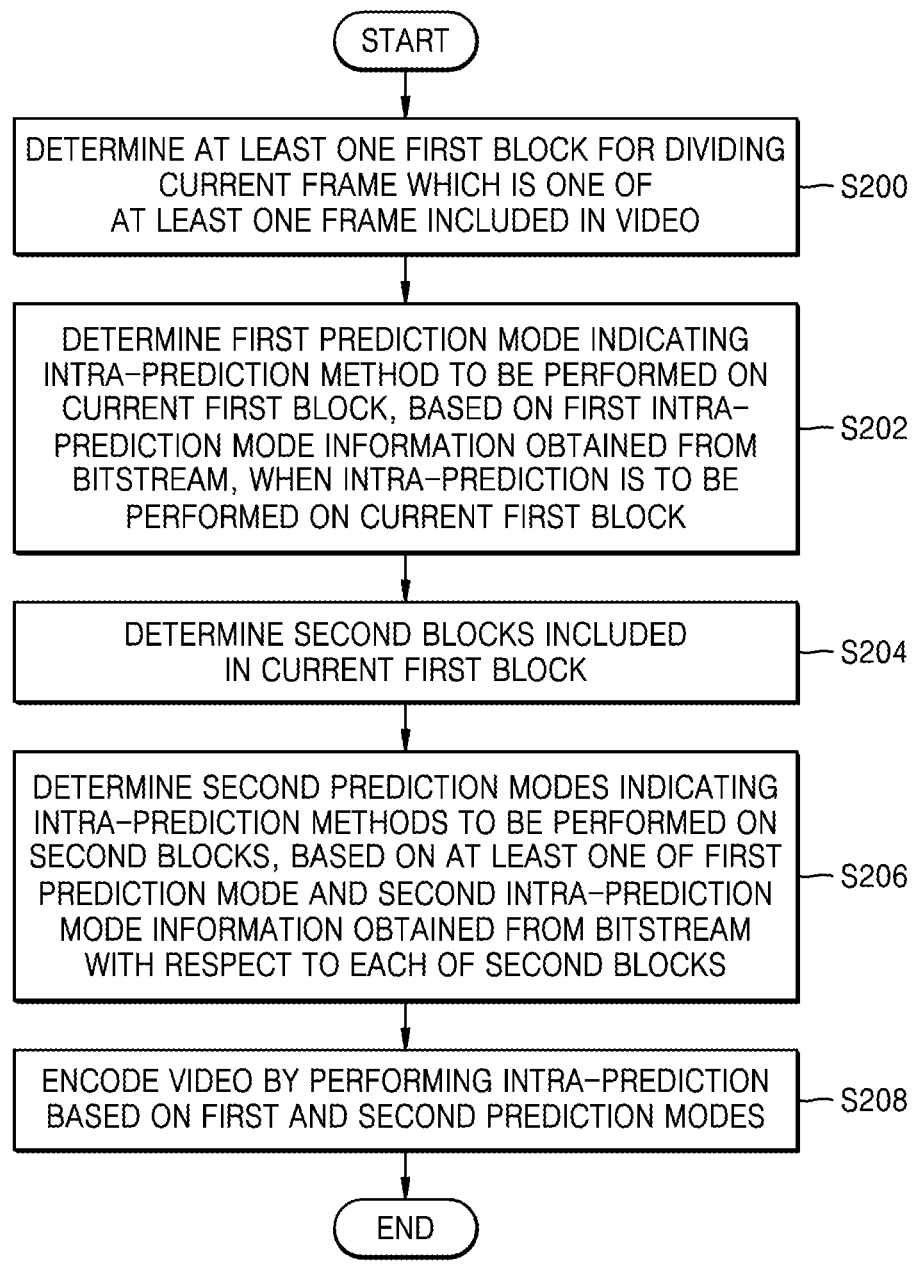
FIG. 2A is a flowchart of a method of determining prediction modes of a plurality of second blocks, based on a prediction mode of a current first block, performed by a video decoding apparatus, according to an embodiment.

FIG. 2A is a flowchart of a method of determining prediction modes of a plurality of second blocks, based on a prediction mode of a current first block, performed by the video decoding apparatus 100, according to an embodiment.

In one embodiment, in operation S200, the decoder 120 may determine at least one first block for partitioning a current frame which is one of at least one frame included in a video. Various types of blocks may be used during decoding of the current frame, and the decoder 120 may perform a video decoding process based on the various types of blocks. In one embodiment, the decoder 120 may determine whether intra-prediction is to be performed on a current first block by obtaining information indicating whether intra-prediction or inter-prediction is to be performed from a bitstream. In one embodiment, the decoder 120 may determine whether intra-prediction is to be performed on the current first block, based on information indicating a type of a certain data unit including the current first block (e.g., a slice). A process of determining whether an intra-prediction mode is to be performed on the current first block may correspond to determination processes included in various decoding methods according to the related art and is thus not described in detail here.

In one embodiment, in operation S202, the decoder 120 may determine a first prediction mode indicating an intra-prediction method to be performed on the current first block based on first intra-prediction mode information obtained from the bitstream when intra-prediction is performed on the current first block which is one of the at least one first block. In one embodiment, the decoder 120 may determine a type of intra-prediction to be performed on each of the at least one first block. The at least one first block may include various types of data blocks. For example, whether intra-prediction or inter-prediction is to be performed on each of the at least one first block may be determined. As another example, a type of intra-prediction included in the intra-prediction mode to be performed on each of the at least one first block may be determined.

In one embodiment, the video decoding apparatus 100 may determine a prediction mode of the current first block by using the first intra-prediction mode information obtained from the bitstream. Such first intra-prediction mode information for each of the at least one first block for partitioning the current frame may be obtained from the bitstream. In one embodiment, the bitstream obtainer 110 may obtain the first intra-prediction mode information from the bitstream, and the decoder 120 may determine a type of intra-prediction to be performed on the current first block by using the obtained first intra-prediction mode information.

In one embodiment, the first intra-prediction mode information used by the decoder 120 to determine the first prediction mode which is the intra-prediction mode of the current first block may be information obtained from a bitstream regarding the current first block.

In another embodiment, the first intra-prediction mode information used by the decoder 120 to determine the first prediction mode which is the intra-prediction mode of the current first block may be information obtained from a bitstream regarding another first block adjacent to the current first block. That is, in order to determine the intra-prediction mode of the current first block, the video decoding apparatus 100 may obtain the first intra-prediction mode information related to the current first block from the bitstream and use the first intra-prediction mode information or may use information which is related to neighboring first blocks adjacent to the current first block and was obtained from the bitstream. In one embodiment, in order to determine the first prediction mode of the current first block, the decoder 120 may use first intra-prediction mode information obtained from a bitstream regarding at least one first block adjacent to the current first block or use an index identifying an intra-mode performed on the at least one first block adjacent to the current first block.

In one embodiment, the video decoding apparatus 100 may determine a prediction mode of the current first block by using previously obtained first intra-prediction mode information of the other first blocks without obtaining first intra-prediction mode information for each of the first blocks, thereby efficiently managing the bitstream.

In one embodiment, in order to determine the first prediction mode of the current first block, a flag indicating whether the first intra-prediction mode information obtained from the bitstream regarding the current first block or information or an index regarding other adjacent first blocks is to be used may be obtained from the bitstream and used.

In one embodiment, in operation S204, the video decoding apparatus 100 may determine a plurality of second blocks included in the current first block. A relation between data blocks, such as a first block for partitioning a current frame and at least one second block included in the first block, may include an inclusion relation between various types of data blocks.

In one embodiment, when a first block is a largest coding unit, a second block included in the first block may be a coding unit partitioned from the largest coding unit. In one embodiment, when the first block is a coding unit, the second block included in the first block may be a prediction unit or a transformation unit determined based on the coding unit. However, the above-described embodiments are merely examples provided to explain an inclusion relation between the first block and the second block. Thus, the first block and the second block should not be understood as being limited to these embodiments and should be understood to include various types of data blocks having an inclusion relation as in these embodiments.

In one embodiment, in operation S206, the video decoding apparatus 100 may determine second prediction modes indicating intra-prediction methods to be performed on the plurality of second blocks, based on second intra-prediction mode information obtained from the bitstream with respect to each of the plurality of second blocks.

Figure 3A:
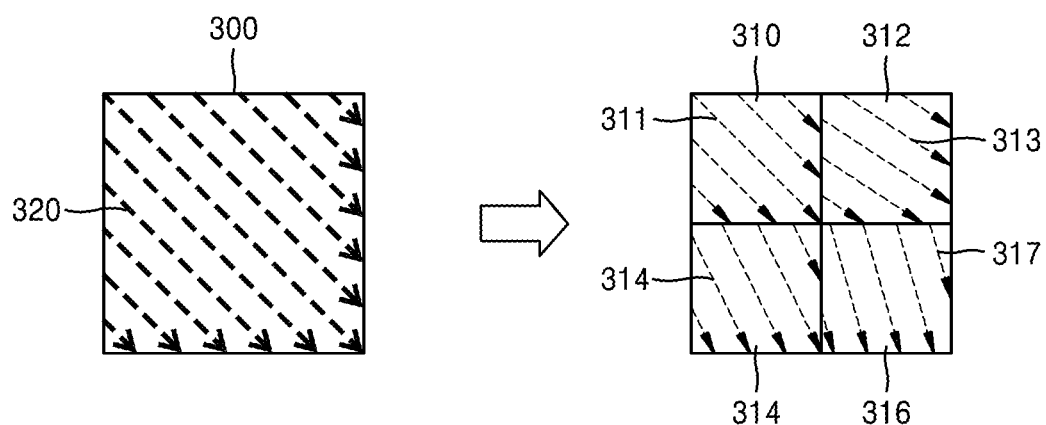
FIG. 3A illustrates a process of determining intra-prediction modes of a plurality of second blocks, based on an intra-prediction mode of a first block, according to an embodiment.

FIG. 3A illustrates a process of determining intra-prediction modes of a plurality of second blocks based on an intra-prediction mode of a first block, according to an embodiment.

In one embodiment, when intra-prediction is performed on a current first block, the video decoding apparatus 100 may determine a first prediction mode indicating an intra-prediction method to be performed on the current first block, based on first intra-prediction mode information obtained from a bitstream. Referring to FIG. 3A, the decoder 120 may determine whether intra-prediction is to be performed on a current first block 300 which is one of first blocks for partitioning a current frame, and determine a type of intra-prediction to be performed based on the first intra-prediction mode information obtained from the bitstream. In one embodiment, an intra-prediction mode which may be performed on a first block may be a directional intra-prediction method or a non-directional intra-prediction method. An index identifying intra-prediction modes which may be performed may be used. The video decoding apparatus 100 may determine an intra-prediction mode to be performed on the current first block 300 by obtaining the first intra-prediction mode information from the bitstream. Referring to FIG. 3A, the decoder 120 may determine directional intra-prediction to be performed by referring to samples adjacent to the current first block 300 in an upper left direction, based on the first intra-prediction mode information. However, the directional intra-prediction performed by referring to the samples adjacent to the current first block 300 in the upper left direction illustrated in FIG. 3A is merely an example, and directional intra-prediction which may be performed on the current first block 300 may be intra-prediction performed by referring to samples adjacent to the current first block 300 in various directions.

In one embodiment, the decoder 120 may determine a plurality of second blocks 310, 312, 314, and 316 included in the current first block 300. Furthermore, the bitstream obtainer 110 may obtain second intra-prediction mode information for each of the plurality of second blocks 310, 312, 314, and 316 from the bitstream. The decoder 120 may individually determine intra-prediction modes to be performed on the plurality of second blocks 310, 312, 314, and 316 by using the second intra-prediction mode information obtained for each of the plurality of second blocks 310, 312, 314, and 316.

Referring to FIG. 3A, the decoder 120 may perform a plurality of types of intra-prediction, based on at least one of the first prediction mode and the second intra-prediction mode information obtained for each of the plurality of second blocks 310, 312, 314, and 316.

In one embodiment, the second intra-prediction mode information obtained in relation to each of the plurality of second blocks 310, 312, 314, and 316 may be obtained from a bitstream generated in relation to an intra-prediction method for the current first block 300. In one embodiment, an index indicating an intra-prediction mode may be used, and the decoder 120 may determine whether directional intra-prediction or non-directional intra-prediction is to be performed, based on the index. For example, in the intra-prediction method for the current first block 300, second prediction modes of the plurality of second blocks 310, 312, 314, and 316 may be determined, based on an index indicating a directional intra-prediction method performed by referring to the samples adjacent to the current first block 300 in the upper left direction (or the first intra-prediction mode information) and the second intra-prediction mode information obtained in relation to the plurality of second blocks 310, 312, 314, and 316.

In one embodiment, when the index indicating the directional intra-prediction method performed by referring to the samples adjacent to the current first block 300 in the upper left direction is K, the decoder 120 may determine one of indexes, such as K−N−1, K−N, K+N, K+N+1, etc., to be an index indicating intra-prediction modes to be performed on the plurality of second blocks 310, 312, 314, and 316, based on the second intra-prediction mode information. That is, the decoder 120 may determine an index indicating an intra-prediction mode to be performed on each of the plurality of second blocks 310, 312, 314, and 316 with respect to an index of an intra-prediction mode of the current first block 300 determined according to the first intra-prediction mode information, based on the second intra-prediction mode information obtained from the bitstream with respect to each of the plurality of second blocks 310, 312, 314, and 316. The decoder 120 may determine the second prediction modes according to the index. Table 1 below is an example and shows indexes of the intra-prediction modes which may be determined for the plurality of second blocks 310, 312, 314, and 316 included in the current first block 300, based on at least one of the first intra-prediction mode information and the second intra-prediction mode information. In one embodiment, the number of bits of the second intra-prediction mode information obtained by the bitstream obtainer 110 of the video decoding apparatus 100 may vary according to the types of second prediction modes of the plurality of second blocks 310, 312, 314, and 316 which may be determined with respect to the first prediction mode. Furthermore, a bit length is variable. Table 1 below shows merely an example of an index of an intra-mode of a second block which may be determined with respect to an index of a first block according to second intra-prediction mode information. Thus, embodiments should not be construed as being limited by the indexes shown in Table 1 below or the second intra-prediction mode information. Here, K, A and B may include certain integers.

TABLE 1

| Index of intra-mode of first block | Second intra-prediction mode information | Index of intra-prediction mode of second block |
|---|---|---|
| K | 00 | K |
|  | 01 | K + A |
|  | 10 | K + A + B |
|  | 11 | K − A |

In one embodiment, an orientation or angle of a reference sample to be used in directional intra-prediction mode may be determined by an index indicating an intra-prediction mode. In one embodiment, the decoder 120 may determine an index indicating an intra-prediction mode to be performed on each of the second blocks, based on at least one of the first intra-prediction mode information and the second intra-prediction mode information. Thus, the video decoding apparatus 100 may adjust directions of intra-prediction of a plurality of second blocks included in a first block with respect to a direction of intra-prediction related to an intra-prediction mode of a current first block. Referring to FIG. 3A, the decoder 120 may determine directions of intra-prediction 311, 313, 315, and 317 of the plurality of second blocks 310, 312, 314, and 316 included in the first block 300 with respect to the direction of intra-prediction of the current first block 300. Referring to Table 1, when the second intra-prediction mode information of the upper left second block 310 is 00, intra-prediction may be performed in a direction of prediction related to an index K that is the same as an index K of the direction of intra-prediction of the current first block 300. Furthermore, when the second intra-prediction mode information of the upper right second block 312 is 11, intra-prediction may be performed in a direction of prediction related to an index, e.g., an index (K−A), which is smaller than the index K of the direction of intra-prediction of the current first block 300. When the second intra-prediction mode information of the lower left second block 314 is 01, intra-prediction may be performed in a direction of prediction related to an index, e.g., an index (K+A), which is larger than the index K of the direction of intra-prediction of the current first block 300. When the second intra-prediction mode information of the lower right second block 316 is 10, intra-prediction may be performed in a direction of prediction related to an index, e.g., an index (K+A+B), which is larger than the index K of the direction of intra-prediction of the current first block 300.

Accordingly, not only the direction of intra-prediction used for the current first block 300 but also directions of intra-prediction individually determined for the plurality of second blocks 310, 312, 314, and 316 included in the current first block 300 may be used. As described above, according to various embodiments, the video decoding apparatus 100 may more accurately perform a video reconstruction process by performing various types of intra-prediction on the plurality of second blocks 310, 312, 314, and 316 subdivided from the current first block 300 than when intra-prediction is performed on the current first block 300 which is a data block.

In one embodiment, the video decoding apparatus 100 may determine a second prediction mode of each of a plurality of second blocks by using an index of a second prediction mode indicated by second intra-prediction mode information obtained from a bitstream with respect to each of the plurality of second blocks.

Figure 3B:
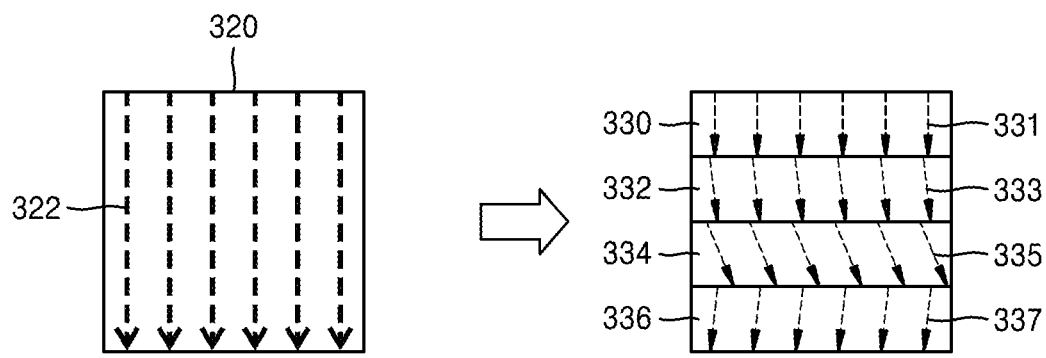
FIG. 3B illustrates a process of determining a prediction mode, based on a non-square block for partitioning a video, according to an embodiment.

FIG. 3B illustrates a process of determining a prediction mode based on a non-square block for partitioning a video, according to an embodiment.

In one embodiment, the decoder 120 of the video decoding apparatus 100 is capable of decoding a video by using not only square data units but also non-square data units. Referring to FIG. 3B, the decoder 120 may perform a plurality of types of intra-prediction, based on second intra-prediction mode information obtained for each of a plurality of second blocks 330, 332, 334, and 336 included in a current first block 320. The second intra-prediction mode information obtained from a bitstream may be information related to first intra-prediction mode information.

In one embodiment, the second intra-prediction mode information obtained in relation to the plurality of second blocks 330, 332, 334, and 336 may be obtained from a bitstream generated in relation to an intra-prediction method for the current first block 320. In one embodiment, an index indicating an intra-prediction mode may be used, and the decoder 120 may determine whether directional intra-prediction or non-directional intra-prediction is to be performed, based on the index. For example, second prediction modes of the plurality of second blocks 330, 332, 334, and 336 may be determined, based on either an index (or first intra-prediction mode information) indicating a directional intra-prediction method performed by referring to samples adjacent to the current first block 320 in an upper direction 322 as the intra-prediction method for the current first block 320 or the second intra-prediction mode information obtained in relation to the plurality of second blocks 330, 332, 334, and 336. Here, the plurality of second blocks 330, 332, 334, and 336 included in the current first block 320 may each have a non-square shape. Furthermore, a non-square first block which is different from the square shape of the current first block 320 illustrated in FIG. 3B may be included in a current frame. A plurality of second blocks included in the non-square first block may be data blocks each having a square or non-square shape. That is, first and second blocks which may be used in various embodiments may have various shapes, such as a square or non-square shape, which satisfy an inclusion relation between the first and second blocks.

In one embodiment, the second intra-prediction mode information obtained in relation to the plurality of second blocks 330, 332, 334, and 336 may be obtained from a bitstream generated in relation to the intra-prediction method for the current first block 320. In one embodiment, an index indicating an intra-prediction mode may be used, and the decoder 120 may determine whether directional intra-prediction or non-directional intra-prediction is to be performed, based on the index. For example, the second prediction modes of the second blocks 330, 332, 334, and 336 may be determined, based on either an index (or the first intra-prediction mode information) indicating a directional intra-prediction method performed by referring to samples adjacent to the current first block 320 in the upper direction 322 as the intra-prediction method for the current first block 320 and the second intra-prediction mode information obtained in relation to the plurality of second blocks 330, 332, 334, and 336 having the non-square shape. A method of determining second prediction modes of the second blocks 330, 332, 334, and 336 having the non-square shape may be substantially the same as the method described above with reference to FIG. 3A and thus is not described in detail here.

FIG. 3C illustrates a process of determining intra-prediction modes of second blocks included in a first block, according to an embodiment.

In one embodiment, the decoder 120 may determine an intra-prediction mode of each of second blocks, based on second intra-prediction mode information obtained from a bitstream and a type of an intra-prediction mode determined in relation to a first block 350. In one embodiment, the intra-prediction mode determined with respect to the first block 350 may be a directional intra-prediction mode which is an intra-prediction mode referring to reference samples adjacent to at least one of a left border and an upper border of the first block 350. An intra-prediction mode of a second block 360 may be determined, based on the intra-prediction mode. In this case, an intra-prediction mode of the first block 350 may be a reference intra-prediction mode. For convenience of explanation, the intra-prediction mode of the first block 350 used to determine the intra-prediction mode of the second block 360 will be hereinafter referred to as a reference intra-prediction mode.

In one embodiment, the decoder 120 may determine a number and directions of directional intra-prediction modes available for the second block 360, based on the reference intra-prediction mode. In detail, as shown in Table 1 above, when second intra-prediction mode information of the second block 360 is 00, intra-prediction may be performed by referring to reference samples located in the same direction as the reference intra-prediction mode. In one embodiment, an index related to an intra-prediction mode indicated by the second intra-prediction mode information used by the decoder 120 may vary according to the direction of the reference intra-prediction mode. That is, the decoder 120 may differently set a second prediction mode to be indicated by the second intra-prediction mode information, based on a result of comparing an index K determined according to the reference intra-prediction mode with a threshold value L. Table 2 below shows examples of a second prediction mode which may be determined according to the result of comparing the index K with the threshold value L

TABLE 2

| Comparison between threshold value L and index K of first intra-prediction mode | Second intra-prediction mode information | Index of intra-prediction mode of second block |
|---|---|---|
| When K is greater than or equal to L | 00 | K |
|  | 01 | K + A |
|  | 10 | K + A + B |
|  | 11 | K − A |
| When K is less than L | 00 | K |
|  | 01 | K + A |
|  | 10 | K + A |
|  | 11 | K − A − B |

That is, even if the same second intra-prediction mode information is obtained by the bitstream obtainer 110, the decoder 120 may variously determine an index which may be determined to indicate the second prediction mode according to a direction of prediction of a reference sample used in a first prediction mode. Thus, during a prediction process of the video decoding apparatus 100, various second prediction modes may be used in one direction with respect to an index K indicating the first prediction mode.

In one embodiment, referring to FIG. 3C, when the index K indicating the first prediction mode of the current first block 350 is greater than or equal to the threshold value L, the decoder 120 may determine one of intra-prediction modes related to a direction of prediction 361 related to an index (K−A) which is smaller than the index K, directions of prediction 363 and 364 related to indexes (K+A) and (K+A+B) which are greater than the index K, and a direction of prediction 362 which is the same as a direction of prediction 351 of the first prediction mode to be a second prediction mode of the second block 360 with respect to the index K of the first prediction mode as an index indicated by the second intra-prediction mode information. In another embodiment, when an index K indicating a first prediction mode of a current first block 370 is smaller than the threshold value L, the decoder 120 may determine one of intra-prediction modes related to directions of prediction 381 and 382 related to indexes (K−A) and (K−A−B) which are smaller than the index K, a direction of prediction 384 related to an index (K+A) which is greater than the index K, and a direction of prediction 383 which is the same as a direction of prediction 371 of the first prediction mode to be a second prediction mode of a second block 380 with respect to the index K of the first prediction mode as an index indicated by the second intra-prediction mode information. However, the above-described embodiments are merely examples provided to explain that a direction of prediction in a second prediction mode may be variously determined according to a direction of prediction related to the first prediction mode. Accordingly, the types of the first prediction mode and the second prediction modes should not be construed as being limited thereto, and various directions of prediction and various numbers of directions of prediction may be used as prediction modes.

In one embodiment, when the video decoding apparatus 100 determines an index indicating an intra-prediction mode based on the second intra-prediction mode information, the differences between indexes which may be determined according to second intra-prediction modes may be uniform. That is, the differences between different indexes which may be determined by the decoder 120 to be second prediction modes of the second blocks with respect to the index K indicating the first intra-prediction mode in Table 1 or 2 may be the same (i.e., A=B).

In another embodiment, the differences between different indexes which may be determined by the decoder 120 to be second prediction modes of the second blocks with respect to the index K indicating the first intra-prediction mode in Table 1 or 2 may not be the same (i.e., A>B or A<B).

In another embodiment, when the video decoding apparatus 100 determines an index for a second prediction mode of each of the second blocks, the differences between indexes which are smaller than the index K of the first prediction mode of the first block serving as a reference index may not be the same as the differences between indexes which are greater than the index K of the first prediction mode. That is, the decoder 120 may determine a second prediction mode by using K−nB (here, n>1) as indexes which are smaller than the index K of the first prediction mode or using K+nA (here, n>1) as indexes which are greater than the index K of the first prediction mode. Alternatively, in one embodiment, in order to determine an index of a second prediction mode of each of the second blocks, the video decoding apparatus 100 may determine the differences between indexes which are smaller than the index K of the first prediction mode to be uniform or non-uniform and determine the differences between indexes which are greater than the index K of the first prediction mode to be uniform or non-uniform.

Figure 4A:
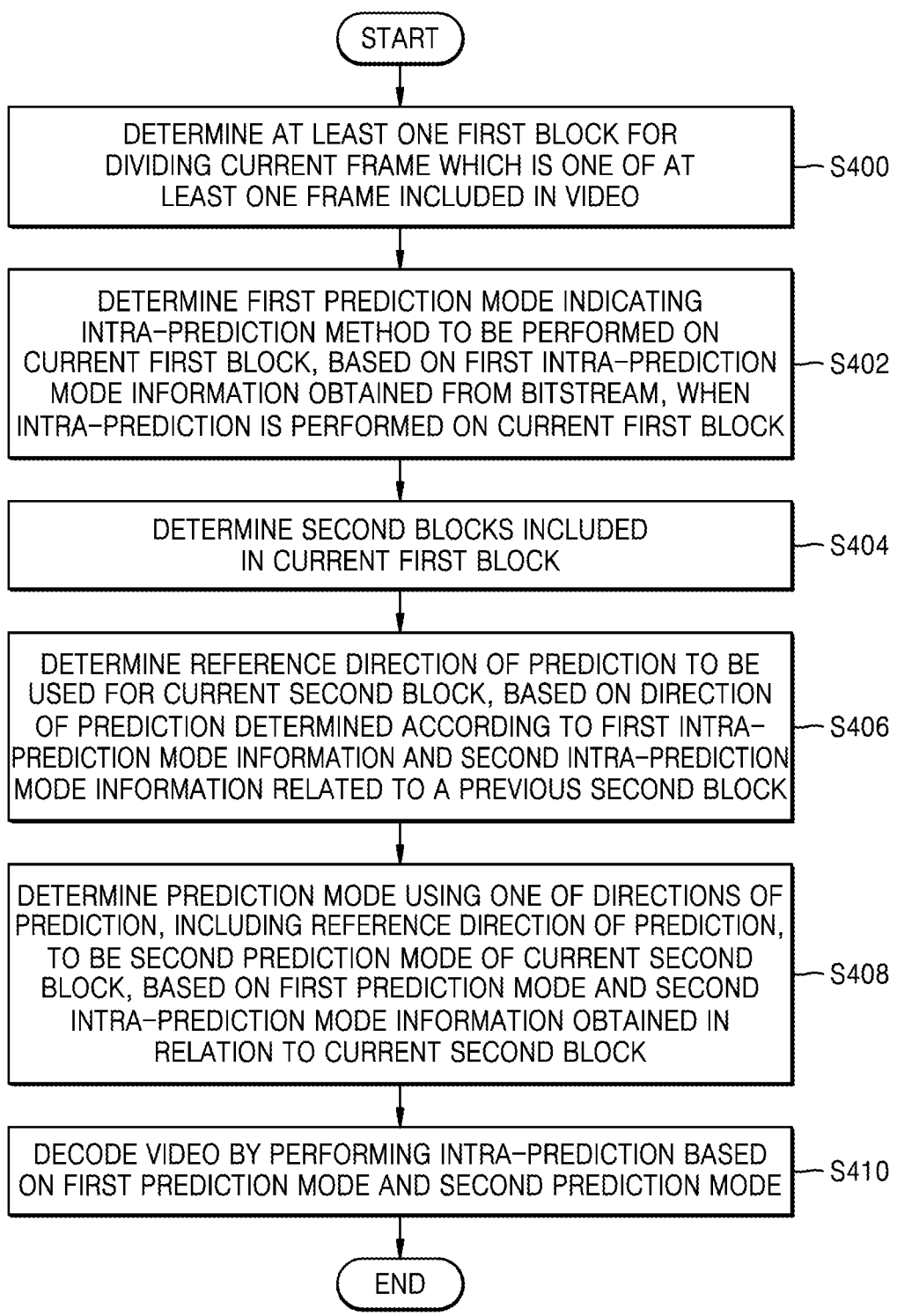
FIG. 4A is a flowchart of a process of determining a second prediction mode of a current second block, based on a first prediction mode of a first block and a second prediction mode of a previous second block, according to an embodiment.

FIG. 4A is a flowchart of a process of determining a second prediction mode of a current second block, based on a first prediction mode of a first block and a second prediction mode of a previous second block, according to an embodiment.

In one embodiment, operations S400 to S404 performed by the video decoding apparatus 100 may be substantially the same as operations S200 to S204 of FIG. 2A and are thus not described here again.

In one embodiment, in operation S406, the decoder 120 may determine a reference direction of prediction to be used for a current second block, based on a direction of prediction determined according to first intra-prediction mode information and second intra-prediction mode information related to a previous second block. In one embodiment, the decoder 120 may perform decoding by determining an order in which a plurality of second blocks included in a current first block are to be processed. The order in which the plurality of second blocks are to be performed may be a predetermined order, and may vary according to the shapes of the plurality of second blocks included in the current first block. For example, when the plurality of second blocks are obtained by partitioning the current first block by the same numbers of rows and columns, the plurality of second blocks may be processed in a Z-scan order. When the plurality of second blocks are obtained by partitioning the current first block in a row or column direction, the plurality of second blocks may be processed in a direction perpendicular to the direction in which the current first block is partitioned. In one embodiment, the decoder 120 may determine a second prediction mode of a current second block by using a direction of prediction related to a processed previous second block, based on the determined order in which the plurality of second blocks are to be processed.

In one embodiment, in operation S408, the video decoding apparatus 100 may determine a prediction mode using one of a plurality of directions of prediction, including the reference direction of prediction, to be a second prediction mode of the current second block, based on second intra-prediction mode information obtained in relation to the current second block.

In one embodiment, in operation S410, the video decoding apparatus 100 may decode a video by performing intra-prediction based on a first prediction mode and the second prediction mode.

Figure 4B:
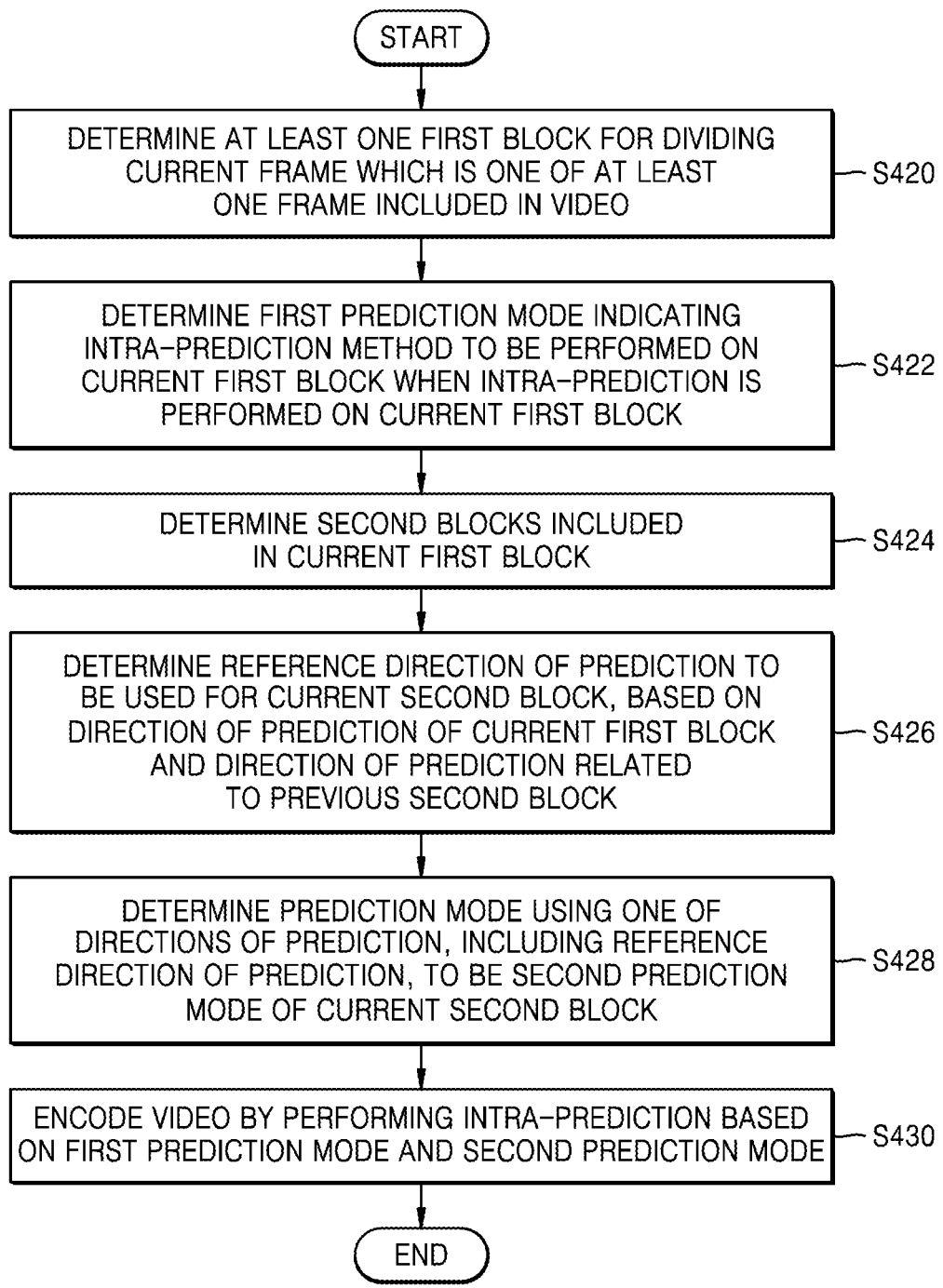
FIG. 4B is a flowchart of a process of determining a second prediction mode of a current second block, based on a first prediction mode of a first block and a second prediction mode of a previous second block, according to another embodiment.
Figure 4C:
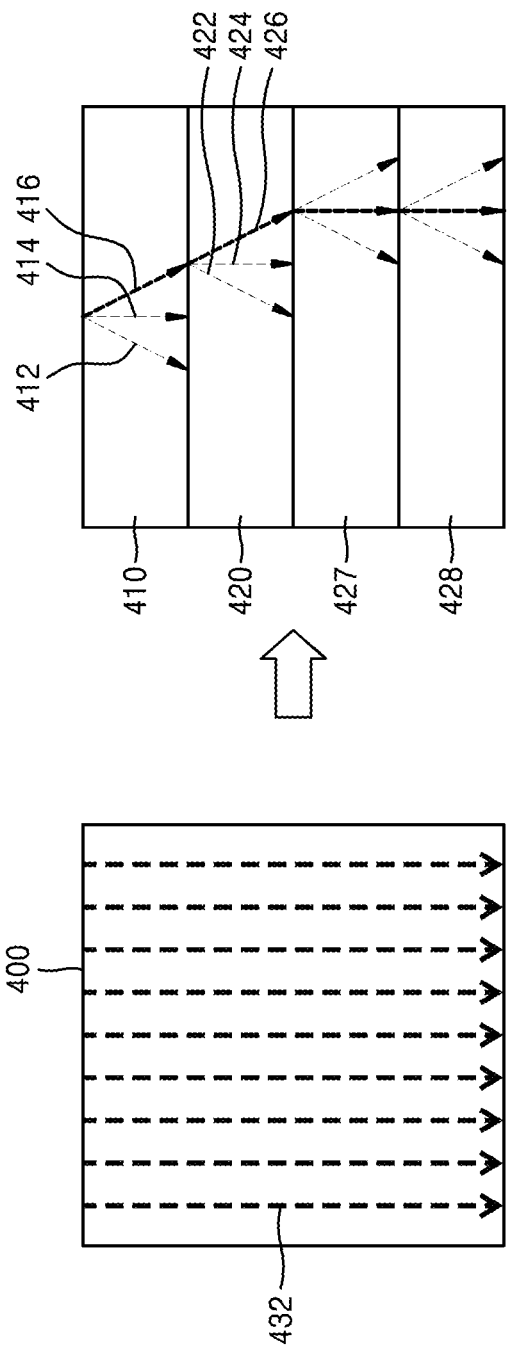
FIG. 4C illustrates a process of determining a direction of prediction available in performing intra-prediction on a current second block, based on a direction of prediction according to a first prediction mode, according to an embodiment.

FIG. 4C illustrates a process of determining a direction of prediction available in intra-predicting a current second block, based on a direction of prediction according to a first prediction mode, according to an embodiment.

Referring to FIG. 4C, the bitstream obtainer 110 of the video decoding apparatus 100 may determine a direction of prediction of an intra-prediction mode to be performed on a current first block 400 by using first intra-prediction mode information obtained from a bitstream related to the current first block 400. The decoder 120 may determine a plurality of second blocks included in the current first block 400. Furthermore, the decoder 120 may determine second prediction modes of the plurality of second blocks included in the current first block 400. The second prediction modes of the plurality of second blocks may include a plurality of types of second prediction modes. The decoder 120 may determine second prediction modes of the plurality of second blocks according to an order in which the plurality of second blocks are to be processed.

Referring to FIG. 4C, the bitstream obtainer 110 of the video decoding apparatus 100 may obtain second intra-prediction mode information from a bitstream related to a second block 410 which is one of the plurality of second blocks included in the current first block 400. The decoder 120 may determine a second prediction mode using one of a plurality of directions 412, 414, and 416 as a direction of prediction, based on the second intra-prediction mode information of the second block 410. The direction of prediction 414 which is the same as the direction of prediction of the current first block 400 may be included as one of directions of prediction available as reference directions of prediction of an intra-prediction mode of the second block 410. Thus, the decoder 120 may determine a second prediction mode by determining one of the directions of prediction, including the reference direction of prediction which is the direction of prediction of the first block 400, to be a direction of prediction of a second block, based on the second intra-prediction mode information of the second block 410. In one embodiment, the decoder 120 may use, as a reference direction of prediction, the direction of prediction of the current first block 400 serving as a reference direction for determining directions of prediction of a plurality of second blocks 410, 420, 427, and 428 included in the current first block 400. A process of determining one of a plurality of directions of prediction to be a direction of prediction of a second prediction mode of a second block by using a reference direction of prediction, performed by the decoder 120, may be substantially the same as the above-described method of using an index corresponding to a direction of prediction and thus is not described in detail here.

Figure 4D:
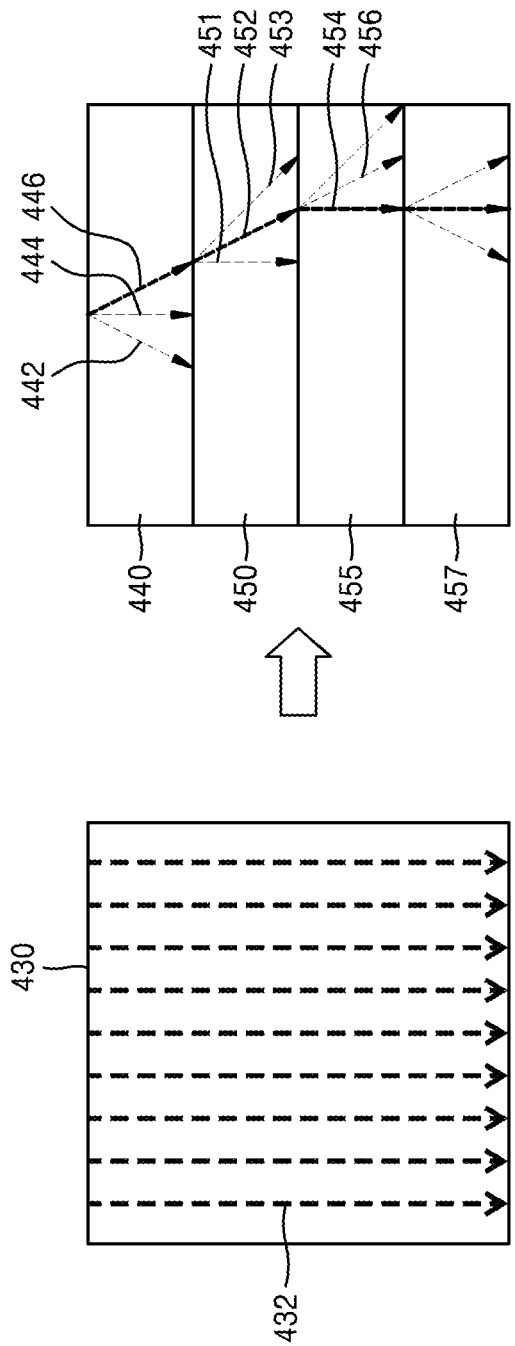
FIG. 4D illustrates a process of determining a direction of prediction available in performing intra-prediction on a current second block, based on a direction of prediction according to a first prediction mode and a direction of prediction of a previous second block, according to an embodiment.

FIG. 4D illustrates a process of determining a direction of prediction available in intra-predicting a current second block, based on a direction of prediction according to a first prediction mode and a direction of prediction of a previous second block, according to an embodiment.

In one embodiment, the bitstream obtainer 110 of the video decoding apparatus 100 may determine a direction of prediction 432 for an intra-prediction mode to be performed on a current first block 430 by using first intra-prediction mode information obtained from a bitstream related to the current first block 430.

Referring to FIG. 4D, the bitstream obtainer 110 of the video decoding apparatus 100 may obtain second intra-prediction mode information from a bitstream related to a second block 440 which is one of a plurality of second blocks included in the current first block 430. The decoder 120 may determine a second prediction mode using one of a plurality of directions 442, 444, and 446 to be a direction of prediction, based on the second intra-prediction mode information of the second block 440. The direction of prediction 444 which is the same as the direction of prediction 432 of the current first block 430 may be included as one of directions of prediction available as reference directions of prediction of an intra-prediction mode of the second block 440. Thus, the decoder 120 may determine a second prediction mode by determining one of a plurality of directions of prediction, including the reference direction of prediction which is the direction of prediction 432 of the first block 430, to be a direction of prediction of a second block, based on the second intra-prediction mode information of the second block 440. In one embodiment, the decoder 120 may determine a second prediction mode referring to a reference sample located in the direction of prediction 446 other than the reference direction of prediction 444, based on the second intra-prediction mode information.

In one embodiment, in order to determine directions of prediction of a plurality of second blocks 440, 450, 455, and 457 included in the current first block 430, the decoder 120 may not consistently use the direction of prediction 432 of the current first block 430 as a reference direction of prediction but may use a direction of prediction of another processed second block as a reference direction of prediction. The decoder 120 may determine the direction of prediction 446 of the previous second block 440, and may use the direction of prediction 446 of the previous second block 440 to determine a direction of prediction of the current second block 450 to be subsequently processed. In one embodiment, the decoder 120 may determine a direction of prediction of the current second block 450 by referring to an index of an intra-prediction mode using the direction of prediction 446 of the previous second block 440. In this case, the direction of prediction 446 of the previous second block 440 may be used as a reference direction of prediction of the current second block 450.

Referring to FIG. 4D, the decoder 120 may determine a second prediction mode by determining one of a plurality of directions of prediction 451, 452, and 453, including a direction of prediction which is the same as the direction of prediction 446 of the previous second block 440 of the current second block 450, to be a direction of prediction to be used for intra-prediction. That is, the decoder 120 may use different reference directions of prediction to determine a second prediction mode of the previous second block 440 and a second prediction mode of the current second block 450. Thus, even if the bitstream obtainer 110 obtains the same second intra-prediction mode information from a bitstream of the previous second block 440 and the current second block 450, the decoder 120 may use different reference directions of prediction for the previous second block 440 and the current second block 450 and thus may use a combination of various directions of prediction during a process of determining second prediction modes. Referring to FIG. 4D, a combination of the directions of prediction 442, 444, and 446 available for the previous second block 440 and a combination of the directions of prediction 451, 452, and 453 available for the current second block 450 are different. In one embodiment, the decoder 120 may determine a second prediction mode by selecting one among the directions of prediction 451, 452, and 453 available for the current second block 450, based on the second intra-prediction mode information and the reference direction of prediction 452.

In one embodiment, in order to determine a combination of directions of prediction of the second block 455 to be processed after the current second block 450, the decoder 120 may perform a process similar to the process of determining the combination of the directions of prediction of the current second block 450 based on the direction of prediction 446 of the previous second block 440. Thus, the decoder 120 may determine a reference direction of prediction 456 of the second block 455 to be processed after the current second block 450 based on the direction of prediction 452 of the current second block 450, and determine a combination of available directions of prediction based on the reference direction of prediction 456. Furthermore, a second prediction mode for performing intra-prediction may be determined using a direction of prediction 454 among a plurality of directions of prediction, including the reference direction of prediction 456, based on second intra-prediction mode information of the second block 455 to be processed after the current second block 450.

Figure 4E:
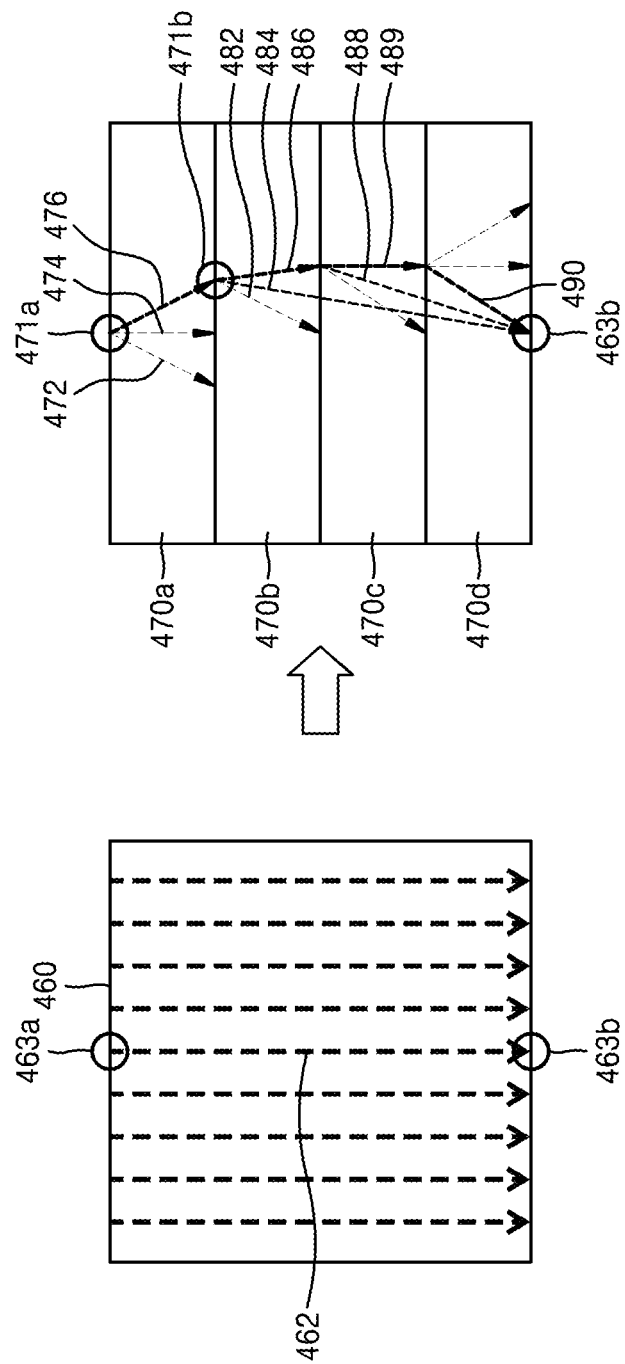
FIG. 4E illustrates a process of determining a reference direction of prediction available for each of second blocks, based on a direction of prediction of a first block, according to an embodiment.

FIG. 4E illustrates a process of determining a reference direction of prediction of each of second blocks, based on a direction of prediction of a first block, according to an embodiment.

In one embodiment, the bitstream obtainer 110 of the video decoding apparatus 100 may determine a direction of prediction 462 of an intra-prediction mode to be performed on a current first block 460 by using first intra-prediction mode information obtained from a bitstream related to the current first block 460. Furthermore, the decoder 120 may determine a reference direction of prediction of a plurality of second blocks included in the current first block 460 by using the direction of prediction 462 of the current first block 460.

Referring to FIG. 4E, the bitstream obtainer 110 of the video decoding apparatus 100 may obtain second intra-prediction mode information from a bitstream related to a second block 470a which is one of the plurality of second blocks included in the current first block 460. The decoder 120 may determine a second prediction mode using one of a plurality of directions 472, 474, and 476 to be a direction of prediction, based on the second intra-prediction mode information of the second block 470a. The direction of prediction 474 which is the same as the direction of prediction 462 of the current first block 460 may be included as one of directions of prediction available as reference directions of prediction of an intra-prediction mode of the second block 470a. Thus, the decoder 120 may determine the second prediction mode by determining one of a plurality of directions of prediction, including the reference direction of prediction which is the direction of prediction 462 of the first block 460, to be a direction of prediction of a second block, based on the second intra-prediction mode information of the second block 470a.

In one embodiment, the decoder 120 may determine different reference directions of prediction to be used for the plurality of second blocks. For convenience of explanation of one embodiment related to FIG. 4E, a plurality of second blocks 470a, 470b, 470c, and 470d included in the current first block 460 will be referred to respectively as a block A, a block B, a block C, and a block D below. In one embodiment, the decoder 120 may determine second prediction modes in the order of the block A, the block B, the block C, and the block D.

In one embodiment, the decoder 120 may determine a second prediction mode, based on the reference direction of prediction 474 which is one of the directions of prediction 472, 474, and 476 available in intra-predicting the block A 470a. A reference direction of prediction of the block A 470a, the direction of prediction of which is to be first determined among the plurality of second blocks may be the same as the direction of prediction 462 of the current first block 460. In one embodiment, the decoder 120 may determine a second prediction mode to perform intra-prediction by selecting the direction of prediction 476 from among the directions of prediction 472, 474, and 476, based on second intra-prediction mode information obtained in relation to the block A 470a.

In one embodiment, the decoder 120 may determine a second prediction mode by using a plurality of directions of prediction 482, 484, and 486, including a reference direction of prediction of the block B 470b. The decoder 120 may consider at least one among a prediction start point 463a and a prediction end point 463b determined according to the direction of prediction 462 of the current first block 460, a size of the block B 470b, and a location of the block B 470b on the current first block 460 so as to determine the direction of prediction 462 of the current first block 460 and the reference direction of prediction of the block B 470b. In one embodiment, the decoder 120 may determine the same point as the prediction start point 463a on the first block 460 to be a prediction start point 471a on the block A 470a, and determine a prediction end point 471b on the block A 470a based on a direction of prediction and the prediction start point 471a of the block A 470a. In one embodiment, the terms "prediction start point" and "prediction end point" may be defined as a point on a block at which prediction is started and a point on the block at which the prediction is ended in a direction of prediction during directional intra-prediction performed on the block by the video decoding apparatus 100.

In one embodiment, the decoder 120 may use the prediction end point 471b determined based on the direction of prediction 476 of the block A 470a as a prediction start point on the block B 470b, and determine the reference direction of prediction 484 of the block B 470b based on the prediction start point on the block B 470b and the prediction end point 463b on the first block 460. The decoder 120 may determine the reference direction of prediction 484 of the block B 470b, based on the position of the prediction start point on the block B 470b on the current first block 460 and the prediction end point 463b of the first block 460. That is, a direction from the prediction start point on the block B 470b on the current first block 460 to the prediction end point 463b on the current first block 460 may be determined as a reference direction of prediction of the block B 470b. Thus, the video decoding apparatus 100 may determine a second prediction mode of a second block by considering a direction of prediction of the current first block 460. In one embodiment, the decoder 120 may determine one of directions of prediction, which include a reference direction of prediction 489 of the block C 470c and be determined by a method similar to the above-described method, to be a direction of prediction 488 of the block C 470c, and determine a second prediction mode of the block C 470c in the determined direction of prediction. Furthermore, the decoder 120 may determine one of directions of prediction, which include a reference direction of prediction 490 of the block D 470d and be determined by a method similar to the above-described method, to be a direction of prediction of the block D 470d, and determine a second prediction mode of the block D 470d according to the determined direction of prediction. Referring to FIG. 4E, the decoder 120 may determine the reference direction of prediction 490 to be a direction of prediction of the block D 470d, based on the obtained second intra-prediction mode information.

In one embodiment, the video decoding apparatus 100 may skip a process of obtaining second intra-prediction mode information related to the second block 470d to be lastly processed among the plurality of second blocks 470a, 470b, 470c, and 470d from a bitstream during a process of determining a reference direction of prediction of each of second blocks by using a prediction end point on a first block and a prediction start point on each of the second blocks. Thus, the video decoding apparatus 100 may determine a prediction mode of performing intra-prediction according to the reference direction of prediction 490 of the block D 470d to be a second prediction mode rather than determining a direction of prediction of the second block 470d based on second intra-prediction mode information. Accordingly, the video decoding apparatus 100 may effectively use a bandwidth of the bitstream.

However, the shapes of the first and second blocks, the directions of prediction, etc. illustrated in FIGS. 4C, 4D, and 4E are merely examples provided to explain that second prediction modes of second blocks may be determined based on a direction of prediction of a first block according to the flowchart of FIG. 4A, and thus embodiments should not be construed as being limited thereto.

Figure 5A:
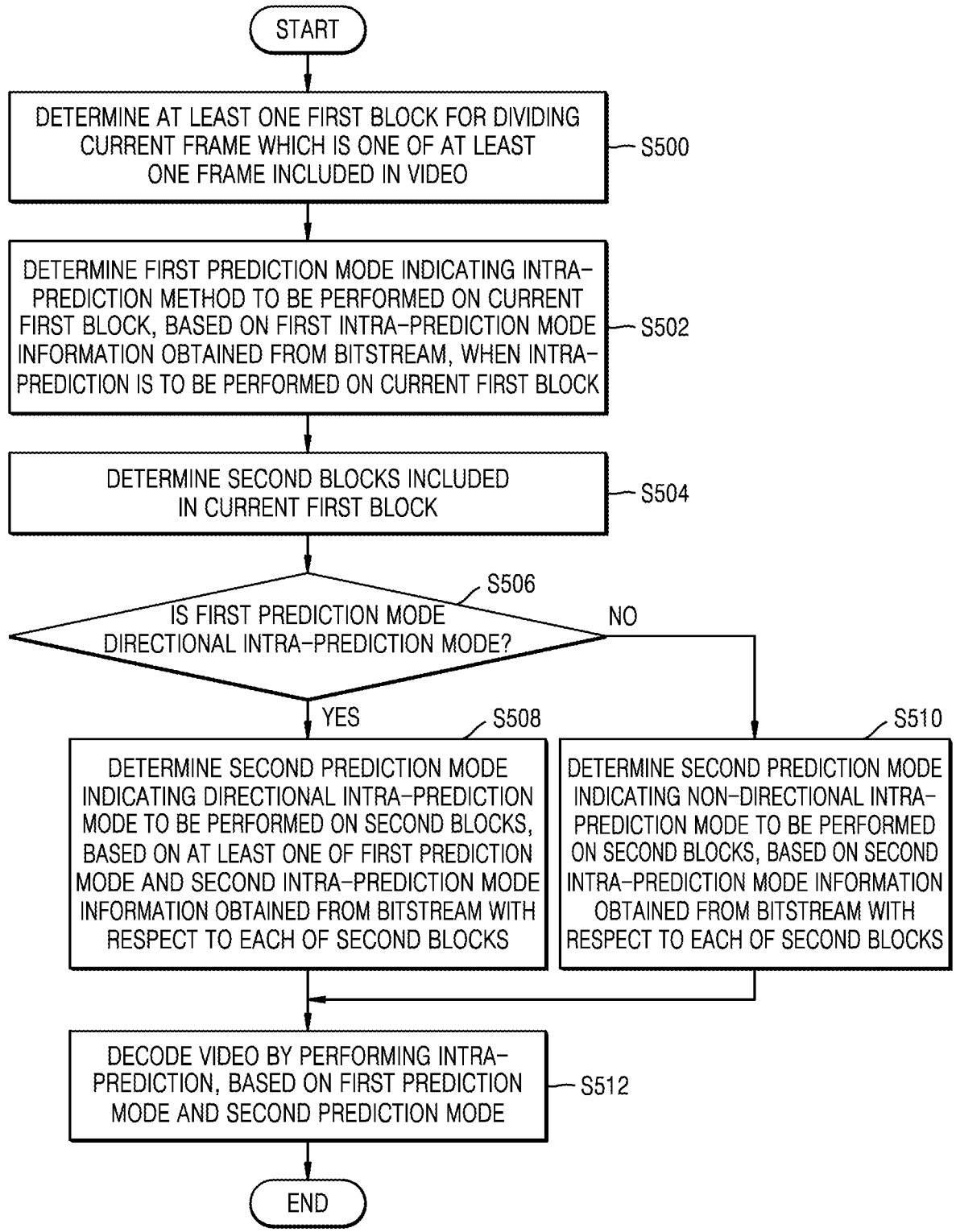
FIG. 5A is a flowchart of a process of determining second prediction modes of second blocks, based on whether directional intra-prediction is to be performed on a current first block, according to an embodiment.

FIG. 5A is a flowchart of a process of determining second prediction modes of second blocks, based on whether directional intra-prediction is to be performed on a current first block, according to an embodiment.

In one embodiment, operations S500 to S504 performed by the video decoding apparatus 100 may be substantially the same as operations S200 to S204 of FIG. 2A and thus are not described in detail here.

In operation S506, the video decoding apparatus 100 may determine whether a first prediction mode determined in operation S502 is a directional intra-prediction mode or not. The directional intra-prediction mode may be an intra-prediction mode in which prediction using reference samples adjacent to a first block is performed in a specific direction related to an index of the intra-prediction mode. In contrast, a non-directional intra-prediction mode may be intra-prediction mode in which intra-prediction is performed using the reference samples adjacent to the first block but is not performed in a specific direction. In one embodiment, examples of the non-directional intra-prediction mode may include a DC mode, a planar mode, etc. An example of the directional intra-prediction mode may include an angular mode in which various directions of prediction are available.

In one embodiment, the video decoding apparatus 100 may determine whether a prediction mode performed on the first block is the directional intra-prediction mode, based on first intra-prediction mode information obtained by the bitstream obtainer 110. In one embodiment, the first intra-prediction mode information may be information including an index identifying an intra-prediction mode.

In one embodiment, in operation S508, when the first prediction mode is determined to be the directional intra-prediction mode, the decoder 120 may determine second prediction modes indicating directional intra-prediction modes to be performed on a plurality of second blocks, based on second intra-prediction mode information regarding the plurality of second blocks. That is, when a first prediction mode of a first block including the plurality of second blocks is the directional intra-prediction mode, the directional intra-prediction mode may be determined to be a second prediction mode based on the second intra-prediction mode information of the second blocks.

In one embodiment, in operation S510, when the first prediction mode is determined to be the non-directional intra-prediction mode, the decoder 120 may determine a second prediction mode indicating the non-directional intra-prediction mode to be performed on the plurality of second blocks, based on the second intra-prediction mode information of the plurality of second blocks. That is, when the first prediction mode of the first block including the plurality of second blocks is the non-directional intra-prediction mode, the directional intra-prediction mode may be determined to be the second prediction mode, based on the second intra-prediction mode information of the plurality of second blocks. Accordingly, even if second intra-prediction mode information obtained by the video decoding apparatus 100 is the same as the second intra-prediction mode information used in operation S508, second prediction modes of the plurality of second blocks may be determined to be different prediction modes.

In operation S512, the video decoding apparatus 100 may decode a video by performing intra-prediction based on at least one of the first prediction mode determined in operation S502 and the second prediction mode determined in operation S508 or S510.

Figure 6:
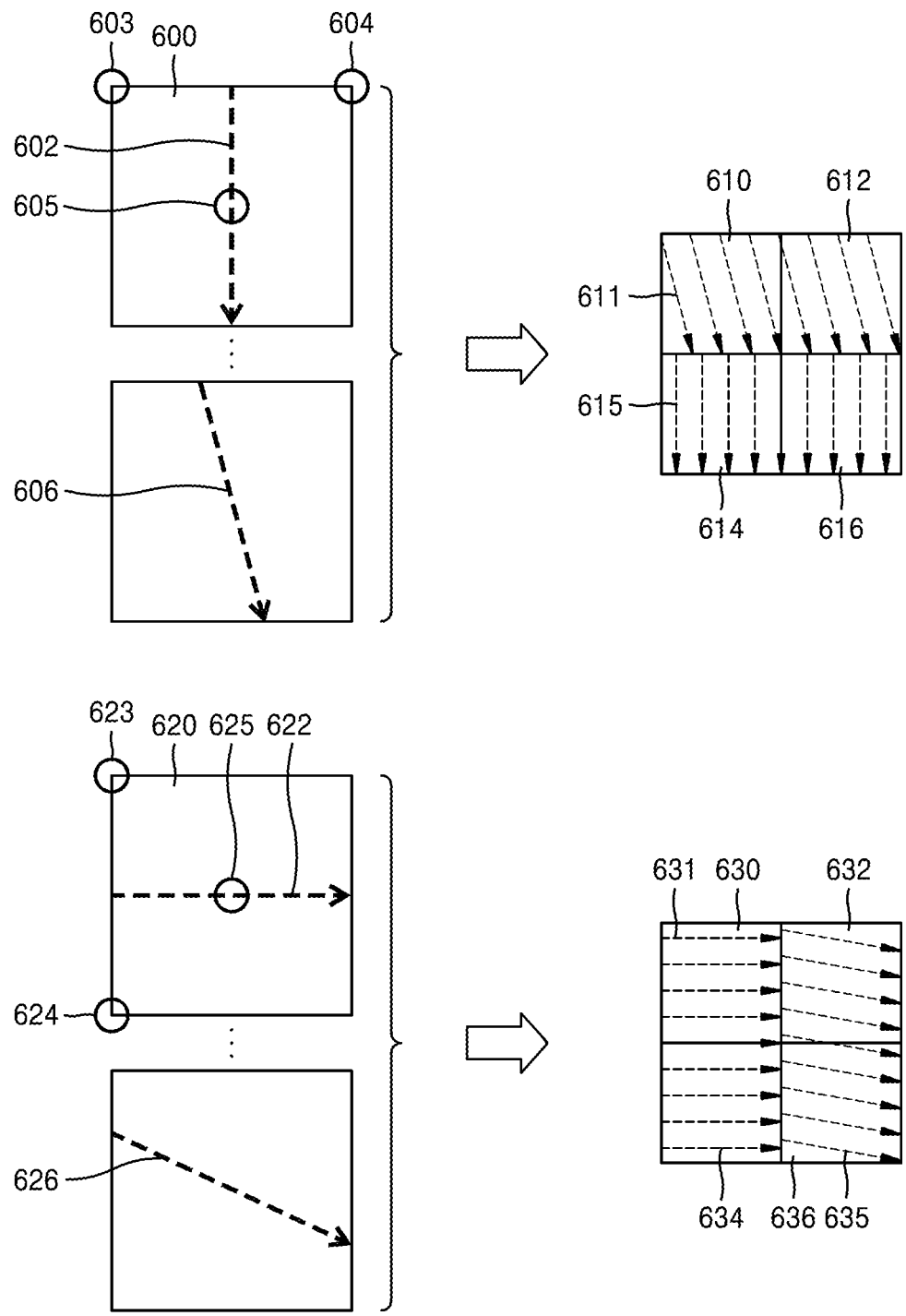
FIG. 6 illustrates a process of determining a second prediction mode, based on rows or columns of second blocks partitioned from a first block, according to an embodiment.

FIG. 6 illustrates a process of determining a second prediction mode, based on rows or columns of second blocks partitioned from a first block, according to an embodiment.

Referring to FIG. 6, in one embodiment, the video decoding apparatus 100 may determine second prediction modes of plurality of second blocks 610, 612, 614, and 616 included in a first block 600, based on a direction of prediction of the first block 600. In this case, the second prediction modes of the plurality of second blocks 610, 612, 614, and 616 may be determined based on positions of the plurality of second blocks 610, 612, 614, and 616 on the first block 600. In one embodiment, directions of prediction 602, 606, etc. in which prediction is performed may be determined according to a first prediction mode of the first block 600. The plurality of second blocks 610, 612, 614, and 616 included in the first block 600 may be determined by partitioning a height and width of the first block 600.

In one embodiment, second prediction modes of second blocks in the same column or row among the plurality of second blocks 610, 612, 614, and 616 included in the first block 600 may be determined to be the same. Referring to FIG. 6, the decoder 120 may determine directions of prediction 611 of second blocks 610 and 612 in a first row of the first block 600 to be the same, and directions of prediction 615 of second blocks 614 and 616 in a second row of the first block 600 to be the same. In another embodiment, the decoder 120 may determine directions of prediction 631 of second blocks 630 and 634 in a first column of a first block 620 to be the same, and directions of prediction 635 of second blocks 632 and 636 in a second column of the first block 620 to be the same. A process of determining a second prediction mode of each of the second blocks may be performed by the video decoding apparatus 100 according to the various embodiments described above.

In one embodiment, the decoder 120 may determine second prediction modes of second blocks in the same row or column to be the same, based on whether a direction of prediction corresponding to a first prediction mode of the first block is similar to a vertical direction or a horizontal direction. In one embodiment, the decoder 120 may determine that the direction of prediction corresponding to the first prediction mode is similar to the vertical direction when the direction of prediction of the first block is a direction of prediction referring to reference samples adjacent to an upper left point 603 to an upper right point 604 on a border line of the first block with respect to a center of the first block. In one embodiment, the decoder 120 may determine that the direction of prediction corresponding to the first prediction mode is similar to the horizontal direction when the direction of prediction of the first block is a direction of prediction referring to reference samples adjacent to an upper left point 623 to a lower left point 624 on a border line of the first block with respect to a center 625 of the first block.

In one embodiment, when the direction of prediction corresponding to the first prediction mode of the first block is similar to the vertical direction, the decoder 120 may determine that second prediction modes of second blocks in the same row are the same. In one embodiment, when the direction of prediction corresponding to the first prediction mode of the first block is similar to the horizontal direction, the decoder 120 may determine that second prediction modes of second blocks in the same column are the same. In one embodiment, the video decoding apparatus 100 may determine second prediction modes of second blocks in the same row or column, based on second intra-prediction mode information of the second blocks in the same row or column. The decoder 120 may determine second prediction modes of all the second blocks in the same row or column, based on the second intra-prediction mode information of one of the second blocks in the same row or column. In another embodiment, the decoder 120 may determine second prediction modes of all the second blocks in the same row or column, based on a result of performing processing on the second intra-prediction mode information of at least one among the second blocks in the same row or column (e.g., a result of performing an arithmetic operation on an index of an intra-prediction mode related to the second intra-prediction mode information of at least one among the second blocks (e.g., an average, a weighted average, or the like)).

Figure 7:
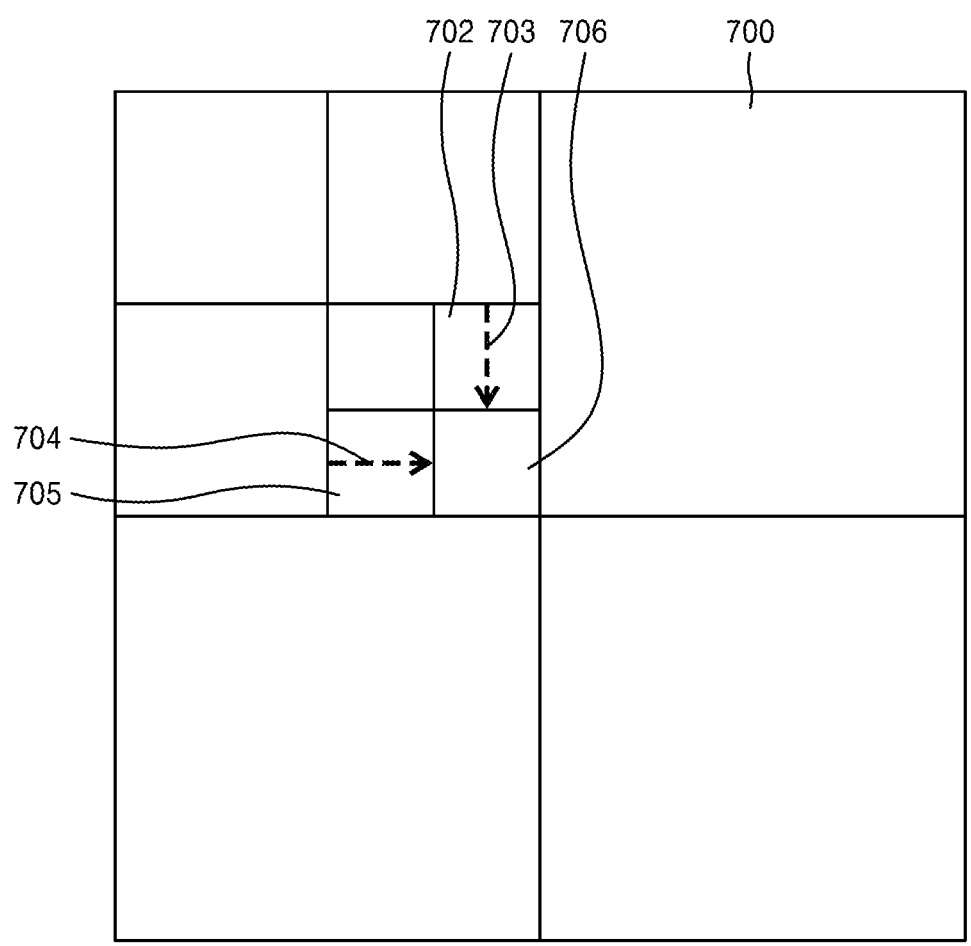
FIG. 7 is a process of using prediction modes of neighboring blocks to determine a prediction mode of a current first block or a current second block, according to an embodiment.

FIG. 7 is a process of using prediction modes of neighboring blocks to determine a prediction mode of a current first or second block, according to an embodiment.

In one embodiment, the video decoding apparatus 100 may use first intra-prediction mode information or second intra-prediction mode information to determine a first prediction mode of a first block included in a current frame 700 or a second prediction mode of a second block included in the current frame 700. The first intra-prediction mode information or the second intra-prediction mode information may directly indicate an index of an intra-prediction mode of the first or second block. Alternatively, in one embodiment, the video decoding apparatus 100 may determine an intra-prediction mode of a current first or second block based on intra-prediction modes of neighboring blocks. In this case, the first intra-prediction mode information or the second intra-prediction mode information may include information indicating a neighboring block, the intra-prediction mode of which is to be used among neighboring blocks of the first or second block.

In one embodiment, when the first intra-prediction mode information or the second intra-prediction mode information is 11, an intra-prediction mode of a first or second neighboring block adjacent to a left side of the current first or second block may be determined to be a first or second prediction mode. In one embodiment, when the first or second intra-prediction mode information is 00, an intra-prediction mode of a first or second neighboring block adjacent to an upper side of the current first or second block may be determined to be a first or second prediction mode. In one embodiment, when the first or second intra-prediction mode information is 01, a prediction mode which is different from an intra-prediction mode of the first neighboring block or the second neighboring blocks adjacent to the left or upper side of the current first or second block may be determined to be a first or second prediction mode. For convenience of explanation, the current first or second block will be referred to as a current block and the first or second intra-prediction mode information will be referred to as intra-prediction mode information in relation to a process of determining an intra-prediction mode of the current first or second block by using intra-prediction modes of neighboring blocks to be described below.

Referring to FIG. 7, an intra-prediction mode of a neighboring block 702 or 704 adjacent to a current block 706 may be referred to determine an intra-prediction mode of the current block 706. For example, when the intra-prediction mode information of the current block 706 is 00, the decoder 120 may determine an intra-prediction mode using a direction of prediction 703 of the neighboring block 702 adjacent to an upper side of the current block 706 to be a prediction mode of the current block 706. When the intra-prediction mode information of the current block 706 is 11, the decoder 120 may determine an intra-prediction mode using a direction of prediction 705 of the neighboring block 704 adjacent to a left side of the current block 706 to be a prediction mode of the current block 706.

In another embodiment, when the intra-prediction mode information of the current block 706 is 01 or 10, the decoder 120 may determine an intra-prediction mode obtained from a combination of the direction of prediction 703 of the neighboring block 702 adjacent to the upper side of the current block 706 and the direction of prediction 705 of the neighboring block 704 adjacent to the left side of the current block 706 to be a prediction mode of the current block 706. For example, an intra-prediction mode of an index approximating an average of an index of an intra-prediction mode related to the direction of prediction 703 of the neighboring block 702 adjacent to the upper side of the current block 706 and an index of an intra-prediction mode related to the direction of prediction 705 of the neighboring block 704 adjacent to the left side of the current block 706 may be determined to be a prediction mode of the current block 706. In one embodiment, the intra-prediction mode of the neighboring block 702 or 704 may be the directional intra-prediction mode or the non-directional intra-prediction mode.

In one embodiment, in order to determine intra-prediction modes of a current first block and a current second block, the video decoding apparatus 100 may determine a first prediction mode by using an intra-prediction mode of a first neighboring block adjacent to the current first block and determine a second prediction mode by using an intra-prediction mode of a second neighboring block adjacent to the current second block. In another embodiment, in order to determine intra-prediction modes of the current first and second blocks, the video decoding apparatus 100 may determine a first prediction mode by using the intra-prediction mode of the first neighboring block adjacent to the current first block and determine a second prediction mode based on an index of an intra-prediction mode indicated by second intra-prediction mode information of the current second block. In another embodiment, in order to determine intra-prediction modes of the current first and second blocks, the video decoding apparatus 100 may determine a first prediction mode based on an index of an intra-prediction mode indicated by first intra-prediction mode information of the current first block and determine a second prediction mode by using an intra-prediction mode of a second neighboring block adjacent to the current second block.

The above-described embodiments are merely examples provided to explain features of intra-prediction modes of neighboring blocks adjacent to the current first or second block referred to by the video decoding apparatus 100, and thus the present disclosure should not be construed as being limited to the first and second intra-prediction modes described above in these embodiments. In various embodiments using intra-prediction mode information of neighboring blocks, a method similar to a method of determining a prediction mode using an mpm index, the method being employed in various intra-prediction methods, may be used.

Figure 8:
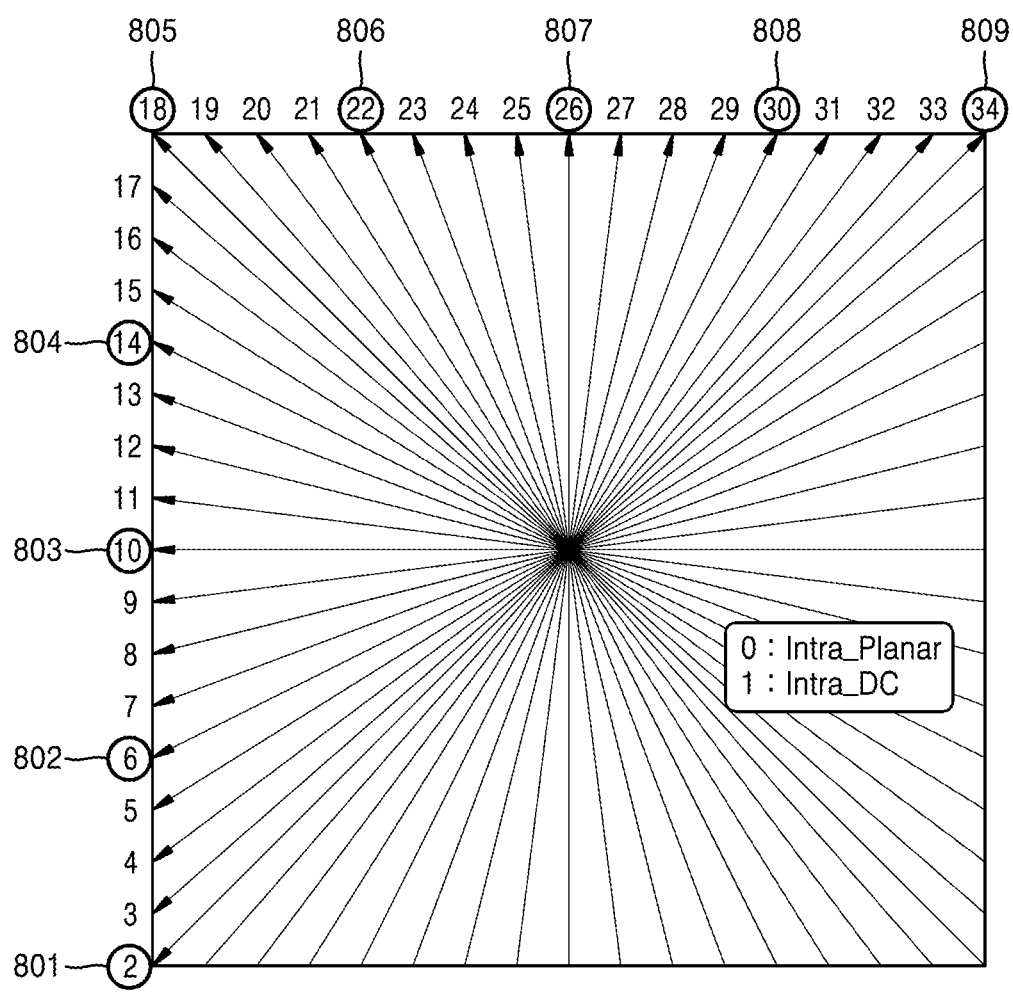
FIG. 8 illustrates various directions of prediction and various indexes available in an intra-prediction mode, according to an embodiment.

FIG. 8 illustrates various directions of prediction and various indexes available in an intra-prediction mode, according to an embodiment.

In one embodiment, the number of intra-prediction modes available in a first prediction mode of a current first block and the number of intra-prediction modes available in a second prediction mode of a current second block may be different. In one embodiment, the number of intra-prediction modes available in the first prediction mode of the current first block may be M, and the number of intra-prediction modes available in the second prediction mode of the current second block may be N (here, M and N are different). In one embodiment, the use of different numbers of intra-prediction modes in the first and second prediction modes is applicable to not only when the directional intra-prediction mode is used but also when the non-directional intra-prediction mode is used. For convenience of explanation, the use of different numbers of intra-prediction modes in the first and second prediction modes will be described with respect to a process of determining a first prediction mode and a second prediction mode which are directional intra-prediction modes, performed by the decoder 120.

Referring to FIG. 8, the decoder 120 may determine a first prediction mode or a second prediction mode by determining an index of an intra-prediction mode based on first intra-prediction mode information or second intra-prediction mode information. The decoder 120 may determine an intra-prediction mode using one of indexes indicating thirty-three directions of prediction to be a second prediction mode based on the second intra-prediction mode information. In one embodiment, the decoder 120 may determine a directional intra-prediction mode using one of indexes 801, 802, 803, 804, 805, 806, 807, 808, and 809 indicating nine directions of prediction to be the first prediction mode based on the first intra-prediction mode information, unlike a process of determining the second prediction mode. In one embodiment, the nine directions of prediction considered in determining the first prediction mode may be part of the thirty-three directions of prediction considered in determining the second prediction mode.

Figure 9A:
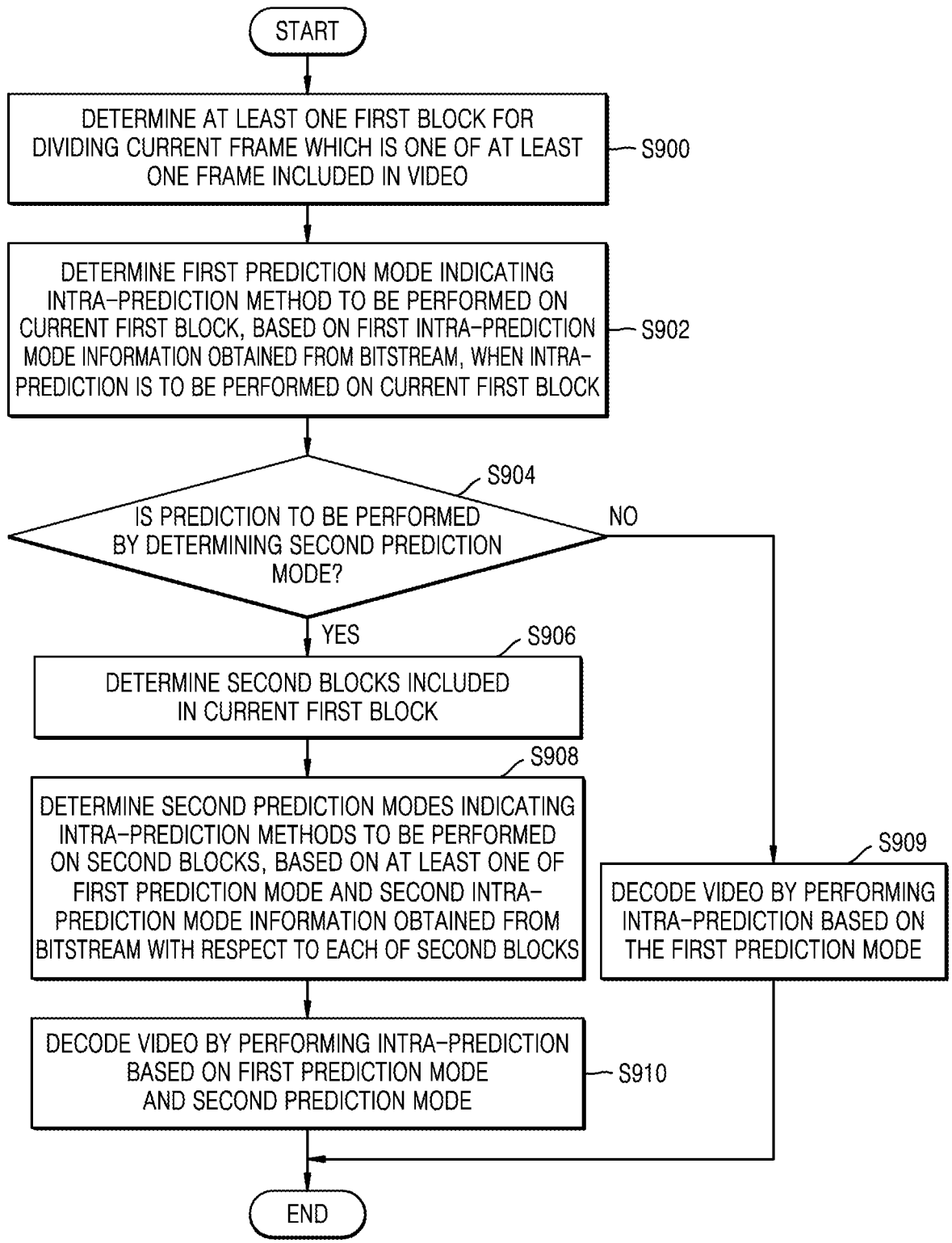
FIG. 9A is a flowchart of a process of performing prediction by determining whether a process of determining a second prediction mode of a second block is to be performed, according to an embodiment.

FIG. 9A is a flowchart of a process of performing prediction by determining whether a process of determining a second prediction mode of a second block is to be performed, according to an embodiment.

In one embodiment, operations S900 to S902 performed by the video decoding apparatus 100 may be substantially the same as operations S200 to S202 of FIG. 2A and thus are not described in detail here.

In one embodiment, in operation S904, the decoder 120 may determine whether prediction is to be performed by determining a second prediction mode, as well as a first prediction mode. In one embodiment, the bitstream obtainer 110 may obtain a flag indicating whether prediction is to be performed by determining a second prediction mode from a bitstream. The bitstream obtainer 110 may obtain the flag indicating whether prediction is to be performed by determining the second prediction mode in units of certain data units (e.g., sequences, frames, slices, slice segments, largest coding units, or coding units) from the bitstream.

In one embodiment, in operation S909, when it is determined that prediction is to be performed using only the first prediction mode, the decoder 120 may decode a video by performing intra-prediction based on the first prediction mode.

In one embodiment, in operation S906, when it is determined that prediction is to be performed by determining the second prediction mode, as well as the first prediction mode, the decoder 120 may determine a plurality of second blocks included in a current first block. In one embodiment, the bitstream obtainer 110 may obtain the flag indicating whether prediction is to be performed by determining the second prediction mode from the bitstream, and the decoder 120 may determine whether prediction is to be performed by determining the second prediction mode, as well as the first prediction mode, based on this flag.

Operations S908 and S910 performed by the video decoding apparatus 100 may be substantially the same as operations S206 to S208 of FIG. 2A and thus are not described in detail here.

The various embodiments described above in relation to the video decoding apparatus 100 may be performed as individual embodiments but various combinations thereof may be performed.

A video encoding apparatus 150 capable of performing a video encoding method related to the above-described video decoding method performed by the video decoding apparatus 100 will be described below.

Figure 1B:
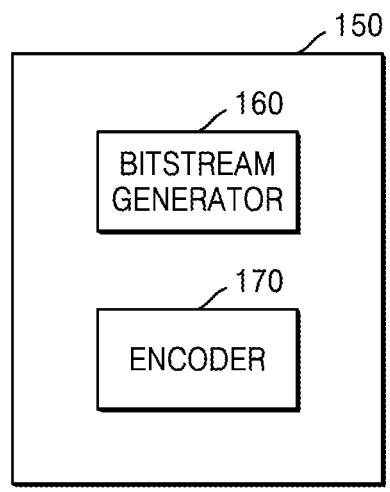
FIG. 1B is a block diagram of a video encoding apparatus capable of determining prediction modes of a plurality of second blocks included in a current first block, based on a prediction.

FIG. 1B is a block diagram of the video encoding apparatus 150 capable of determining prediction modes of a plurality of second blocks included in a current first block, based on a prediction mode of the current first block.

In one embodiment, the video encoding apparatus 150 may include a bitstream generator 160 configured to generate a bitstream including first intra-prediction mode information indicating an intra-prediction mode of a first block and second intra-prediction mode information indicating an intra-prediction mode of a second block, and an encoder 170 configured to encode a video by determining the first block and the second block included in a current frame which is one of at least one frame of the video and determining a first prediction mode which is a method of intra-predicting the first block and a second prediction mode which is a method of intra-predicting the second block. In one embodiment, the second prediction mode may be determined based on the first prediction mode in relation to the first intra-prediction mode information and the second intra-prediction mode information. In one embodiment, the encoder 170 may intra-predict the second block based on an intra-prediction mode used to intra-predict the first block, and the bitstream generator 160 may generate a bitstream including the first intra-prediction mode information indicating the intra-prediction mode performed on the first block and the second intra-prediction mode information indicating the intra-prediction mode performed on the second block.

Figure 2B:
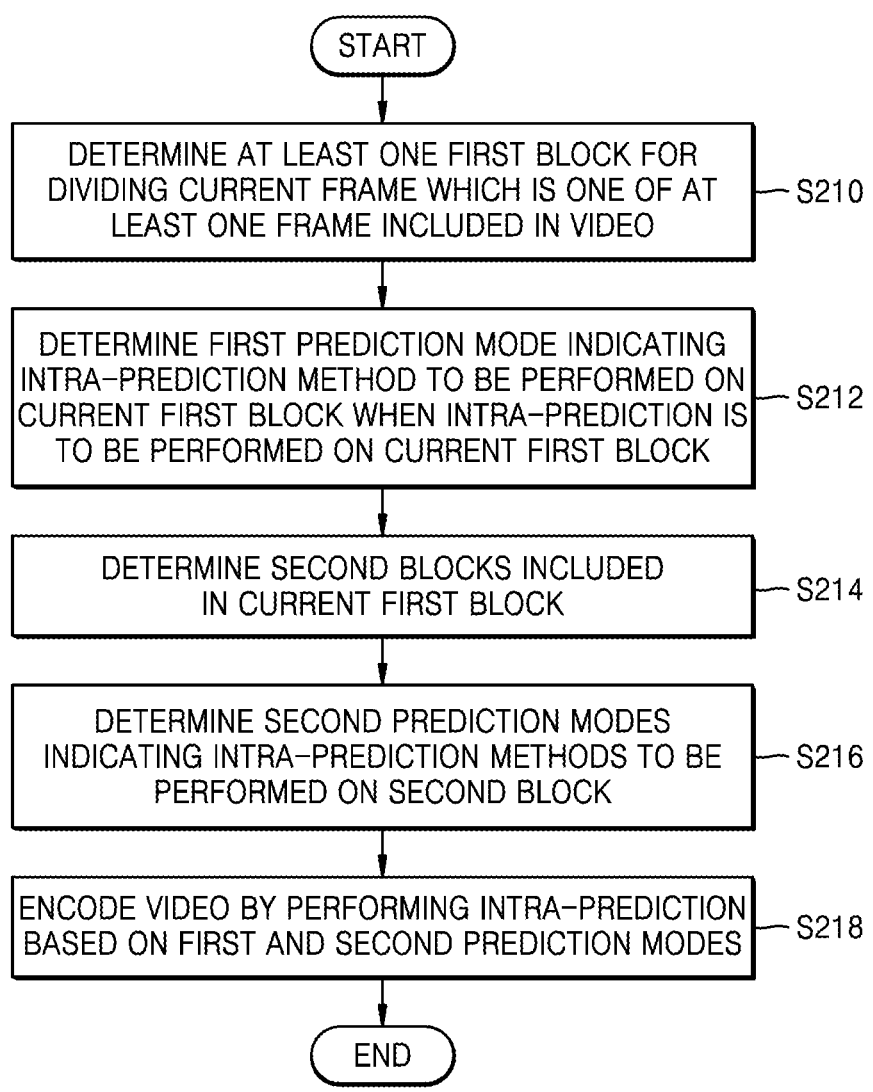
FIG. 2B is a flowchart of a method of determining prediction modes of a plurality of second blocks, based on a prediction mode of a current first block, performed by a video encoding apparatus, according to an embodiment.

FIG. 2B is a flowchart of a method of determining prediction modes of a plurality of second blocks based on a prediction mode of a current first block, performed by the video encoding apparatus 150, according to an embodiment.

In one embodiment, in operation S210, the encoder 170 may determine at least one first block for partitioning a current frame which is one of at least one frame included in a video. Various types of blocks may be used during a process of encoding the current frame. The encoder 170 may perform a video encoding process based on various types of data blocks. In one embodiment, the encoder 170 may determine whether intra-prediction is to be performed on the current first block. In one embodiment, the encoder 170 may determine whether intra-prediction is to be performed on the current first block, based on information indicating a type of a certain data unit (e.g., a slice) including the current first block. A process of determining whether an intra-prediction mode is to be performed on the current first block may correspond to determination processes included in various encoding methods according to the related art and is thus not described in detail here.

In one embodiment, in operation S212, when intra-prediction is performed on the current first block which is one of the at least one first block, the encoder 170 may determine a first prediction mode indicating an intra-prediction method to be performed on the current first block. In one embodiment, the encoder 170 may determine a type of intra-prediction to be performed on each of the at least one first block. Various types of data blocks may be included in the first block. For example, whether intra-prediction or inter-prediction is to be performed on each of the at least one first block may be determined. As another example, a type of intra-prediction mode to be performed on each of the at least one first block may be determined.

In one embodiment, the video encoding apparatus 150 may determine a prediction mode of the current first block, and the bitstream generator 160 may generate a bitstream including first intra-prediction mode information of each of the at least one first block for partitioning the current frame. In one embodiment, the first intra-prediction mode information may include an index indicating the intra-prediction mode of the current first block.

In one embodiment, in operation S214, the video encoding apparatus 150 may determine a plurality of second blocks included in the current first block. A relation between data blocks, e.g., the first block for partitioning the current frame and at least one second block included in the first block, may include an inclusion relation between various types of data blocks.

In one embodiment, when the first block is a largest coding unit, a second block included in the first block may be a coding unit partitioned from the largest coding unit. In one embodiment, when the first block is a coding unit, the second block included in the first block may be a prediction unit or a transformation unit determined based on the coding unit. However, the above-described embodiments are merely examples provided to explain an inclusion relation between the first block and the second block, and thus, the first block and the second block should not be construed as being limited to these embodiments and may be understood to include various types of data blocks which are in an inclusion relation similar to the inclusion relation provided in these embodiments.

In one embodiment, in operation S216, the video encoding apparatus 150 may determine second prediction modes indicating intra-prediction methods to be performed on the plurality of second blocks.

FIG. 3A illustrates a process of determining intra-prediction modes of a plurality of second blocks based on an intra-prediction mode of a first block, according to an embodiment.

In one embodiment, when intra-prediction is performed on a current first block, the video encoding apparatus 150 may determine a first prediction mode indicating an intra-prediction method to be performed on the current first block. Referring to FIG. 3A, the encoder 170 may determine whether intra-prediction is to be performed on a current first block 300 which is one of first blocks for partitioning a current frame, and determine a type of intra-prediction. In one embodiment, an intra-prediction mode to be performed on a first block may be a directional intra-prediction method or a non-directional intra-prediction. A video encoding method performed by the video encoding apparatus 150 in relation to FIG. 3A may be similar to the above-described video decoding method performed by the video decoding apparatus 100 in relation to FIG. 3A and is thus not described in detail here.

FIG. 3B illustrates a process of determining a prediction mode based on a non-square block for partitioning a video, according to an embodiment.

In one embodiment, the encoder 170 of the video encoding apparatus 150 may encode a video by using not only square data units but also non-square data units. Referring to FIG. 3B, the encoder 170 may perform a plurality of types of intra-prediction on a current first block 320 including second blocks 330, 332, 334, and 336.

In one embodiment, second intra-prediction mode information generated in relation to the second blocks 310, 312, 314, and 316 may be related to an intra-prediction method for a current first block 300. In one embodiment, the second blocks 330, 332, 334, and 336 included in the current first block 320 may each have a non-square shape. Furthermore, a non-square first block such as the current first block 320 illustrated in FIG. 3B may be included in a current frame. Similarly, second blocks included in the non-square first block may be square or non-square data blocks. That is, a first block and a second block available in various embodiments may have various shapes, such as square or non-square shapes, which satisfy an inclusion relation between the first block and the second block.

In one embodiment, the second intra-prediction mode information generated in relation to the second blocks 330, 332, 334, and 336 may be related to an intra-prediction method for the current first block 320. In one embodiment, a method of determining second prediction modes of the second blocks 330, 332, 334, and 336 each having a non-square shape may be substantially the same as the method described above with reference to FIG. 3A and is not described in detail here.

FIG. 3C illustrates a process of determining intra-prediction modes of second blocks included in a first block, according to an embodiment.

In one embodiment, the encoder 170 may determine an intra-prediction mode of each of the second blocks. In one embodiment, an intra-prediction mode determined with respect to a first block 350 may be a directional intra-prediction mode which is an intra-prediction mode referring to reference samples adjacent to at least one of a left border and an upper border of the first block 350. An intra-prediction mode of a second block 360 may be determined based on the intra-prediction mode. For convenience of explanation, the intra-prediction mode of the first block 350 used to determine the intra-prediction modes of the second block 360 will be hereinafter referred to as a reference intra-prediction mode.

In one embodiment, the encoder 170 may determine the number and directions of directional intra-prediction modes available for the second block 360 based on the reference intra-prediction mode. In detail, as shown in Table 1 above, when second intra-prediction mode information of the second block 360 is 00, intra-prediction may be performed by referring to reference samples located in the same direction as the reference intra-prediction mode. In one embodiment, an index related to an intra-prediction mode indicated by the second intra-prediction mode information used by the encoder 170 may vary according to the direction of the reference intra-prediction mode. That is, the encoder 170 may differently determine a second prediction mode to be indicated by the second intra-prediction mode information, based on a result of comparing an index K determined according to the reference intra-prediction mode and a threshold value L. According to Table 2 above, the encoder 170 may determine a second prediction mode according to the result of comparing the index K and the threshold value L, and the bitstream generator 160 may generate a bitstream including the second intra-prediction mode information indicating the second prediction mode. A video encoding method performed by the video encoding apparatus 150 in relation to FIG. 3C may be performed by performing the above-described video decoding method performed by the video decoding apparatus 100 in relation to FIG. 3C in an order reverse to the order in which the video decoding method is performed and is thus not described in detail here.

FIG. 4B is a flowchart of a process of determining a second prediction mode of a current second block based on a first prediction mode of a first block and a second prediction mode of a previous second block, according to another embodiment.

In one embodiment, operations S420 to S424 performed by the video encoding apparatus 150 may be substantially the same as operations S210 to S214 of FIG. 2B and is thus not described in detail here.

In one embodiment, in operation S426, the encoder 170 may determine a reference direction of prediction to be used for a current second block, based on of a direction of prediction of a current first block and a direction of prediction related to a previous second block. In one embodiment, the encoder 170 may perform encoding by determining an order in which a plurality of second blocks included in the current first block are to be processed. The order in which the second blocks are to be processed may be a predetermined order, and may vary according to the shapes of the plurality of second blocks included in the current first block. For example, when the plurality of second blocks are obtained by partitioning the current first block by the same numbers of rows and columns, the plurality of second blocks may be processed in the Z-scan order. When the plurality of second blocks are obtained by partitioning the current first block in a row or column direction, the plurality of second blocks may be processed in a direction perpendicular to the row or column direction in which the current first block is partitioned. In one embodiment, the encoder 170 may determine a second prediction mode of the current second block by using a direction of prediction related to a previous second block processed based on the determined order in which the second blocks are to be processed.

In one embodiment, in operation S428, the video encoding apparatus 150 may determine a prediction mode using one of a plurality of directions of prediction, including the reference direction of prediction, to be a second prediction mode of the current second block.

In one embodiment, in operation S430, the video decoding apparatus 100 may encode a video by performing intra-prediction based on the first prediction mode and the second prediction mode.

A video encoding method performed by the video encoding apparatus 150 in relation to FIGS. 4C, 4D, and 4E may be performed by performing the above-described video decoding method performed by the video decoding apparatus 100 in relation to FIGS. 4C, 4D, and 4E in an order reverse to the order in which the video decoding method is performed and is thus not described in detail here.

Figure 5B:
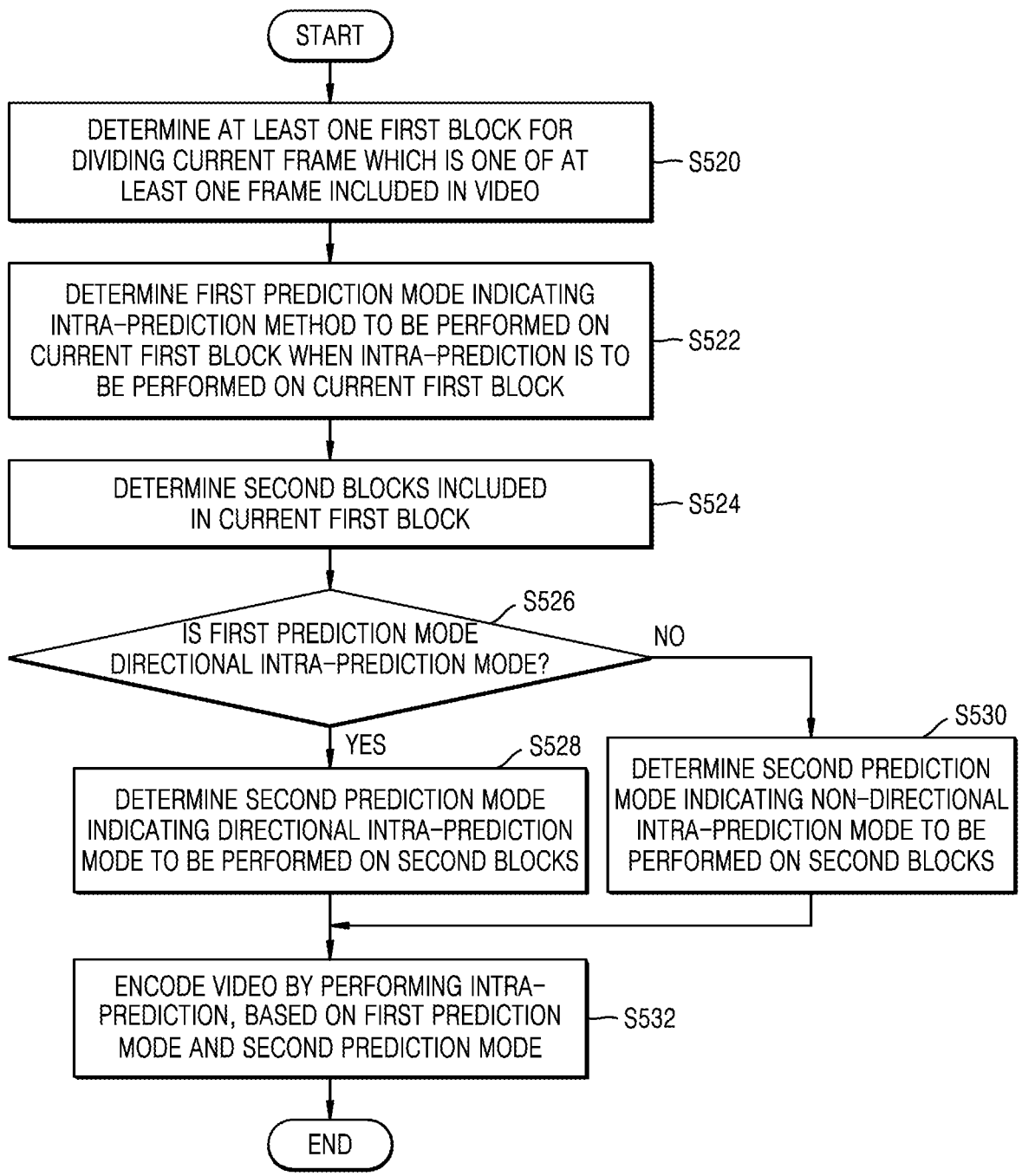
FIG. 5B is a flowchart of a process of determining second prediction modes of second blocks, based on whether directional intra-prediction is to be performed on a current first block, according to another embodiment.

FIG. 5B is a flowchart of a process of determining second prediction modes of second blocks, based on whether directional intra-prediction is to be performed on a current first block, according to another embodiment.

In one embodiment, operations S520 to S524 performed by the video encoding apparatus 150 may be substantially the same as operations S210 to S214 of FIG. 2B and is thus not described in detail here.

In operation S526, the video encoding apparatus 150 may determine whether a first prediction mode determined in operation S522 is a directional intra-prediction mode or not. The directional intra-prediction mode may be an intra-prediction mode in which prediction using reference samples adjacent to a first block is performed in a specific direction related to an index of an intra-prediction mode. In contrast, a non-directional intra-prediction mode may be an intra-prediction mode in which intra-prediction is performed using reference samples adjacent to the first block and performed in all directions other than a specific direction. In one embodiment, examples of the non-directional intra-prediction mode may include the DC mode, the planar mode, etc., and the directional intra-prediction mode may include an angular mode which may be performed in various directions of prediction.

In one embodiment, the encoder 170 may determine whether a prediction mode performed on the first block is a directional intra-prediction mode, and the bitstream generator 160 may generate a bitstream including first intra-prediction mode information regarding the prediction mode of the first block. In one embodiment, the first intra-prediction mode information may be information including an index identifying the intra-prediction mode.

In one embodiment, in operation S528, when the first prediction mode is determined to be the directional intra-prediction mode, the encoder 170 may determine a second prediction mode indicating the directional intra-prediction mode to be performed on the plurality of second blocks. That is, when the first prediction mode of the first block including the plurality of second blocks is the directional intra-prediction mode, the encoder 170 may determine the second prediction modes of the second blocks to be the directional intra-prediction mode.

In one embodiment, in operation S530, when the first prediction mode is determined to be the non-directional intra-prediction mode, the encoder 170 may determine a second prediction mode indicating the non-directional intra-prediction mode to be performed on the plurality of second blocks. That is, when the first prediction mode of the first block including the plurality of second blocks is the non-directional intra-prediction mode, the encoder 170 may determine the second prediction modes to be directional intra-prediction mode. In this case, even if the video encoding apparatus 150 determines the second prediction modes of the plurality of second blocks to be different prediction modes, second intra-prediction mode information generated by the bitstream generator 160 may be the same.

In operation S532, the video encoding apparatus 150 may encode a video by performing intra-prediction based on at least one of the first prediction mode determined in operation S522 and the second prediction mode determined in operation S528 or S530.

FIG. 6 illustrates a process of determining a second prediction mode, based on rows or columns of second blocks partitioned from a first block, according to an embodiment.

Referring to FIG. 6, in one embodiment, the video encoding apparatus 150 may determine second prediction modes of a plurality of second blocks 610, 612, 614, and 616 included in a first block 600, based on a direction of prediction of the first block 600. In this case, the second prediction modes of the plurality of second blocks may be determined, based on positions of the plurality of second blocks 610, 612, 614, and 616 on the first block 600. In one embodiment, directions of prediction 602 and 606, etc. may be determined according to a first prediction mode of the first block 600. The plurality of second blocks 610, 612, 614, and 616 included in the first block 600 may be determined by partitioning a height and width of the first block 600. A video encoding method performed by the video encoding apparatus 150 in relation to FIG. 6 may be performed by performing the above-described video decoding method performed by the video decoding apparatus 100 in relation to FIG. 6 in an order reverse to the order in which the video decoding method is performed and is thus not described in detail here.

FIG. 7 is a process of using prediction modes of neighboring blocks to determine a prediction mode of a current first or second block, according to an embodiment.

In one embodiment, the video encoding apparatus 150 may determine an intra-prediction mode of a current first block or a current second block, based on intra-prediction modes of neighboring blocks. A video encoding method performed by the video encoding apparatus 150 in relation to FIG. 7 may be performed by performing the above-described video decoding method performed by the video decoding apparatus 100 in relation to FIG. 7 in an order reverse to the order in which the video decoding method is performed and is thus not described in detail here.

FIG. 8 illustrates various directions of prediction and various indexes available in an intra-prediction mode, according to an embodiment.

In one embodiment, the number of intra-prediction modes available in a first prediction mode of a current first block and the number of intra-prediction modes available in a second prediction mode of a current second block may be different. In one embodiment, the number of intra-prediction modes available in the first prediction mode of the current first block may be M, and the number of intra-prediction modes available in the second prediction mode of the current second prediction mode may be N (here, M and N are different). In one embodiment, the use of different numbers of intra-prediction modes in the first and second prediction modes is applicable to not only when the directional intra-prediction mode is used but also when the non-directional intra-prediction mode is used. For convenience of explanation, the use of different numbers of intra-prediction modes in the first and second prediction modes will be described with respect to a process of determining a first prediction mode and a second prediction mode which are directional intra-prediction modes, performed by the encoder 170.

Referring to FIG. 8, the encoder 170 may determine a first prediction mode or a second prediction mode, based on an index of an intra-prediction mode. The encoder 170 may determine a directional intra-prediction mode using one of indexes indicating thirty-three directions of prediction to be the second prediction mode. In one embodiment, the encoder 170 may determine a directional intra-prediction mode using one of indexes 801, 802, 803, 804, 805, 806, 807, 808, and 809 indicating nine directions of prediction to be the first prediction mode, unlike in the determination of the second prediction mode. In one embodiment, the nine directions of prediction considered in the determination of the first prediction mode may be part of the thirty-three directions of prediction considered in the determination of the second prediction mode.

Figure 9B:
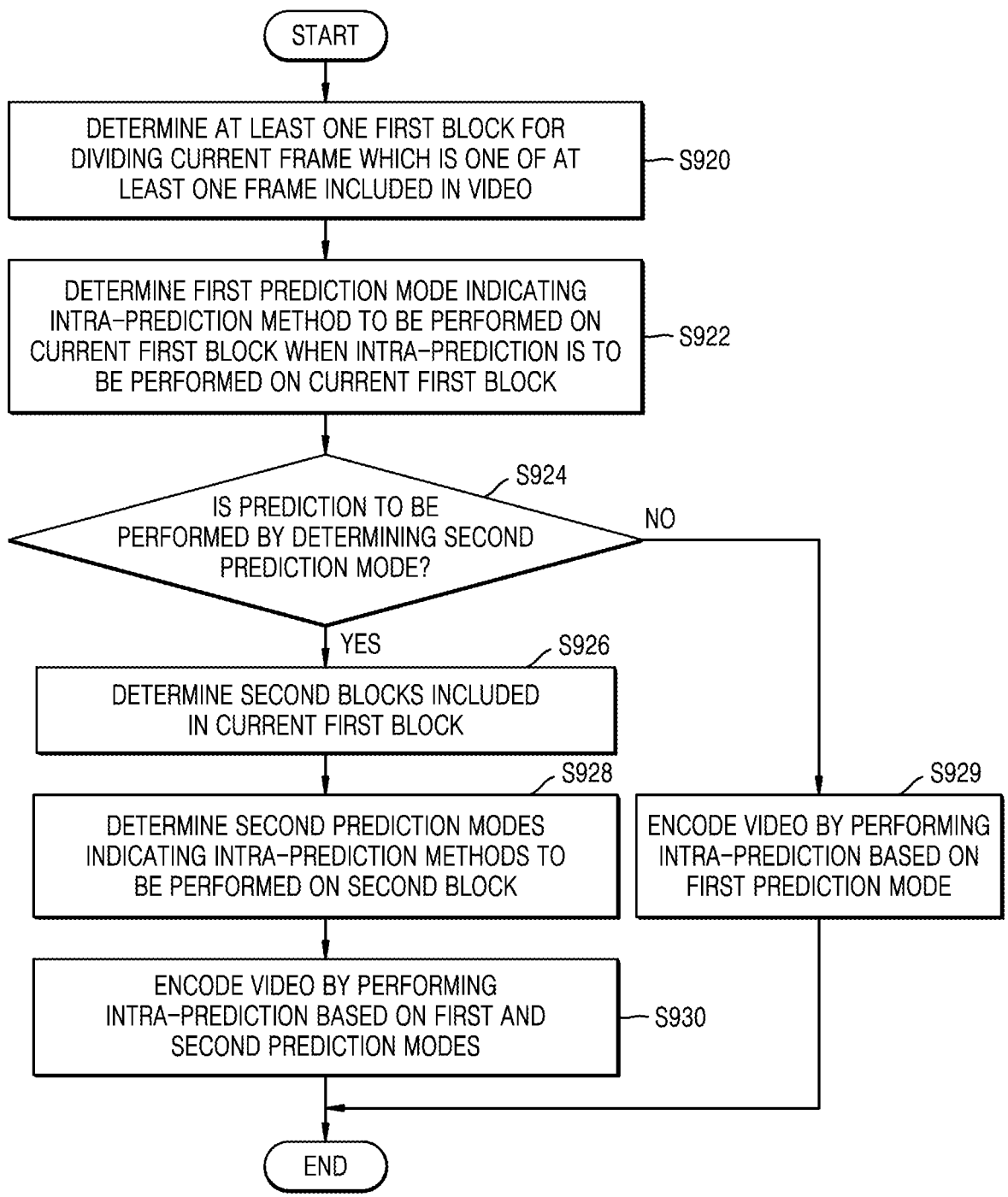
FIG. 9B is a flowchart of a process of performing prediction by determining whether a process of determining a second prediction mode of a second block is to be performed, according to another embodiment.

FIG. 9B is a flowchart of a process of performing prediction by determining whether a process of determining a second prediction mode of a second block is to be performed, according to another embodiment.

In one embodiment, operations S920 and S922 performed by the video encoding apparatus 150 may be substantially the same as operations S210 and S212 of FIG. 2B and are thus not described in detail here.

In one embodiment, in operation S924, the encoder 170 may determine whether prediction is to be performed by determining a second prediction mode, as well as a first prediction mode. The bitstream generator 160 may generate a bitstream including a flag indicating whether prediction is to be performed by determining the second prediction mode in units of certain data units (e.g., sequences, frames, slices, slice segments, largest coding units, coding units, or the like).

In one embodiment, in operation S929, when it is determined that prediction is to be performed using only the first prediction mode, the encoder 170 may encode a video by performing intra-prediction based on the first prediction mode.

In one embodiment, in operation S926, when it is determined that prediction is to be performed by determining the second prediction mode, as well as the first prediction mode, the encoder 170 may determine a plurality of second blocks included in a current first block.

Operations S928 and S930 performed by the video encoding apparatus 150 may be substantially the same as operations S216 and S218 of FIG. 2B and are thus not described in detail here.

Hereinafter, a method of determining a data unit that may be used while the image decoding apparatus 100 according to an embodiment decodes an image will be described with reference to FIGS. 10 through 23. Operations of the image encoding apparatus 150 may be similar to or reverse of various embodiments about operations of the image decoding apparatus 100 described below.

Figure 10:
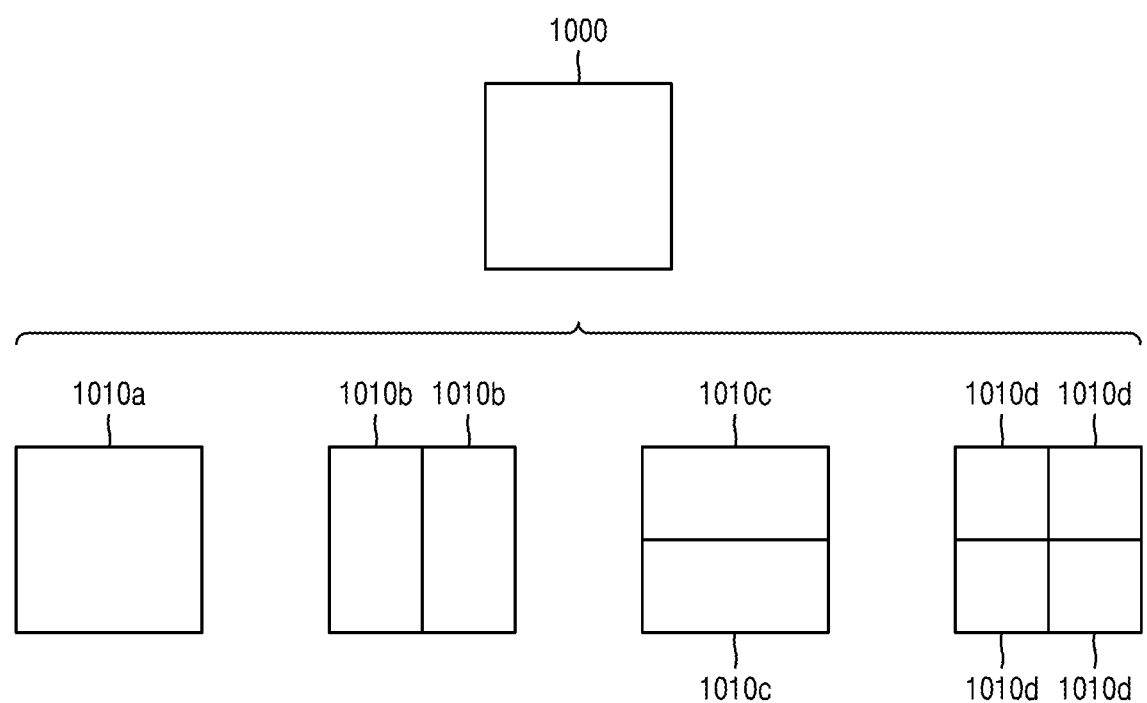
FIG. 10 illustrates processes of determining at least one coding unit as a current coding unit is partitioned, according to an embodiment.

FIG. 10 illustrates processes of determining at least one coding unit as the image decoding apparatus 100 partitions a current coding unit, according to an embodiment.

According to an embodiment, the image decoding apparatus 100 may determine a shape of a coding unit by using block shape information, and determine a shape into which a coding unit is partitioned by using partition shape information. In other words, a partitioning method ( ) of a coding unit, which is indicated by the partition shape information, may be determined based on a block shape indicated by the block shape information used by the image decoding apparatus 100.

According to an embodiment, the image decoding apparatus 100 may use block shape information indicating that a current coding unit has a square shape. For example, the image decoding apparatus 100 may determine, according to partition shape information, whether to not partition a square coding unit, to partition the square coding unit vertically, to partition the square coding unit horizontally, or to partition the square coding unit into four coding units. Referring to FIG. 10, when block shape information of a current coding unit 1000 indicates a square shape, the decoder 120 may not partition a coding unit 1010a having the same size as the current coding unit 1000 according to partition shape information indicating non-partition, or determine coding units 1010b, 1010c, or 1010d based on partition shape information indicating a certain partitioning method.

Referring to FIG. 10, the image decoding apparatus 100 may determine two coding units 1010b by partitioning the current coding unit 1000 in a vertical direction based on partition shape information indicating a partition in a vertical direction, according to an embodiment. The image decoding apparatus 100 may determine two coding units 1010c by partitioning the current coding unit 1000 in a horizontal direction based on partition shape information indicating a partition in a horizontal direction. The image decoding apparatus 100 may determine four coding units 1010d by partitioning the current coding unit 1000 in vertical and horizontal directions based on partition shape information indicating partitioning in vertical and horizontal directions. However, a partition shape into which a square coding unit may be partitioned is not limited to the above shapes, and may include any shape indicatable by partition shape information. Certain partition shapes into which a square coding unit are partitioned will now be described in detail through various embodiments.

FIG. 11 illustrates processes of determining at least one coding unit when the image decoding apparatus 100 partitions a coding unit having a non-square shape, according to an embodiment.

According to an embodiment, the image decoding apparatus 100 may use block shape information indicating that a current coding unit has a non-square shape. The image decoding apparatus 100 may determine, according to partition shape information, whether to not partition the non-square current coding unit or to partition the non-square current coding unit via a certain method. Referring to FIG. 11, when block shape information of a current coding unit 1100 or 1150 indicates a non-square shape, the image decoding apparatus 100 may not partition coding units 1110 or 1160 having the same size as the current coding unit 1100 or 1150 according to partition shape information indicating non-partition, or determine coding units 1120a, 1120b, 1130a, 1130b, 1130c, 1170a, 1170b, 1180a, 1180b, and 1180c based on partition shape information indicating a certain partitioning method. A certain partitioning method of partitioning a non-square coding unit will now be described in detail through various embodiments.

According to an embodiment, the image decoding apparatus 100 may determine a shape into which a coding unit is partitioned by using partition shape information, and in this case, the partition shape information may indicate the number of at least one coding unit generated as the coding unit is partitioned. Referring to FIG. 11, when partition shape information indicates that the current coding unit 1100 or 1150 is partitioned into two coding units, the image decoding apparatus 100 may determine two coding units 1120a and 1120b or 1170a and 1170b included in the current coding unit 1100 or 1150 by partitioning the current coding unit 1100 or 1150 based on the partition shape information.

According to an embodiment, when the image decoding apparatus 100 partitions the current coding unit 1100 or 1150 having a non-square shape based on partition shape information, the image decoding apparatus 100 may partition the current coding unit 1100 or 1150 considering locations of long sides of the current coding unit 1100 or 1150 having a non-square shape. For example, the image decoding apparatus 100 may determine a plurality of coding units by partitioning the current coding unit 1100 or 1150 in a direction of partitioning the long sides of the current coding unit 1100 or 1150 considering a shape of the current coding unit 1100 or 1150.

According to an embodiment, when partition shape information indicates that a coding unit is partitioned into an odd number of blocks, the image decoding apparatus 100 may determine the odd number of coding units included in the current coding unit 1100 or 1150. For example, when partition shape information indicates that the current coding unit 1100 or 1150 is partitioned into three coding units, the image decoding apparatus 100 may partition the current coding unit 1100 or 1150 into three coding units 1130a through 1130c or 1180a through 1180c. According to an embodiment, the image decoding apparatus 100 may determine the odd number of coding units included in the current coding unit 1100 or 1150, and the sizes of the determined coding units may not be all the same. For example, the size of coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is partitioned may have a plurality of types of sizes, and in some cases, the coding units 1130*a* through 1130*c* or 1180*a* through 1180*c* may have different sizes.

According to an embodiment, when partition shape information indicates that a coding unit is partitioned into an odd number of blocks, the image decoding apparatus 100 may determine the odd number of coding units included in the current coding unit 1100 or 1150, and in addition, may set a certain limit on at least one coding unit from among the odd number of coding units generated via partitioning. Referring to FIG. 11, the image decoding apparatus 100 may differentiate decoding processes performed on the coding unit 1130*b* or 1180*b* located at the center from among the three coding units 1130*a* through 1130*c* or 1180*a* through 1180*c* generated as the current coding unit 1100 or 1150 is partitioned from the other coding units 1130*a* and 1130*c* or 1180*a* and 1180*c*. For example, the image decoding apparatus 100 may limit the coding unit 1130*b* or 1180*b* located at the center to be no longer partitioned unlike the other coding units 1130*a* and 1130*c* or 1180*a* and 1180*c*, or to be partitioned only a certain number of times.

Figure 12:
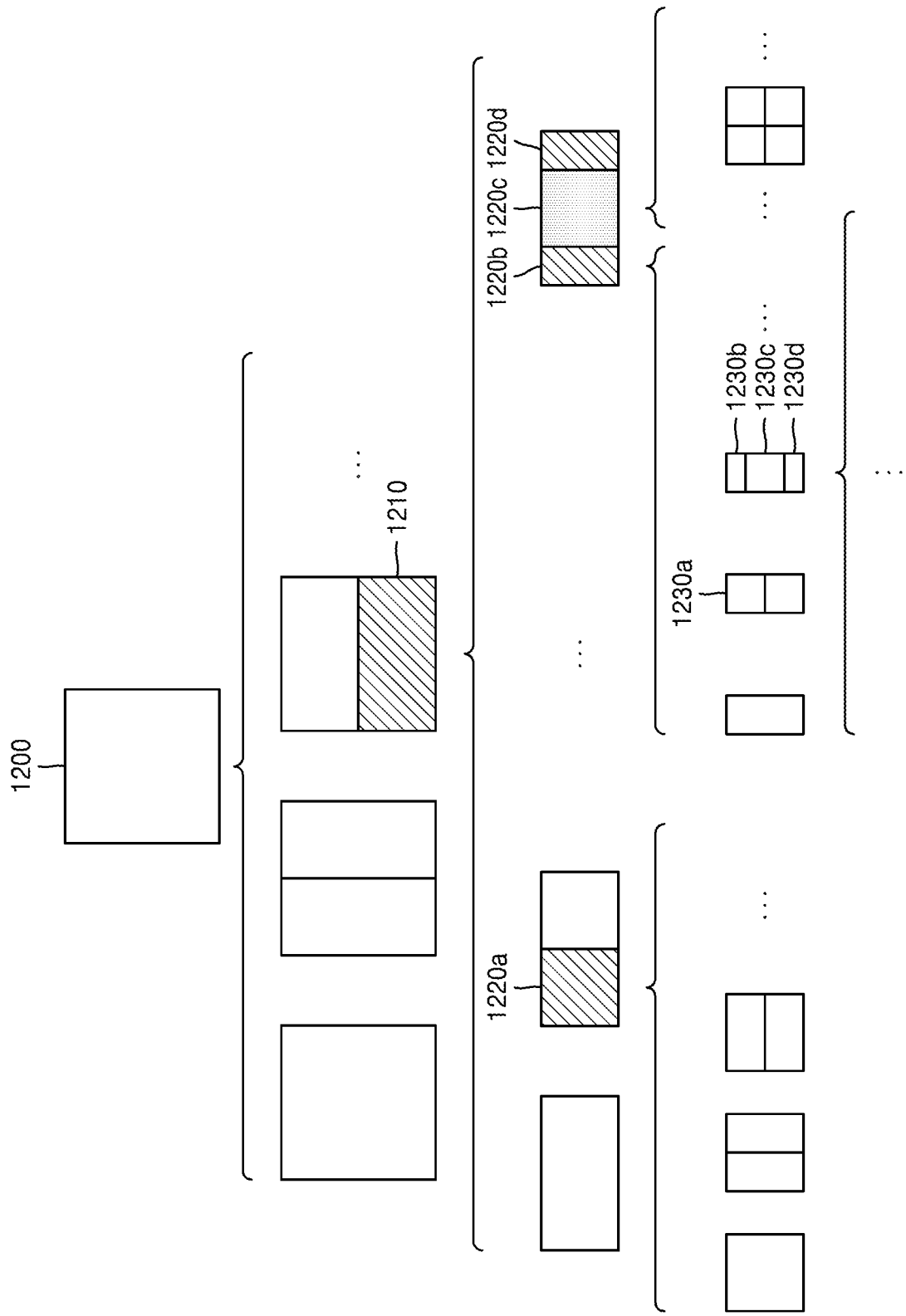
FIG. 12 illustrates processes of partitioning a coding unit, based on at least one of a block shape information and partition shape information, according to an embodiment.

FIG. 12 illustrates processes of the image decoding apparatus 100 partitioning a coding unit, based on at least one of a block shape information and partition shape information, according to an embodiment.

According to an embodiment, the image decoding apparatus 100 may determine that a first coding unit 1200 having a square shape is partitioned or not partitioned into coding units, based on at least one of block shape information and partition shape information. According to an embodiment, when partition shape information indicates that the first coding unit 1200 is partitioned in a horizontal direction, the image decoding apparatus 100 may determine a second coding unit 1210 by partitioning the first coding unit 1200 in a horizontal direction. A first coding unit, a second coding unit, and a third coding unit used according to an embodiment are terms used to indicate a relation between before and after partitioning a coding unit. For example, a second coding unit may be determined by partitioning a first coding unit, and a third coding unit may be determined by partitioning a second coding unit. Hereinafter, it will be understood that relations between first through third coding units are in accordance with the features described above.

According to an embodiment, the image decoding apparatus 100 may determine that the determined second coding unit 1210 is partitioned or not partitioned into coding units based on at least one of block shape information and partition shape information. Referring to FIG. 12, the image decoding apparatus 100 may partition the second coding unit 1210, which has a non-square shape and is determined by partitioning the first coding unit 1200, into at least one third coding unit 1210*a*, 1220*b*, 1220*c*, or 1220*d*, or may not partition the second coding unit 1210, based on at least one of block shape information and partition shape information. The image decoding apparatus 100 may obtain at least one of the block shape information and the partition shape information, and obtain a plurality of second coding units (for example, the second coding units 1210) having various shapes by partitioning the first coding unit 1200 based on at least one of the obtained block shape information and partition shape information, wherein the second coding unit 1210 may be partitioned according to a method of partitioning the first coding unit 1200 based on at least one of the block shape information and the partition shape information. According to an embodiment, when the first coding unit 1200 is partitioned into the second coding units 1210 based on at least one of block shape information and partition shape information with respect to the first coding unit 1200, the second coding unit 1210 may also be partitioned into third coding units (for example, the third coding units 1220*a* through 1220*d*) based on at least one of block shape information and partition shape information with respect to the second coding unit 1210. In other words, a coding unit may be recursively partitioned based on at least one of partition shape information and block shape information related to each coding unit. Accordingly, a square coding unit may be determined from a non-square coding unit, and such a square coding unit may be recursively partitioned such that a non-square coding unit is determined. Referring to FIG. 12, a certain coding unit (for example, a coding unit located at the center or a square coding unit) from among the odd number of third coding units 1220*b* through 1220*d* determined when the second coding unit 1210 having a non-square shape is partitioned may be recursively partitioned. According to an embodiment, the third coding unit 1220*c* having a square shape from among the third coding units 1220*b* through 1220*d* may be partitioned in a horizontal direction into a plurality of fourth coding units. A fourth coding unit having a non-square shape from among the plurality of fourth coding units may again be partitioned into a plurality of coding units. For example, the fourth coding unit 1240 having a non-square shape may be partitioned into an odd number of coding units.

A method that may be used to recursively partitioned a coding unit will be described below through various embodiments.

According to an embodiment, the image decoding apparatus 100 may determine that each of the third coding units 1220*a* through 1220*d* is partitioned into coding units or that the second coding unit 1210 is not partitioned, based on at least one of block shape information and partition shape information. The image decoding apparatus 100 may partition the second coding unit 1210 having a non-square shape into the odd number of third coding units 1220*b* through 1220*d*, according to an embodiment. The image decoding apparatus 100 may set a certain limit on a certain third coding unit from among the third coding units 1220*b* through 1220*d*. For example, the image decoding apparatus 100 may limit that the third coding unit 1220*c* located at the center of the third coding units 1220*b* through 1220*d* is no longer partitioned, or is partitioned into a settable number of times. Referring to FIG. 12, the image decoding apparatus 100 may limit that the third coding unit 1220*c* located at the center of the third coding units 1220*b* through 1220*d* included in the second coding unit 1210 having a non-square shape is no longer partitioned, is partitioned into a certain partition shape (for example, partitioned into four coding units or partitioned into shapes corresponding to those into which the second coding unit 1210 is partitioned), or is partitioned only a certain number of times (for example, partitioned only n times wherein n>0). However, such limits on the third coding unit 1220*c* located at the center are only examples and should not be interpreted as being limited by those examples, but should be interpreted as including various limits as long as the third coding unit 1220*c* located at the center are decoded differently from the other third coding units 1220*b* and 1220*d*.

According to an embodiment, the image decoding apparatus 100 may obtain at least one of block shape information and partition shape information used to partition a current coding unit from a certain location in the current coding unit.

Figure 13:
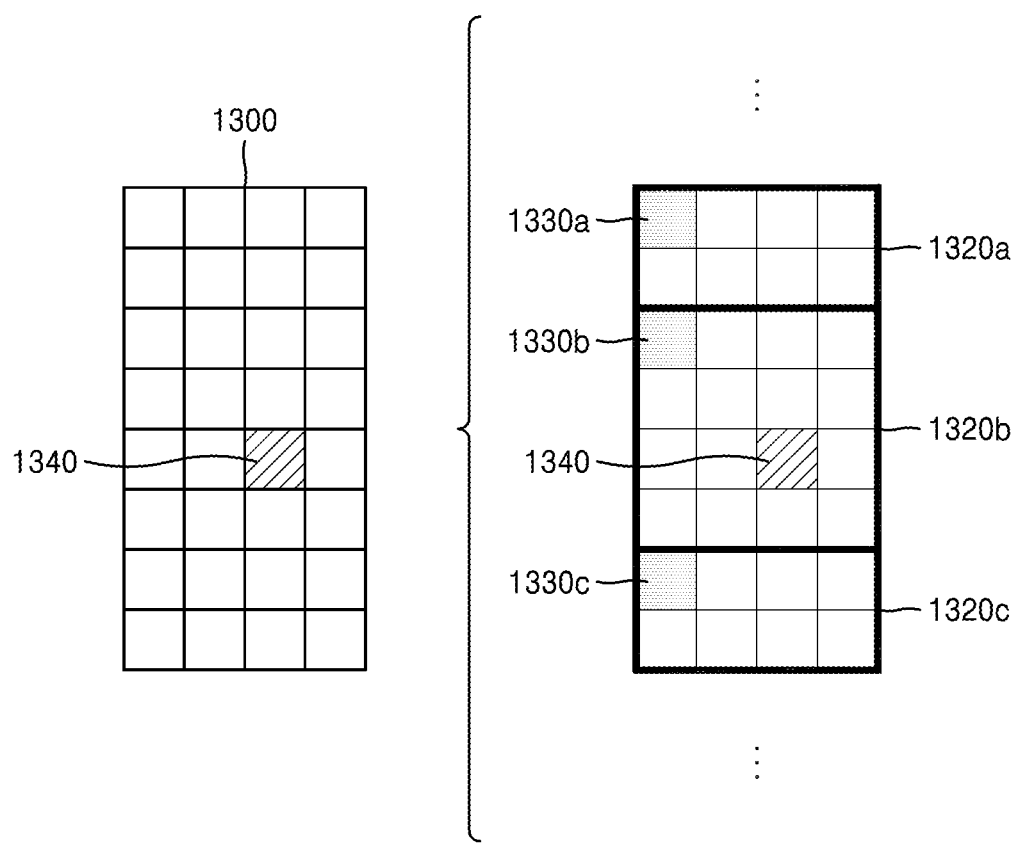
FIG. 13 illustrates a method of determining a certain coding unit from among an odd number of coding units, according to an embodiment.

FIG. 13 illustrates a method of determining, by the image decoding apparatus 100, a certain coding unit from among an odd number of coding units, according to an embodiment. Referring to FIG. 13, at least one of block shape information and partition shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and partition shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding apparatus 100 may determine that a current coding unit is split into coding units having various shapes and sizes or is not split by obtaining at least one of block shape information and partition shape information from a certain location.

According to an embodiment, the image decoding apparatus 100 may select one coding unit when a current coding unit is split into a certain number of coding units. A method of selecting one of a plurality of coding units may vary, and details thereof will be described below through various embodiments.

According to an embodiment, the image decoding apparatus 100 may split a current coding unit into a plurality of coding units, and determine a coding unit at a certain location.

FIG. 13 illustrates a method of determining, by the image decoding apparatus 100, a certain coding unit from among an odd number of coding units, according to an embodiment. Referring to FIG. 13, at least one of block shape information and partition shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and partition shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding apparatus 100 may determine that a current coding unit is partitioned into coding units having various shapes and sizes or is not partitioned by obtaining at least one of block shape information and partition shape information from a certain location.

According to an embodiment, the image decoding apparatus 100 may select one coding unit when a current coding unit is partitioned into a certain number of coding units. A method of selecting one of a plurality of coding units may vary, and details thereof will be described below through various embodiments.

According to an embodiment, the image decoding apparatus 100 may partition a current coding unit into a plurality of coding units, and determine a coding unit at a certain location.

FIG. 13 illustrates a method of determining, by the image decoding apparatus 100, a coding unit at a certain location from among an odd number of coding units, according to an embodiment.

According to an embodiment, the image decoding apparatus 100 may use information indicating a location of each of the odd number of coding units so as to determine a coding unit located at the center from among the odd number of coding units. Referring to FIG. 13, the image decoding apparatus 100 may determine the odd number of coding units 1320a through 1320c by partitioning the current coding unit 1300. The image decoding apparatus 100 may determine the center coding unit 1320b by using information about the locations of the odd number of coding units 1320a through 1320c. For example, the image decoding apparatus 100 may determine the coding unit 1320b located at the center by determining the locations of the coding units 1320a through 1320b based on information indicating locations of certain samples included in the coding units 1320a through 1320c. In detail, the image decoding apparatus 100 may determine the coding unit 1320b located at the center by determining the locations of the coding units 1320a through 1320c based on information indicating locations of upper left samples 1330a through 1330c of the coding units 1320a through 1320c.

According to an embodiment, the information indicating the locations of the upper left samples 1330a through 1330c included in the coding units 1320a through 1320c respectively may include information about a location or coordinates of the coding units 1320a through 1320c in a picture. According to an embodiment, the information indicating the locations of the upper left samples 1330a through 1330c included in the coding units 1320a through 1320c respectively may include information indicating widths or heights of the coding units 1320a through 1320c included in the current coding unit 1300, and such widths or heights may correspond to information indicating differences between coordinates of the coding units 1320a through 1320c in a picture. In other words, the image decoding apparatus 100 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The image decoding apparatus 100 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among the coding units 1320a through 1320c determined when the current coding unit 1300 is partitioned. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding apparatus 100 may partition the current coding unit 1300 into the plurality of coding units 1320a through 1320c, and select a coding unit from the coding units 1320a through 1320c according to a certain standard. For example, the image decoding apparatus 100 may select the coding unit 1320b having a different size from among the coding units 1320a through 1320c.

According to an embodiment, the image decoding apparatus 100 may determine widths or heights of the coding units 1320a through 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The image decoding apparatus 100 may determine the sizes of the coding units 1320a through 1320c by respectively using the coordinates (xa, ya), (xb, yb), and (xc, yc) indicating the locations of the coding units 1320a through 1320c.

According to an embodiment, the image decoding apparatus 100 may determine the width of the upper coding unit 1320a to be xb-xa, and the height to be yb-ya. According to an embodiment, the image decoding apparatus 100 may determine the width of the center coding unit 1320b to be xc-xb, and the height to be yc-yb. According to an embodiment, the image decoding apparatus 100 may determine the width or height of the lower coding unit 1320c by using the width and height of the current coding unit 1300 and the widths and heights of the upper coding unit 1320a and center coding unit 1320b. The image decoding apparatus 100 may determine a coding unit having a different size from other coding units based on the determined widths and heights of the coding units 1320a through 1320c. Referring to FIG. 13, the image decoding apparatus 100 may determine the center coding unit 1320b having a size different from those of the upper coding unit 1320a and lower coding unit 1320c as a coding unit at a certain location. However, processes of the image decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding apparatus 100 may select a coding unit at a certain location from among an odd number of coding units determined when a current coding unit is partitioned, while considering a shape of the current coding unit. For example, when the current coding unit has a non-square shape in which a width is longer than a height, the image decoding apparatus 100 may determine a coding unit at a certain location in a horizontal direction. In other words, the image decoding apparatus 100 may determine one of coding units having a different location in the horizontal direction and set a limit on the one coding unit. When the current coding unit has a non-square shape in which a height is longer than a width, the image decoding apparatus 100 may determine a coding unit at a certain location in a vertical direction. In other words, the image decoding apparatus 100 may determine one of coding units having a different location in the vertical direction and set a limit on the one coding unit.

According to an embodiment, the image decoding apparatus 100 may use information indicating a location of each of an even number of coding units so as to determine a coding unit at a certain location from among the even number of coding units. The image decoding apparatus 100 may determine the even number of coding units by partitioning a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is partitioned into a plurality of coding units, certain information about a coding unit at a certain location during partitioning processes may be used to determine the coding unit at the certain location from among the plurality of coding units. For example, the image decoding apparatus 100 may use at least one of block shape information and partition shape information stored in a sample included in a center coding unit during partitioning processes so as to determine a coding unit located at the center from among a plurality of coding units obtained by partitioning a current coding unit.

Referring to FIG. 13, the image decoding apparatus 100 may partition the current coding unit 1300 into the plurality of coding units 1320a through 1320c based on at least one of block shape information and partition shape information, and determine the coding unit 1320b located at the center from among the plurality of coding units 1320a through 1320c. In addition, the image decoding apparatus 100 may determine the coding unit 1320b located at the center considering a location from which at least one of the block shape information and the partition shape information is obtained. In other words, at least one of the block shape information and the partition shape information of the current coding unit 1300 may be obtained from the sample 1340 located at the center of the current coding unit 1300, and when the current coding unit 1300 is partitioned into the plurality of coding units 1320a through 1320c based on at least one of the block shape information and the partition shape information, the coding unit 1320b including the sample 1340 may be determined as a coding unit located at the center. However, information used to determine a coding unit located at the center is not limited to at least one of the block shape information and the partition shape information, and various types of information may be used while determining a coding unit located at the center.

According to an embodiment, certain information for identifying a coding unit at a certain location may be obtained from a certain sample included in a coding unit to be determined. Referring to FIG. 13, the image decoding apparatus 100 may use at least one of block shape information and partition shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is partitioned. In other words, the image decoding apparatus 100 may determine the sample at the certain location considering a block shape of the current coding unit 1300, and determine and set a certain limit on the coding unit 1320b including a sample from which certain information (for example, at least one of block shape information and partition shape information) is obtainable, from among the plurality of coding units 1320a through 1320c determined when the current coding unit 1300 is partitioned. Referring to FIG. 13, according to an embodiment, the image decoding apparatus 100 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the image decoding apparatus 100 may determine, as a sample from which certain information is obtainable, a sample located on a boundary of partitioning at least one of a width and a height of a current coding unit into halves by using at least one of information about the width of the current coding unit and information about the height of the current coding unit. As another example, when block shape information related to a current coding unit indicates a non-square shape, the image decoding apparatus 100 may determine, as a sample from which certain information is obtainable, one of samples adjacent to a boundary of partitioning long sides of the current coding unit into halves.

According to an embodiment, when a current coding unit is partitioned into a plurality of coding units, the image decoding apparatus 100 may use at least one of block shape information and partition shape information so as to determine a coding unit at a certain location from among the plurality of coding units. According to an embodiment, the image decoding apparatus 100 may obtain at least one of block shape information and partition shape information from a sample at a certain location included in a coding unit, and may partition a plurality of coding units generated as a current coding unit is partitioned by using at least one of the partition shape information and the block shape information obtained from the sample at the certain location included in each of the plurality of coding units. In other words, a coding unit may be recursively partitioned by using at least one of block shape information and partition shape information obtained from a sample at a certain location included in each coding unit. Since processes of recursively partitioning a coding unit have been described above with reference to FIG. 12, details thereof are not provided again.

According to an embodiment, the image decoding apparatus 100 may determine at least one coding unit by partitioning a current coding unit, and determine an order of decoding the at least one coding unit according to a certain block (for example, the current coding unit).

Figure 14:
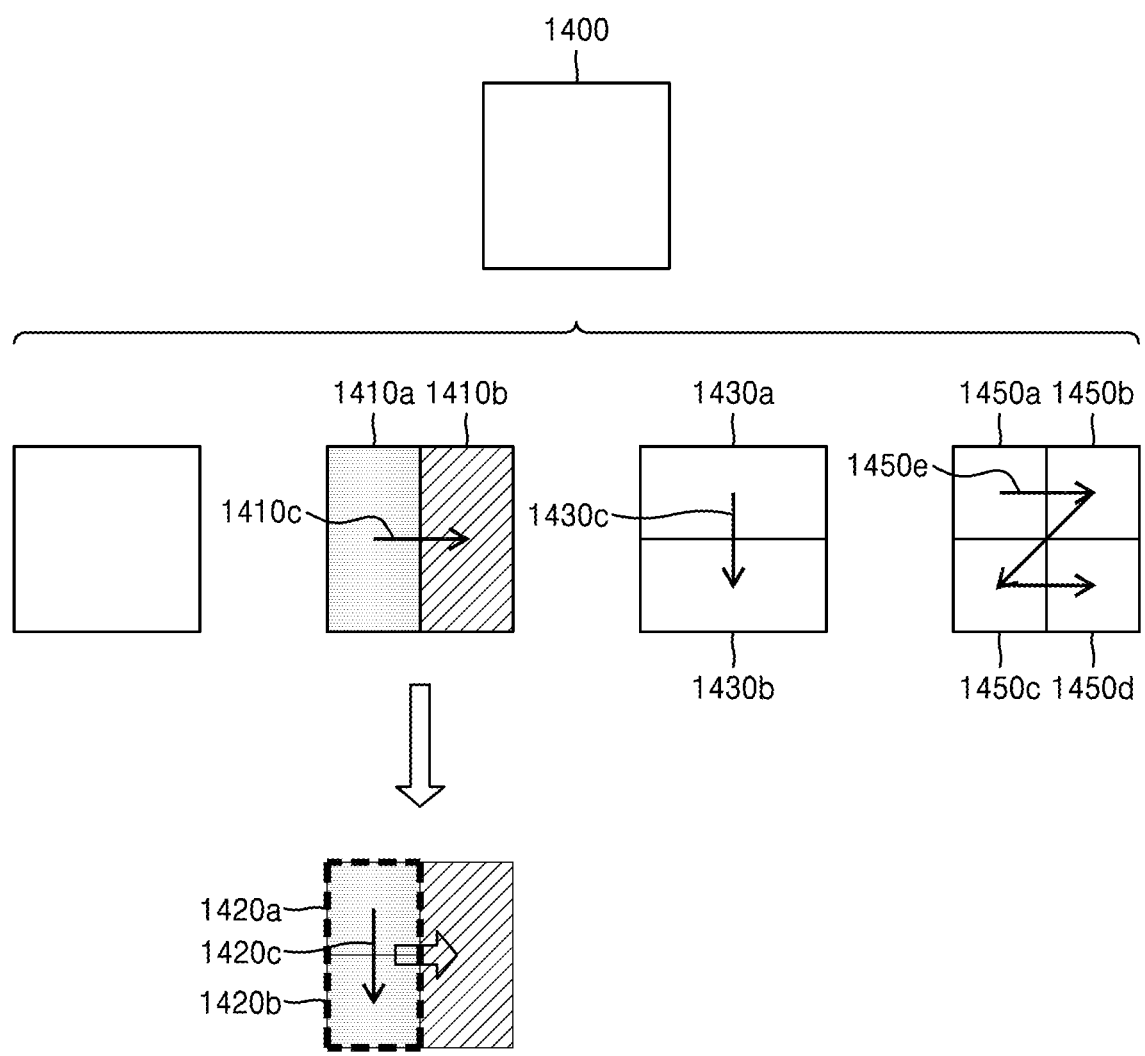
FIG. 14 illustrates an order of processing a plurality of coding units when the plurality of coding units are determined when a current coding unit is partitioned, according to an embodiment.

FIG. 14 illustrates an order of processing a plurality of coding units when the plurality of coding units are determined when the image decoding apparatus 100 partitions a current coding unit, according to an embodiment.

According to an embodiment, the image decoding apparatus 100 may determine second coding units 1410a and 1410b by partitioning a first coding unit 1400 in a vertical direction, determine second coding units 1430a and 1430b by partitioning the first coding unit 1400 in a horizontal direction, or determine second coding units 1450a through 1450d by partitioning the first coding unit 140 in horizontal and vertical directions, according to block shape information and partition shape information.

Referring to FIG. 14, the image decoding apparatus 100 may determine the second coding units 1410a and 1410b, which are determined by partitioning the first coding unit 1400 in the vertical direction, to be processed in a horizontal direction 1410c. The image decoding apparatus 100 may determine the second coding units 1430a and 1430b, which are determined by partitioning the first coding unit 1400 in the horizontal direction, to be processed in a vertical direction 1430c. The image decoding apparatus 100 may determine the second coding units 1450a through 1450d, which are determined by partitioning the first coding unit 1400 in the vertical and horizontal directions, to be processed according to a certain order in which coding units located in one row is processed and then coding units located in a next row is processed (for example, a raster scan order or a z-scan order 1450e).

According to an embodiment, the image decoding apparatus 100 may recursively partition coding units. Referring to FIG. 14, the image decoding apparatus 100 may determine the plurality of second coding units 1410a and 1410b, 1430a and 1430b, or 1450a through 1450d by partitioning the first coding unit 1400, and recursively partition each of the plurality of second coding units 1410a and 1410b, 1430a and 1430b, or 1450a through 1450d. A method of partitioning the plurality of second coding units 1410a and 1410b, 1430a and 1430b, or 1450a through 1450d may correspond to a method of partitioning the first coding unit 1400. Accordingly, each of the plurality of second coding units 1410a and 1410b, 1430a and 1430b, or 1450a through 1450d may be independently partitioned into a plurality of coding units. Referring to FIG. 14, the image decoding apparatus 100 may determine the second coding units 1410a and 1410b by partitioning the first coding unit 1400 in the vertical direction, and in addition, determine that each of the second coding units 1410a and 1410b is independently partitioned or not partitioned.

According to an embodiment, the image decoding apparatus 100 may partition the second coding unit 1410a at the left in a horizontal direction into third coding units 1420a and 1420b, and may not partition the second coding unit 1410b at the right.

According to an embodiment, an order of processing coding units may be determined based on partition processes of coding units. In other words, an order of processing coding units that are partitioned may be determined based on an order of processing coding units before being partitioned. The image decoding apparatus 100 may determine an order of processing the third coding units 1420a and 1420b determined when the second coding unit 1410a at the left is partitioned independently from the second coding unit 1410b at the right. Since the third coding units 1420a and 1420b are determined when the second coding unit 1410a at the left is partitioned in a horizontal direction, the third coding units 1420*a* and 1420*b* may be processed in a vertical direction 1420*c*. Also, since an order of processing the second coding unit 1410*a* at the left and the second coding unit 1410*b* at the right corresponds to the horizontal direction 1410*c*, the second coding unit 1410*b* at the right may be processed after the third coding units 1420*a* and 1420*b* included in the second coding unit 1410*a* at the left are processed in the vertical direction 1420*c*. The above descriptions are related processes of determining an order of processing coding units according to coding units before being partitioned, but such processes are not limited to the above embodiments, and any method of independently processing, in a certain order, coding units partitioned into various shapes may be used.

Figure 15:
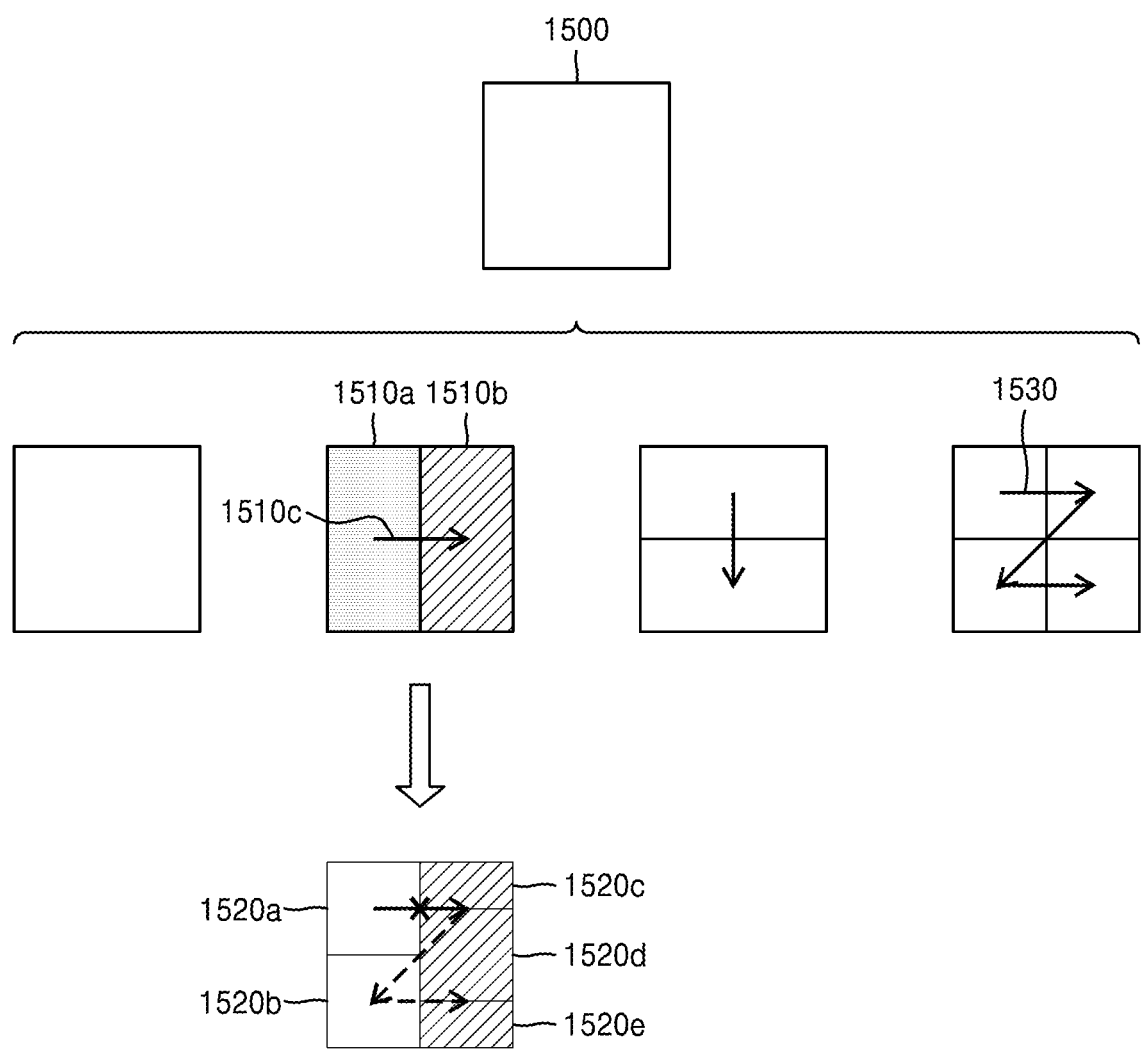
FIG. 15 illustrates processes of determining that a current coding unit is partitioned into an odd number of coding units when coding units are not processable in a certain order, according to an embodiment.

FIG. 15 illustrates processes of determining that a current coding unit is partitioned into an odd number of coding units when coding units are not processable in a certain order by the image decoding apparatus 100, according to an embodiment.

According to an embodiment, the image decoding apparatus 100 may determine that a current coding unit is partitioned into an odd number of coding units based on obtained block shape information and partition shape information. Referring to FIG. 15, a first coding unit 1500 having a square shape may be partitioned into second coding units 1510*a* and 1510*b* having a non-square shape, and the second coding units 1510*a* and 1510*b* may be independently respectively partitioned into third coding units 1520*a* and 1520*b*, and 1520*c* through 1520*e*. According to an embodiment, the image decoding apparatus 100 may partition the second coding unit 1510*a* at the left from among the second coding units 1510*a* and 1510*b* into a horizontal direction to determine the plurality of third coding units 1520*a* and 1520*b*, and partition the second coding unit 1510*b* at the right into the odd number of third coding units 1520*c* through 1520*e*.

According to an embodiment, the image decoding apparatus 100 may determine whether a coding unit partitioned into an odd number exists by determining whether the third coding units 1520*a* through 1520*e* are processable in a certain order. Referring to FIG. 15, the image decoding apparatus 100 may determine the third coding units 1520*a* through 1520*e* by recursively partitioning the first coding unit 1500. The video decoding apparatus 100 may determine whether any of the first coding unit 1500, the second coding units 1510*a* and 1510*b*, and the third coding units 1520*a* and 1520*b*, and 1520*c* to 1520*e* is partitioned into an odd number of coding units, based on at least one of the block shape information and the partition shape information. For example, the second coding unit 1510*b* at the right from among the second coding units 1510*a* and 1510*b* may be partitioned into the odd number of third coding units 1520*c* through 1520*e*. An order of processing a plurality of coding units included in the first coding unit 1500 may be a certain order (for example, a z-scan order 1530), and the image decoding apparatus 100 may determine whether the third coding units 1520*c* through 1520*e* determined when the second coding unit 1510*b* at the right is partitioned into an odd number satisfy a condition of being processable according to the certain order.

According to an embodiment, the image decoding apparatus 100 may determine whether the third coding units 1520*a* through 1520*e* included in the first coding unit 1500 satisfy a condition of being processable according to a certain order, wherein the condition is related to whether at least one of a width and a height of each of the second coding units 1510*a* and 1510*b* is partitioned into halves according to boundaries of the third coding units 1520*a* through 1520*e*. For example, the third coding units 1520*a* and 1520*b* determined when the height of the second coding unit 1510*a* at the left and having a non-square shape is partitioned into halves satisfy the condition, but it may be determined that the third coding units 1520*c* through 1520*e* do not satisfy the condition because the boundaries of the third coding units 1520*c* through 1520*e* that are determined when the second coding unit 1510*b* at the right is partitioned into three coding units do not partition the width or height of the second coding unit 1510*b* at the right into halves. The image decoding apparatus 100 may determine disconnection of a scan order when the condition is not satisfied, and determine that the second coding unit 1510*b* at the right is partitioned into the odd number of coding units, based on a result of the determination. According to an embodiment, the image decoding apparatus 100 may set a certain limit on a coding unit at a certain location from among an odd number of coding units obtained by partitioning a coding unit, and since such a limit or certain location has been described above through various embodiments, details thereof are not provided again.

Figure 16:
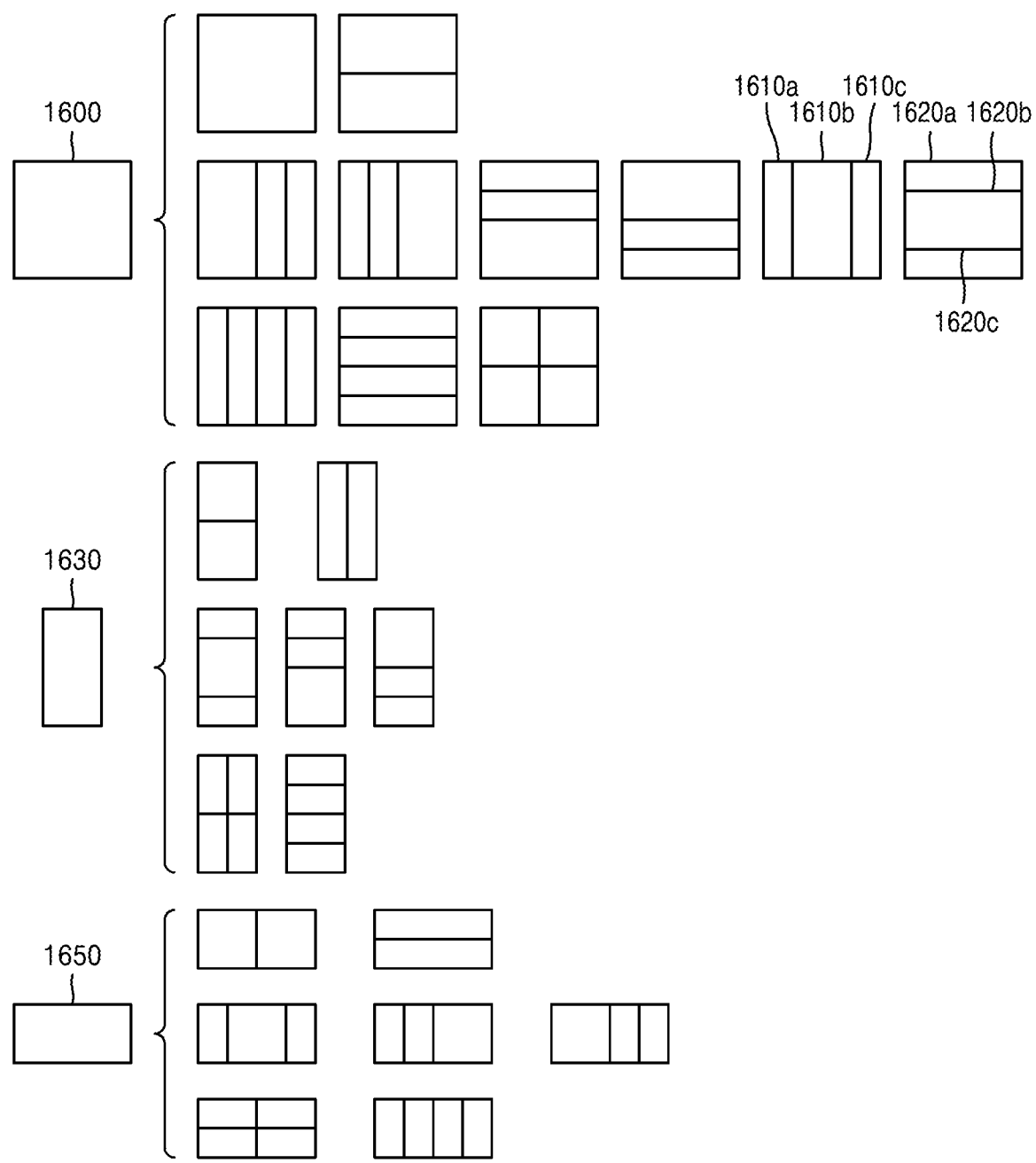
FIG. 16 illustrates processes of determining at least one coding unit when a first coding unit is partitioned, according to an embodiment.

FIG. 16 illustrates processes of determining at least one coding unit when the image decoding apparatus 100 partitions a first coding unit 1600, according to an embodiment. According to an embodiment, the image decoding apparatus 100 may partition the first coding unit 1600 based on at least one of block shape information and partition shape information obtained through the decoder 120. The first coding unit 1600 having a square shape may be partitioned into four coding units having a square shape or a plurality of coding units having a non-square shape. For example, referring to FIG. 16, when block shape information indicates that the first coding unit 1600 is a square and partition shape information indicates a partition into non-square coding units, the image decoding apparatus 100 may partition the first coding unit 1600 into a plurality of non-square coding units. In detail, when partition shape information indicates that an odd number of coding units are determined by partitioning the first coding unit 1600 in a horizontal direction or a vertical direction, the image decoding apparatus 100 may determine, as the odd number of coding units, second coding units 1610*a* through 1610*c* by partitioning the first coding unit 1600 having a square shape in a vertical direction, or second coding units 1620*a* through 1620*c* by partitioning the first coding unit 1600 in a horizontal direction.

According to an embodiment, the image decoding apparatus 100 may determine whether the second coding units 1610*a* through 1610*c* and 1620*a* through 1620*c* included in the first coding unit 1600 satisfy a condition of being processable in a certain order, wherein the condition is related to whether at least one of a width and a height of the first coding unit 1600 is partitioned into halves according to boundaries of the second coding units 1610*a* through 1610*c* and 1620*a* through 1620*c*. Referring to FIG. 16, since the boundaries of the second coding units 1610*a* through 1610*c* determined when the first coding unit 1600 having a square shape is partitioned in a vertical direction do not partition the width of the first coding unit 1600 into halves, it may be determined that the first coding unit 1600 does not satisfy the condition of being processable in a certain order. Also, since the boundaries of the second coding units 1620*a* through 1620*c* determined when the first coding unit 1600 having a square shape is partitioned in a horizontal direction do not partition the height of the first coding unit 1600 into halves, it may be determined that the first coding unit 1600 does not satisfy the condition of being processable in a certain order. The image decoding apparatus 100 may determine disconnection of a scan order when the condition is not satisfied, and determine that the first coding unit 1600 is partitioned into the odd number of coding units based on a result of the determination. According to an embodiment, the image decoding apparatus 100 may set a certain limit on a coding unit at a certain location from among an odd number of coding units obtained by partitioning a coding unit, and since such a limit or certain location has been described above through various embodiments, details thereof are not provided again.

According to an embodiment, the image decoding apparatus 100 may determine coding units having various shapes by partitioning a first coding unit.

Referring to FIG. 16, the image decoding apparatus 100 may partition the first coding unit 1600 having a square shape and a first coding unit 1630 or 1650 having a non-square shape into coding units having various shapes.

Figure 17:
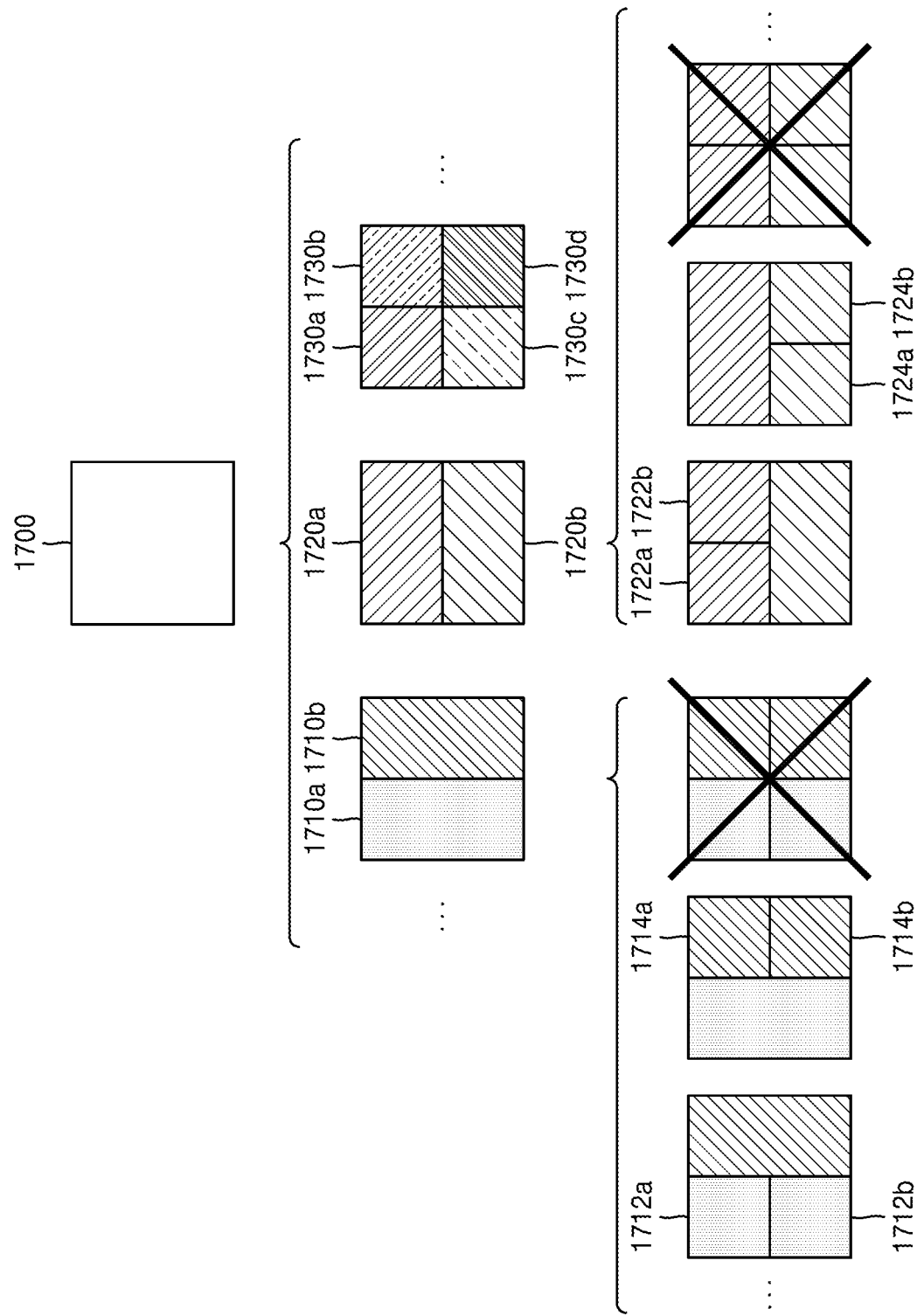
FIG. 17 illustrates that a shape into which a second coding unit is partitionable is restricted when the second coding unit having a non-square shape determined when a first coding unit is partitioned satisfies a certain condition, according to an embodiment.

FIG. 17 illustrates that a shape into which a second coding unit is partitionable by the image decoding apparatus 100 is restricted when the second coding unit having a non-square shape determined when a first coding unit 1700 is partitioned satisfies a certain condition, according to an embodiment.

According to an embodiment, the image decoding apparatus 100 may determine that the first coding unit 1700 having a square shape is partitioned into second coding units 1710a and 1710b or 1720a and 1720b having a non-square shape, based on at least one of block shape information and partition shape information obtained through the decoder 120. The second coding units 1710a and 1710b or 1720a and 1720b may be independently partitioned. Accordingly, the image decoding apparatus 100 may determine that the second coding units 1710a and 1710b or 1720a and 1720b are partitioned into a plurality of coding units or are not partitioned based on at least one of block shape information and partition shape information related to each of the coding units 1710a and 1710b or 1720a and 1720b. According to an embodiment, the image decoding apparatus 100 may determine third coding units 1712a and 1712b by partitioning, in a horizontal direction, the second coding unit 1710a at the left having a non-square shape, which is determined when the first coding unit 1700 is partitioned in a vertical direction. However, when the second coding unit 1710a at the left is partitioned in the horizontal direction, the image decoding apparatus 100 may set a limit that the second coding unit 1710b at the right is not partitioned in the horizontal direction like the second coding unit 1710a at the left. When third coding units 1714a and 1714b are determined when the second coding unit 1710b at the right is partitioned in the same direction, i.e., the horizontal direction, the third coding units 1712a, 1712b, 1714a, and 1714b are determined when the second coding units 1710a at the left and the second coding unit 1710b at the right are each independently partitioned in the horizontal direction. However, this is the same result as partitioning the first coding unit 1700 into four second coding units 1730a through 1730d having a square shape based on at least one of block shape information and partition shape information, and thus may be inefficient in terms of image decoding.

According to an embodiment, the image decoding apparatus 100 may determine third coding units 1722a and 1722b or 1724a, and 1724b by partitioning, in a vertical direction, the second coding unit 1720a or 1720b having a non-square shape determined when the first coding unit 1700 is partitioned in the horizontal direction. However, when one of second coding units (for example, the second coding unit 1720a at the top) is partitioned in a vertical direction, the image decoding apparatus 100 may set a limit that the other second coding unit (for example, the second coding unit 1720b at the bottom) is not partitioned in the vertical direction like the second coding unit 1720a at the top for the above described reasons.

Figure 18:
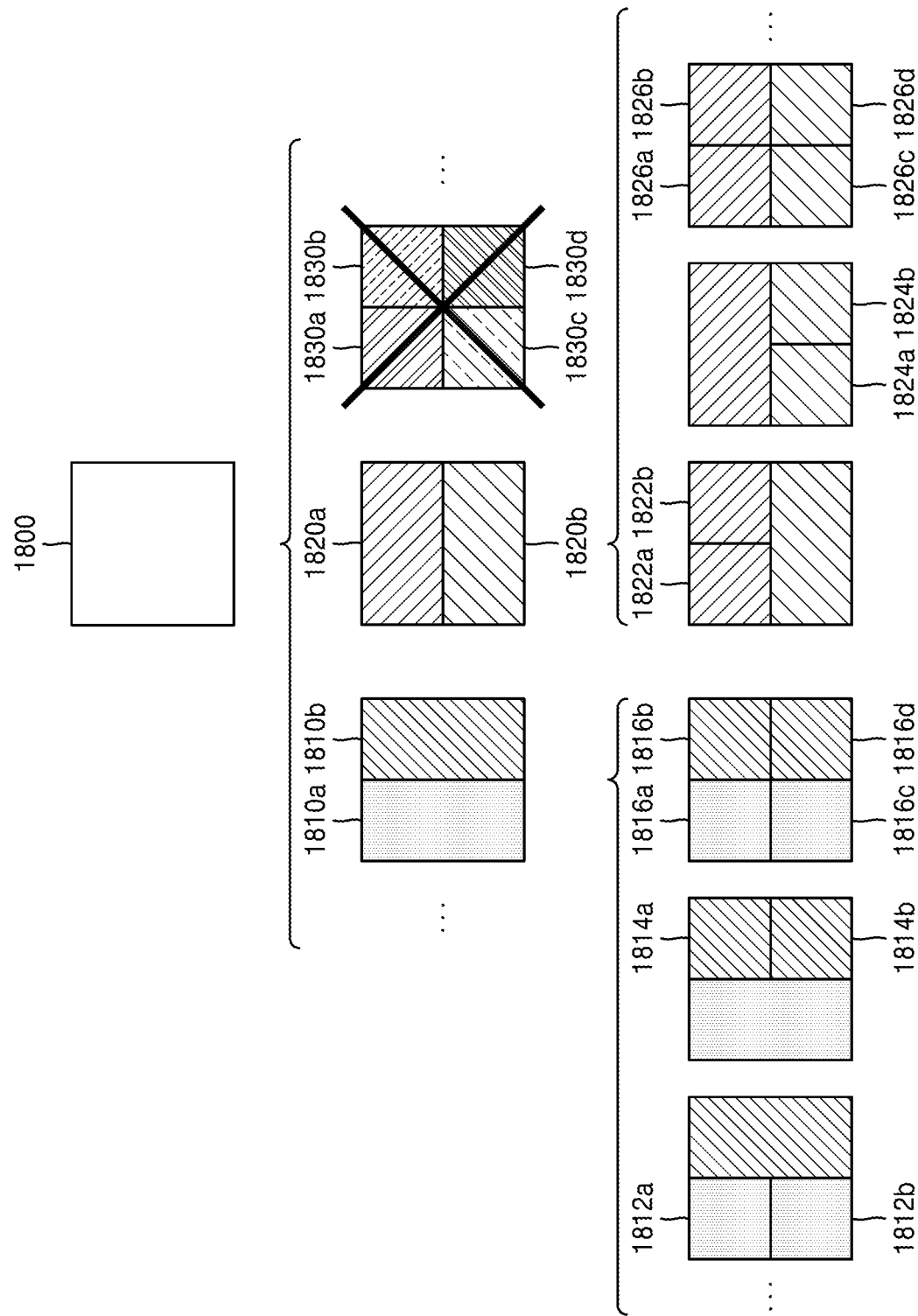
FIG. 18 illustrates processes of partitioning a coding unit having a square shape when partition shape information is unable to indicate that a coding unit is partitioned into four square shapes, according to an embodiment.

FIG. 18 illustrates processes of the image decoding apparatus 100 partitioning a coding unit having a square shape when partition shape information is unable to indicate that a coding unit is partitioned into four square shapes, according to an embodiment.

According to an embodiment, the image decoding apparatus 100 may determine second coding units 1810a and 1810b, or 1820a and 1820b, by partitioning a first coding unit 1800 based on at least one of block shape information and partition shape information. Partition shape information may include information about various shapes into which a coding unit may be partitioned, but such information about various shapes may not include information for partitioning a coding unit into four square coding units. According to such partition shape information, the image decoding apparatus 100 is unable to partitioned the first coding unit 1800 having a square shape into four second coding units 1830 through 1830d having a square shape. The image decoding apparatus 100 may determine the second coding units 1810a and 1810b, or 1820a and 1820b having a non-square shape based on the partition shape information.

According to an embodiment, the image decoding apparatus 100 may independently partition each of the second coding units 1810a and 1810b, or 1820a and 1820b having a non-square shape. Each of the second coding units 1810a and 1810b, or 1820a and 1820b may be partitioned in a certain order via a recursive method that may be a partitioning method corresponding to a method of partitioning the first coding unit 1800 based on at least one of the block shape information and the partition shape information.

For example, the image decoding apparatus 100 may determine third coding units 1812a and 1812b having a square shape by partitioning the second coding unit 1810a at the left in a horizontal direction, or determine third coding units 1814a and 1814b having a square shape by partitioning the second coding unit 1810b at the right in a horizontal direction. In addition, the image decoding apparatus 100 may determine third coding units 1816a through 1816d having a square shape by partitioning both the second coding unit 1810a at the left and the second coding unit 1810b at the right in the horizontal direction. In this case, coding units may be determined in the same manner as when the first coding unit 1800 is partitioned into four second coding units 1830a through 1830d having a square shape.

As another example, the image decoding apparatus 100 may determine third coding units 1822a and 1822b having a square shape by partitioning the second coding unit 1820a at the top in a vertical direction, and determine third coding units 1824a and 1824b having a square shape by partitioning the second coding unit 1820b at the bottom in a vertical direction. In addition, the image decoding apparatus 100 may determine third coding units 1826a through 1826d having a square shape by partitioning both the second coding unit 1820a at the top and the second coding unit 1820b at the bottom in the vertical direction. In this case, coding units may be determined in the same manner as when the first coding unit 1800 is partitioned into four second coding units 1830a through 1830d having a square shape.

Figure 19:
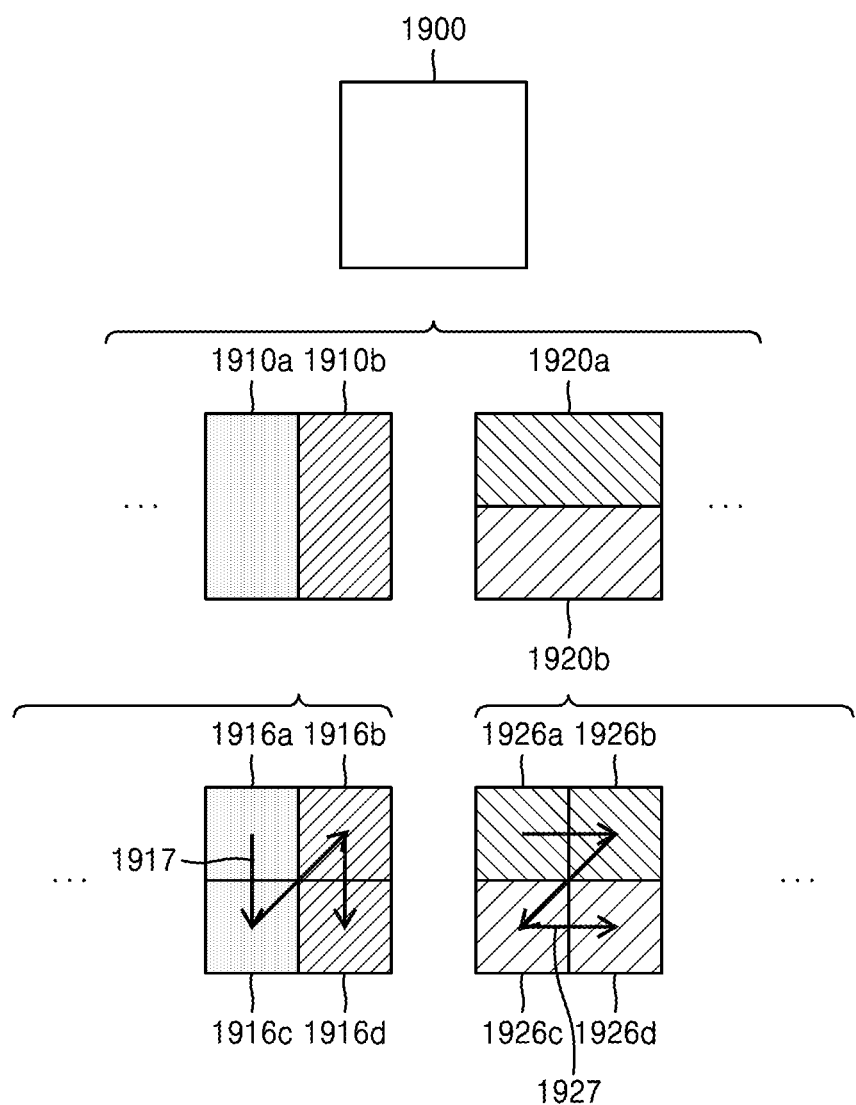
FIG. 19 illustrates that an order of processing a plurality of coding units may be changed according to processes of partitioning a coding unit, according to an embodiment.

FIG. 19 illustrates that an order of processing a plurality of coding units may be changed according to processes of partitioning a coding unit, according to an embodiment.

According to an embodiment, the image decoding apparatus 100 may partition a first coding unit 1900 based on block shape information and partition shape information. When the block shape information indicates a square shape and the partition shape information indicates that the first coding unit 1900 is partitioned in at least one of a horizontal direction and a vertical direction, the image decoding apparatus 100 may partition the first coding unit 1900 to determine second coding units 1910a and 1910b, or 1920a and 1920b. Referring to FIG. 19, the second coding units 1910a and 1910b, or 1920a and 1920b having a non-square shape and determined when the first coding unit 1900 is partitioned in the horizontal direction or the vertical direction may each be independently partitioned based on block shape information and partition shape information. For example, the image decoding apparatus 100 may determine third coding units 1916a through 1916d by partitioning, in the horizontal direction, each of the second coding units 1910a and 1910b generated as the first coding unit 1900 is partitioned in the vertical direction, or determine third coding units 1926a through 1926d by partitioning, in the vertical direction, the second coding units 1920a and 1920b generated as the first coding unit 1900 is partitioned in the vertical direction. Processes of partitioning the second coding units 1910a and 1910b, or 1920a and 1920b have been described above with reference to FIG. 17, and thus details thereof are not provided again.

According to an embodiment, the image decoding apparatus 100 may process coding units according to a certain order. Features about processing coding units according to a certain order have been described above with reference to FIG. 14, and thus details thereof are not provided again. Referring to FIG. 19, the image decoding apparatus 100 may determine four third coding units 1916a through 1916d or 1926a through 1926d having a square shape by partitioning the first coding unit 1900 having a square shape. According to an embodiment, the image decoding apparatus 100 may determine an order of processing the third coding units 1916a through 1916d or 1926a through 1926d based on how the first coding unit 1900 is partitioned.

According to an embodiment, the image decoding apparatus 100 may determine the third coding units 1916a through 1916d by partitioning, in the horizontal direction, the second coding units 1910a and 1910b generated as the first coding unit 1900 is partitioned in the vertical direction, and process the third coding units 1916a through 1916d according to an order 1917 of first processing, in the vertical direction, the third coding units 1916a and 1916c included in the second coding unit 1910a at the left, and then processing, in the vertical direction, the third coding units 1916b and 1916d included in the second coding unit 1910b at the right.

According to an embodiment, the image decoding apparatus 100 may determine the third coding units 1926a through 1926d by partitioning, in the vertical direction, the second coding units 1920a and 1920b generated as the first coding unit 1900 is partitioned in the horizontal direction, and process the third coding units 1926a through 1926d according to an order 1927 of first processing, in the horizontal direction, the third coding units 1926a and 1926b included in the second coding unit 1920a at the top, and then processing, in the horizontal direction, the third coding units 1926c and 1926d included in the second coding unit 1920b at the bottom.

Referring to FIG. 19, the third coding units 1916a through 1916d or 1926a through 1926d having a square shape may be determined when the second coding units 1910a and 1910b, or 1920a and 1920b are each partitioned. The second coding units 1910a and 1910b determined when the first coding unit 1900 is partitioned in the vertical direction and the second coding units 1920a and 1920b determined when the first coding unit 1900 is partitioned in the horizontal direction are partitioned in different shapes, but according to the third coding units 1916a through 1916d and 1926a through 1926d determined afterwards, the first coding unit 1900 is partitioned in coding units having same shapes. Accordingly, the image decoding apparatus 100 may process pluralities of coding units determined in same shapes in different orders even when the coding units having the same shapes are consequently determined when coding units are recursively partitioned through different processes based on at least one of block shape information and partition shape information.

FIG. 20 illustrates processes of determining a depth of a coding unit as a shape and size of the coding unit are changed, when a plurality of coding units are determined when the coding unit is recursively partitioned, according to an embodiment.

According to an embodiment, the image decoding apparatus 100 may determine a depth of a coding unit according to a certain standard. For example, the certain standard may be a length of a long side of the coding unit. When a length of a long side of a current coding unit is partitioned $2^n$ times shorter than a length of a long side of a coding unit before being partitioned, it may be determined that a depth of the current coding unit is increased n times a depth of the coding unit before being partitioned, wherein n>0. Hereinafter, a coding unit having an increased depth is referred to as a coding unit of a lower depth.

Referring to FIG. 20, the image decoding apparatus 100 may determine a second coding unit 2002 and a third coding unit 2004 of lower depths by partitioning a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by partitioning a width and a height of the first coding unit 2000 by $\frac{1}{2}^1$ may have a size of N×N. In addition, the third coding unit 2004 determined by partitioning a width and a height of the second coding unit 2002 by ½ may have a size of N/2×N/2. In this case, a width and a height of the third coding unit 2004 corresponds to $\frac{1}{2}^2$ of the first coding unit 2000. When a depth of first coding unit 2000 is D, a depth of the second coding unit 2002 having $\frac{1}{2}^1$ of the width and the height of the first coding unit 2000 may be D+1, and a depth of the third coding unit 2004 having $\frac{1}{2}^2$ of the width and the height of the first coding unit 2000 may be D+2.

According to an embodiment, the image decoding apparatus 100 may determine a second coding unit 2012 or 2022 and a third coding unit 2014 or 2024 by partitioning a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The image decoding apparatus 100 may determine a second coding unit (for example, the second coding unit

2002, 2012, or 2022) by partitioning at least one of a width and a height of the first coding unit 2010 having a size of N×2N. In other words, the image decoding apparatus 100 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

The image decoding apparatus 100 may determine a second coding unit (for example, the second coding unit 2002, 2012, or 2022) by partitioning at least one of a width and a height of the first coding unit 2020 having a size of 2N×N. In other words, the image decoding apparatus 100 may determine the second coding unit 2002 having a size of N×N or the second coding unit 2012 having a size of N/2×N by partitioning the first coding unit 200 in a vertical direction, or determine the second coding unit 2022 having a size of N×N/2 by partitioning the first coding unit 2010 in horizontal and vertical directions.

According to an embodiment, the image decoding apparatus 100 may determine a third coding unit (for example, the third coding unit 2004, 2014, or 2024) by partitioning at least one of a width and a height of the second coding unit 2002 having a size of N×N. In other words, the image decoding apparatus 100 may determine the third coding unit 2004 having a size of N/2×N/2, the third coding unit 2014 having a size of N/2²×N/2, or the third coding unit 2024 having a size of N/2×N/2² by partitioning the second coding unit 2002 in vertical and horizontal directions.

According to an embodiment, the image decoding apparatus 100 may determine a third coding unit (for example, the third coding unit 2004, 2014, or 2024) by partitioning at least one of a width and a height of the second coding unit 2022 having a size of N/2×N. In other words, the image decoding apparatus 100 may determine the third coding unit 2004 having a size of N/2×N/2 or the third coding unit 2024 having a size of N/2×N/2² by partitioning the second coding unit 2012 in a horizontal direction, or the third coding unit 2014 having a size of N/2²×N/2 by partitioning the second coding unit 2012 in vertical and horizontal directions.

According to an embodiment, the image decoding apparatus 100 may determine a third coding unit (for example, the third coding unit 2004, 2014, or 2024) by partitioning at least one of a width and a height of the second coding unit 2022 having a size of N×N/2. In other words, the image decoding apparatus 100 may determine the third coding unit 2004 having a size of N/2×N/2 or the third coding unit 2014 having a size of N/2²×N/2 by partitioning the second coding unit 2022 in a vertical direction, or the third coding unit 2024 having a size of N/2×N/2² by partitioning the second coding unit 2022 in vertical and horizontal directions.

According to an embodiment, the image decoding apparatus 100 may partition a coding unit (for example, the first, second, or third coding unit 2000, 2002, or 2004) having a square shape in a horizontal or vertical direction. For example, the first coding unit 2010 having a size of N×2N may be determined by partitioning the first coding unit 2000 having a size of 2N×2N in the vertical direction, or the first coding unit 2020 having a size of 2N×N may be determined by partitioning the first coding unit 2000 in the horizontal direction. According to an embodiment, when a depth is determined based on a length of a longest side of a coding unit, a depth of a coding unit determined when the first coding unit 2000 having a size of 2N×2N is partitioned in a horizontal or vertical direction may be the same as a depth of the first coding unit 2000.

According to an embodiment, the width and the height of the third coding unit 2014 or 2024 may be $½^2$ of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is $½^2$ of the width and the height of the first coding unit 2010 or 202 may be D+2.

Figure 21:
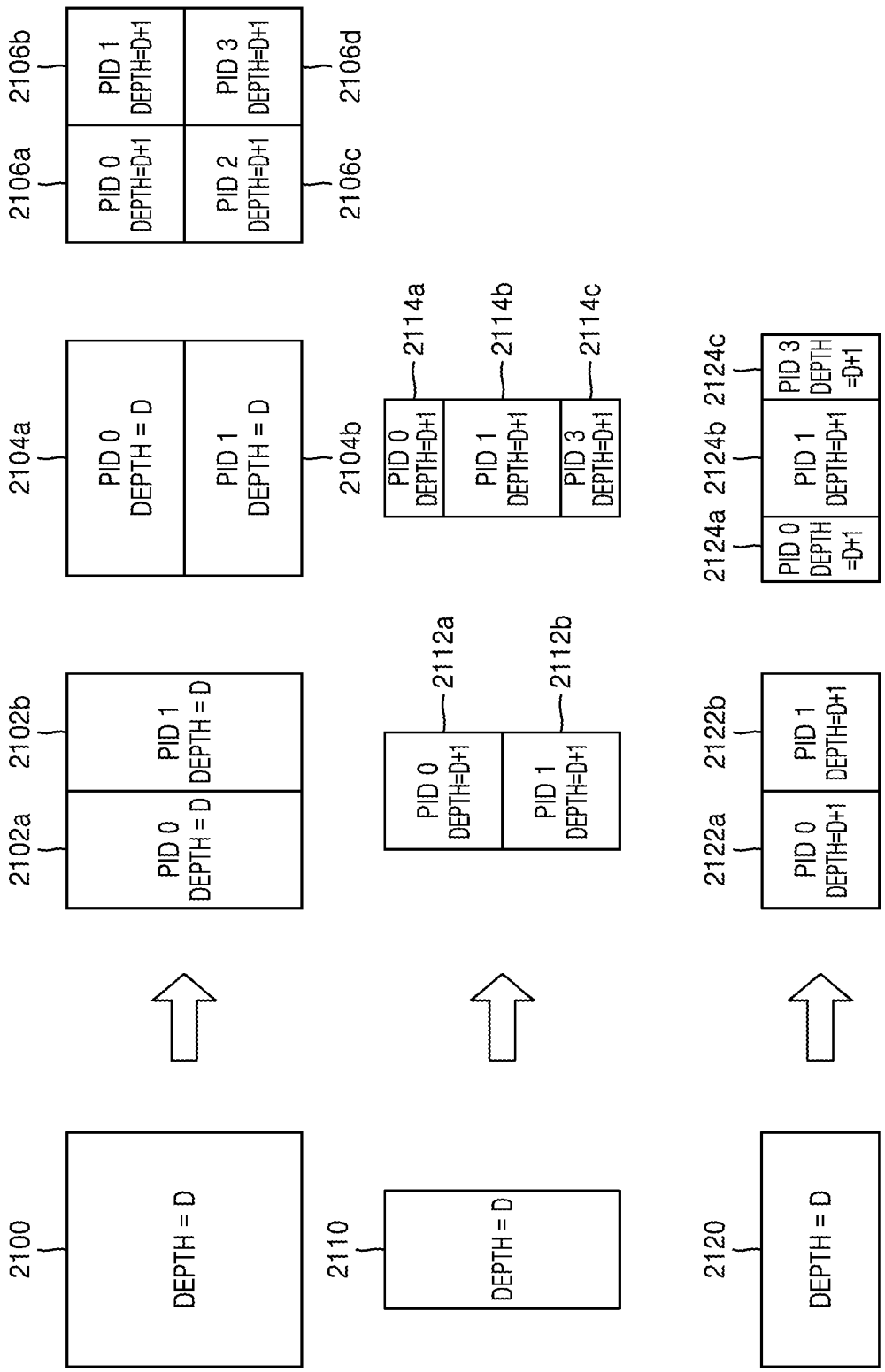
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the image decoding apparatus 100 may determine a second coding unit having various shapes by partitioning a first coding unit 2100 having a square shape. Referring to FIG. 21, the image decoding apparatus 100 may determine second coding units 2102*a* and 2102*b*, 2104*a* and 2104*b*, or 2106*a* through 2106*d* by partitioning the first coding unit 2100 in at least one of a vertical direction and a horizontal direction, according to partition shape information. In other words, the image decoding apparatus 100 may determine the second coding units 2102*a* and 2102*b*, 2104*a* and 2104*b*, or 2106*a* through 2106*d* based on partition shape information of the first coding unit 2100.

According to an embodiment, a depth of the second coding units 2102*a* and 2102*b*, 2104*a* and 2104*b*, or 2106*a* through 2106*d* determined according to the partition shape information of the first coding unit 2100 having a square shape may be determined based on a length of a long side. For example, since a length of one side of the first coding unit 2100 having a square shape is the same as a length of a long side of the second coding units 2102*a* and 2102*b* or 2104*a* and 2104*b* having a non-square shape, the depths of the first coding unit 2100 and the second coding units 2102*a* and 2102*b* or 2104*a* and 2104*b* having a non-square shape may be the same, i.e., D. On the other hand, when the image decoding apparatus 100 partitions the first coding unit 2100 into the four second coding units 2106*a* through 2106*d* having a square shape, based on the partition shape information, a length of one side of the second coding units 2106*a* through 2106*d* having a square shape is ½ of the length of one side of the first coding unit 2100, the depths of the second coding units 2106*a* through 2106*d* may be D+1, i.e., a depth lower than the depth D of the first coding unit 2100.

According to an embodiment, the image decoding apparatus 100 may partition a first coding unit 2110, in which a height is longer than a width, in a horizontal direction into a plurality of second coding units 2112*a* and 2112*b* or 2114*a* through 2114*c*, according to partition shape information. According to an embodiment, the image decoding apparatus 100 may partition a first coding unit 2120, in which a width is longer than a height, in a vertical direction into a plurality of second coding units 2122*a* and 2122*b* or 2124*a* through 2124*c*, according to partition shape information.

According to an embodiment, depths of the second coding units 2112*a* and 2112*b*, 2114*a* through 2114*c*, 2122*a* and 2122*b*, or 2124*a* through 2124*c* determined according to the partition shape information of the first coding unit 2110 or 2120 having a non-square shape may be determined based on a length of a long side. For example, since a length of one side of the second coding units 2112*a* and 2112*b* having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the image decoding apparatus 100 may partition the first coding unit 2110 having a non-square shape into an odd number of second coding units 2114a through 2114c, based on partition shape information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are ½ of a length of one side of the first coding unit 2110, depths of the second coding units 2114a through 2114b may be D+1, i.e., a depth lower than the depth D of the first coding unit 2110. The image decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the image decoding apparatus 100 may determine PIDs based on a size ratio of the coding units. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID having increased by 2. In other words, values of the PID may be discontinuous. According to an embodiment, the image decoding apparatus 100 may determine whether an odd number of coding units have the same sizes based on discontinuity of PID for distinguishing the coding units.

According to an embodiment, the image decoding apparatus 100 may determine whether a plurality of coding units determined when a current coding unit is partitioned have certain partition shapes based on values of PID. Referring to FIG. 21, the image decoding apparatus 100 may determine the even number of second coding units 2112a and 211b or the odd number of second coding units 2114a through 2114c by partitioning the first coding unit 2110 having a rectangular shape in which the height is longer than the width. The image decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the image decoding apparatus 100 may determine a coding unit at a certain location from among coding units determined by using PIDs for distinguishing coding units. According to an embodiment, when partition shape information of the first coding unit 2110 having a rectangular shape in which a height is longer than a width indicates that the first coding unit 2110 is partitioned into three coding units, the image decoding apparatus 100 may partition the first coding unit 2110 into the three second coding units 2114a through 2114c. The image decoding apparatus 100 may assign a PID to each of the three second coding units 2114a through 2114c. The image decoding apparatus 100 may compare PIDs of an odd number of coding units so as to determine a center coding unit from among the coding units. The image decoding apparatus 100 may determine, as a coding unit at a center location from among coding units determined when the first coding unit 2110 is partitioned, the second coding unit 2114b having a PID corresponding to a center value from among PIDs, based on PIDs of the coding units. According to an embodiment, while determining PIDs for distinguishing coding units, when the coding units do not have the same sizes, the image decoding apparatus 100 may determine PIDs based on a size ratio of the coding units. Referring to FIG. 21, the second coding unit 2114b generated when the first coding unit 2110 is partitioned may have the same width as the second coding units 2114a and 2114c, but may have a height twice higher than those of the second coding units 2114a and 2114c. In this case, when the PID of the second coding unit 2114b located at the center is 1, the PID of the second coding unit 2114c in a next order may be 3, the PID having increased by 2. As such, when an increasing range of PIDs differs while uniformly increasing, the image decoding apparatus 100 may determine that a current coding unit is partitioned into a plurality of coding units including a coding unit having a different size from other coding units. According to an embodiment, when partition shape information indicates partitioning into an odd number of coding units, the image decoding apparatus 100 may partition a current coding unit into a plurality of coding units, in which a coding unit at a certain location (for example, a center coding unit) has a size different from other coding units. In this case, the image decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the image decoding apparatus 100 may use a certain data unit from which recursive partitioning of a coding unit is started.

Figure 22:
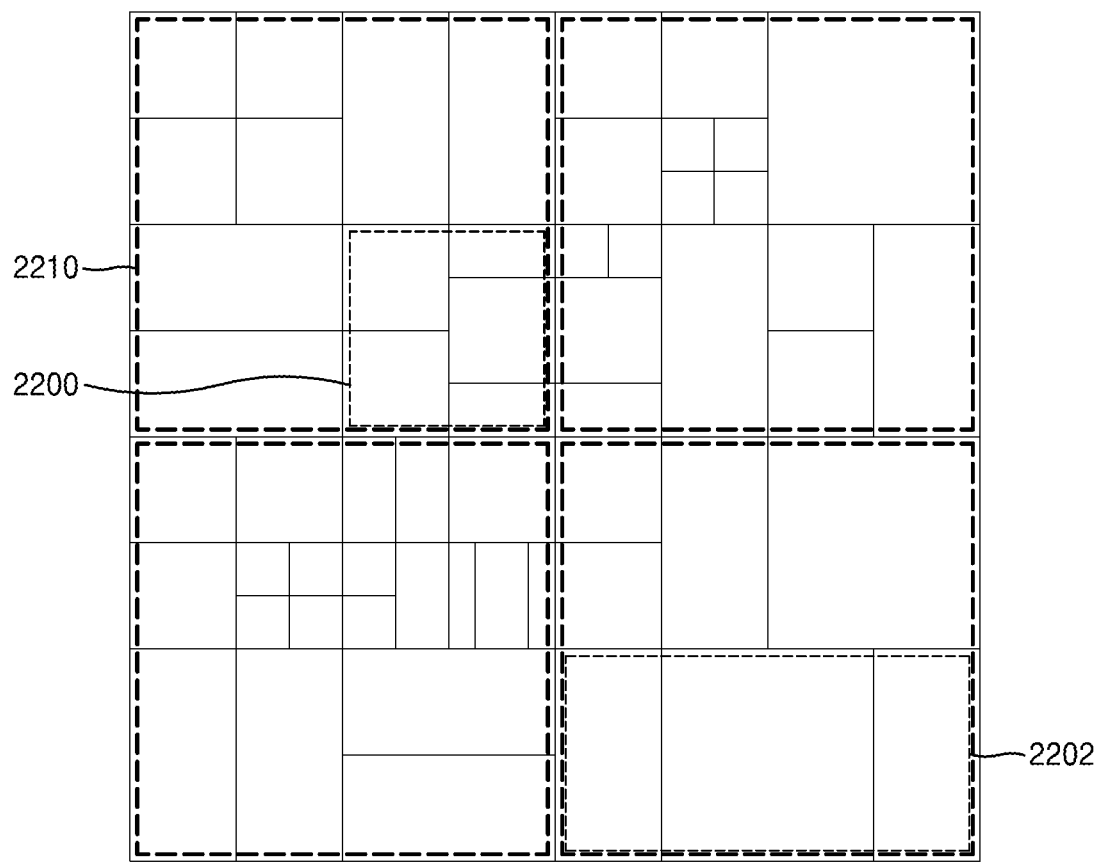
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively partitioned by using at least one of block shape information and partition shape information. In other words, the certain data unit may correspond to a coding unit of an uppermost depth used while determining a plurality of coding units by partitioning a current picture. Hereinafter, the certain data unit is referred to as a reference data unit for convenience of description.

According to an embodiment, the reference data unit may indicate a certain size and shape. According to an embodiment, reference coding unit may include M×N samples. Here, M and N may be the same, and may be an integer expressed as a multiple of 2. In other words, a reference data unit may indicate a square shape or a non-square shape, and may later be partitioned into an integer number of coding units.

According to an embodiment, the image decoding apparatus 100 may partition a current picture into a plurality of reference data units. According to an embodiment, the image decoding apparatus 100 may partition the plurality of reference data units obtained by partitioning the current picture by using partition shape information about each of the reference data units. Partition processes of such reference data units may correspond to partition processes using a quad-tree structure.

According to an embodiment, the image decoding apparatus 100 may pre-determine a smallest size available for the reference data unit included in the current picture. Accordingly, the image decoding apparatus 100 may determine the reference data unit having various sizes that are equal to or larger than the smallest size, and determine at least one coding unit based on the determined reference data unit by using block shape information and partition shape information.

Referring to FIG. 22, the image decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the decoder 210 of the image decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of partitioning the current coding unit 1000 of FIG. 10, and processes of determining at least one coding unit included in the reference coding unit 2202 having a non-square shape have been described above through processes of partitioning the current coding unit 1100 or 1150 of FIG. 11, and thus details thereof are not provided again.

According to an embodiment, in order to determine a size and shape of a reference coding unit according to some data units pre-determined based on a predetermined condition, the image decoding apparatus 100 may use a PID for distinguishing the size and shape of the reference coding unit. In other words, the decoder 120 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the image decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the image decoding apparatus 100 may use at least one reference coding unit included in one largest coding unit. In other words, a largest coding unit partitioning an image may include at least one reference coding unit, and a coding unit may be determined when each of the reference coding unit is recursively partitioned. According to an embodiment, at least one of a width and height of the largest coding unit may be an integer times at least one of a width and height of the reference coding unit. According to an embodiment, a size of a reference coding unit may be equal to a size of a largest coding unit, which is partitioned n times according to a quad-tree structure. In other words, the image decoding apparatus 100 may determine a reference coding unit by partitioning a largest coding unit n times according to a quad-tree structure, and partition the reference coding unit based on at least one of block shape information and partition shape information according to various embodiments.

Figure 23:
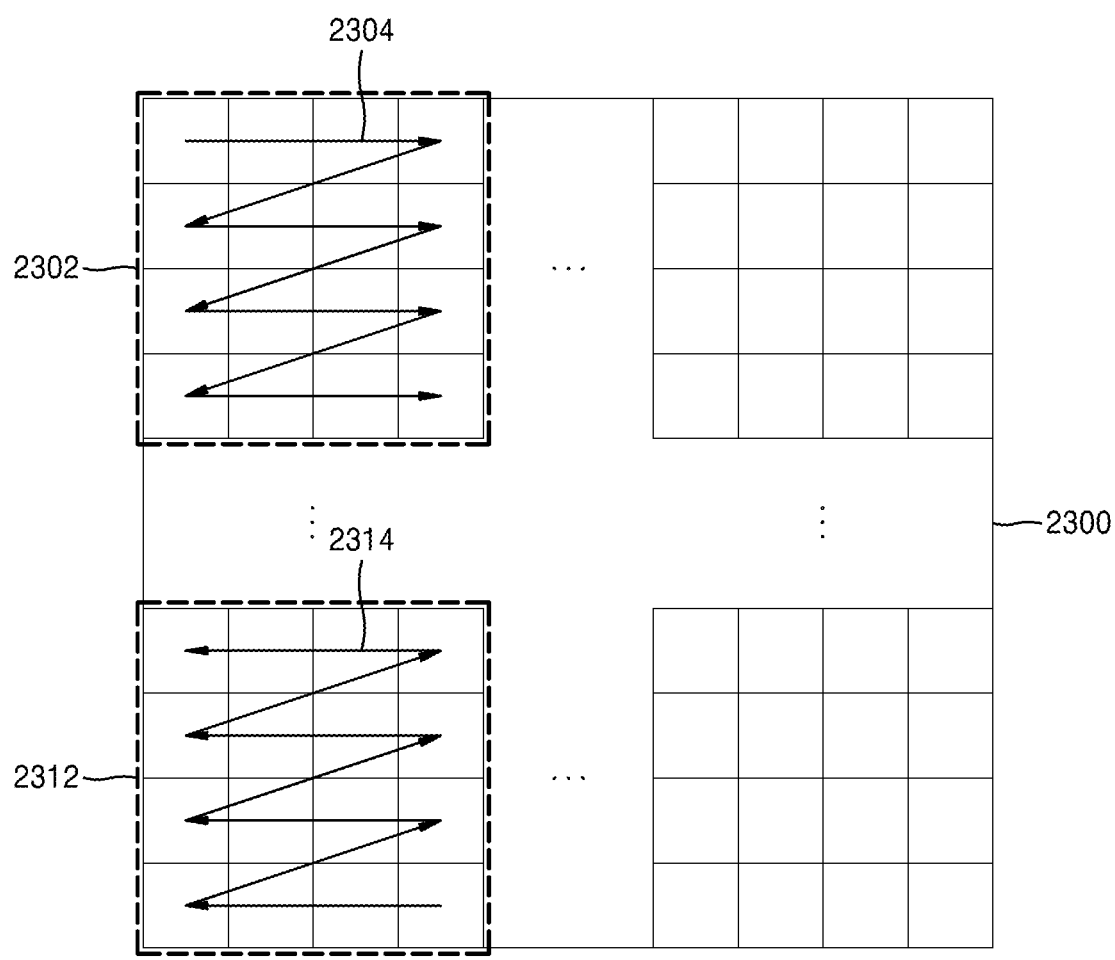
FIG. 23 illustrates a processing block serving as a criterion of determining a determination order of at least one reference coding units included in a picture, according to an embodiment.

FIG. 23 illustrates a processing block serving as a criterion of determining a determination order of reference coding units included in a picture 2300, according to an embodiment.

According to an embodiment, the image decoding apparatus 100 may determine at least one processing block partitioning a picture. A processing block is a data unit including at least one reference coding unit partitioning an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the image decoding apparatus 100 may determine a size of at least one processing block included in an image by obtaining information about a size of a processing block. The image decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the decoder 120 of the image decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the decoder 120 may obtain, from the bitstream, the information about a size of a processing block according to such several data units, and the image decoding apparatus 100 may determine the size of at least one processing block partitioning the picture by using the obtained information about a size of a processing block, wherein the size of the processing block may be an integer times a size of a reference coding unit.

According to an embodiment, the image decoding apparatus 100 may determine sizes of processing blocks 2302 and 2312 included in the picture 2300. For example, the image decoding apparatus 100 may determine a size of a processing block based on information about a size of a processing block, the information being obtained from a bitstream. Referring to FIG. 23, the image decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The image decoding apparatus 100 may determine a determining order of at least one reference coding unit in at least one processing block.

According to an embodiment, the image decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the image decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 100 may obtain, from a bitstream, information about a determining order of a reference coding unit according to certain data units. For example, the decoder 120 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the decoder 120 may obtain, from the bitstream, information about a determining order of a reference coding unit, as information related to the processing blocks 2302 and 2312, and the image decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the image decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The image decoding apparatus 100 may decode determined at least one reference coding unit, according to an embodiment. The image decoding apparatus 100 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or partition shape information indicating a method of partitioning the current coding unit. The block shape information or the partition shape information may be included in a bitstream related to various data units. For example, the image decoding apparatus 100 may use the block shape information or partition shape information, which is included in a sequence parameter set, a picture parameter set, a video parameter set, a slice header, and a slice segment header. In addition, the image decoding apparatus 100 may obtain, from a bitstream, and use syntax corresponding to the block shape information or the partition shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. A method of decoding a video, the method comprising:
    determining at least one first block for partitioning a current frame which is one of at least one frame included in the video;
    determining a first prediction mode indicating an intra-prediction method to be performed on a current first block which is one of the at least one first block, based on first intra-prediction mode information obtained from a bitstream, when intra-prediction is performed on the current first block;
    determining a plurality of second blocks included in the current first block;
    determining a reference direction to be used for a current second block which is one of the plurality of second blocks, based on a prediction direction determined according to the first intra-prediction mode information;
    determining a plurality of prediction direction candidates to be used for the current second block, the plurality of prediction direction candidates including the reference direction;

determining second prediction modes indicating intra-prediction methods to be performed on the current second blocks, based on second intra-prediction mode information indicating one of the plurality of the prediction direction candidates, wherein the second intra prediction mode information is obtained from the bitstream with respect to each of the plurality of second blocks; and decoding the video by performing intra-prediction based on the first prediction mode and the second prediction mode, wherein the plurality of prediction direction candidates are determined by adding or subtracting a predetermined set of numbers to an index indicating the reference direction.

2. The method of claim 1, wherein the determining of the second prediction modes comprises:

obtaining the second intra-prediction mode information from the bitstream related to a previous second block which is one of the plurality of second blocks; and determining the second prediction mode of the current second block, based on the second intra-prediction mode information related to the previous second block and the first intra-prediction mode information.

3. The method of claim 2, wherein the determining of the second prediction modes comprises:

determining the reference direction to be used for the current second block, based on a prediction direction determined according to the second intra-prediction mode information related to the previous second block.

4. The method of claim 1, wherein, when the current second block is a last block among the plurality of second blocks, the determining of the second prediction modes comprises determining a prediction mode using the reference direction to be the second prediction mode of the current second block.

5. The method of claim 1, wherein differences between indexes of the prediction direction candidates to be used for the current second block are uniform.

6. The method of claim 1, wherein differences between indexes of the prediction direction candidates to be used for the current second block are not uniform.

7. The method of claim 1, wherein the determining of the first prediction mode comprises determining an intra-prediction mode of the current first block, based on first intra-prediction mode information obtained from the bitstream related to a first neighboring block adjacent to the current first block.

8. The method of claim 1, wherein the determining of the first prediction mode comprises determining the first prediction mode, based on the first intra-prediction mode information obtained from the bitstream related to the current first block.

9. The method of claim 1, wherein the determining of the second prediction mode comprises:

obtaining a flag indicating whether intra-prediction is to be performed based on the first prediction mode and the second prediction modes from the bitstream; and when the flag indicates that intra-prediction is to be performed based on the first prediction mode and the second prediction modes, determining the second prediction mode by obtaining the second intra-prediction mode information from the bitstream with respect to each of the plurality of second blocks.

10. The method of claim 1, wherein, when the first prediction mode indicates a directional intra-prediction mode, the determining of the second prediction modes comprises determining second prediction modes of second blocks in the same row or column among the plurality of second blocks to be the same, based on a direction of intra-prediction related to the first prediction mode.

11. The method of claim 1, wherein the determining of the plurality of second blocks comprises determining a plurality of non-square second blocks included in the first block.

12. The method of claim 1, wherein the first block comprises a coding unit, and the plurality of second blocks comprise transformation units.

13. A non-transitory computer-readable recording medium having recorded thereon a computer program for executing the method of claim 1.

14. An apparatus for decoding a video, the apparatus comprising:

one or more processors, a bitstream obtainer configured to obtain first intra-prediction mode information and second intra-prediction mode information from a bitstream; and a decoder configured to determine at least one first block for partitioning a current frame which is one of at least one frame included in the video, determine whether intra-prediction is to be performed on a current first block which is one of the at least one first block, determine a first prediction mode indicating an intra-prediction method to be performed on the current first block based on the first intra-prediction mode information when intra-prediction is to be performed on the current first block, determine a plurality of second blocks included in the current first block, determine a reference direction to be used for a current second block which is one of the plurality of second blocks, based on a prediction direction determined according to the first intra-prediction mode information, determine a plurality of prediction direction candidates to be used for the current second block, the plurality of prediction direction candidates including the reference direction, determine second prediction mode indicating intra-prediction methods to be performed on the current second block based on the second intra-prediction mode information indicating one of the plurality of the prediction direction candidates, wherein the second intra prediction mode information is obtained with respect to each of the plurality of second blocks, and decode the video by performing intra-prediction based on the first prediction mode and the second prediction modes, wherein the plurality of prediction direction candidates are determined by adding or subtracting a predetermined set of numbers to an index indicating the reference direction and wherein the bitstream obtainer and the decoder are executed in said one or more processors.

15. A method of encoding a video, the method comprising:

determining at least one first block for partitioning a current frame which is one of at least one frame included in the video;

determining whether intra-prediction is to be performed on a current first block which is one of the at least one first block;

when intra-prediction is to be performed on the current first block, determining a first prediction mode indicating an intra-prediction method to be performed on the current first block;

determining a plurality of second blocks included in the current first block;

determining a reference direction to be used for a current second block which is one of the plurality of second blocks, based on a prediction direction determined according to the first prediction mode;

determining a plurality of prediction direction candidates to be used for the current second block, the plurality of prediction direction candidates including the reference direction;

determining second prediction modes indicating intra-prediction methods to be performed on the current second blocks, based on one of the plurality of the prediction direction candidates;

encoding the video by performing intra-prediction based on the first prediction mode and the second prediction modes; and generating a bitstream including data regarding the encoded video, first intra-prediction mode information indicating a current first prediction mode, and second intra-prediction mode information indicating the second prediction modes, wherein the plurality of prediction direction candidates are determined by adding or subtracting a predetermined set of numbers to an index indicating the reference direction.

* * * * *